US011130701B2

(12) United States Patent
Akarapu et al.

(10) Patent No.: US 11,130,701 B2
(45) Date of Patent: *Sep. 28, 2021

(54) APPARATUSES AND METHODS FOR LASER PROCESSING TRANSPARENT WORKPIECES USING NON-AXISYMMETRIC BEAM SPOTS

(71) Applicant: CORNING INCORPORATED, Corning, NY (US)

(72) Inventors: Ravindra Kumar Akarapu, Horseheads, NY (US); Garrett Andrew Piech, Corning, NY (US); Sergio Tsuda, Horseheads, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,266

(22) Filed: Jun. 24, 2020

(65) Prior Publication Data
US 2020/0331793 A1    Oct. 22, 2020

Related U.S. Application Data

(63) Continuation of application No. 15/718,848, filed on Sep. 28, 2017, now Pat. No. 10,730,783.
(Continued)

(51) Int. Cl.
*C03B 33/08* (2006.01)
*B23K 26/53* (2014.01)
(Continued)

(52) U.S. Cl.
CPC ........ *C03B 33/082* (2013.01); *B23K 26/0006* (2013.01); *B23K 26/0608* (2013.01);
(Continued)

(58) Field of Classification Search
CPC ..... G02B 27/09; G02B 27/0938; H01S 3/005; C03B 33/082; B23K 26/0736
See application file for complete search history.

(56) References Cited

U.S. PATENT DOCUMENTS

| 1,529,243 A | 3/1925 | Drake et al. |
| 1,626,396 A | 4/1927 | Drake |
(Continued)

FOREIGN PATENT DOCUMENTS

| CN | 2388062 Y | 7/2000 |
| CN | 1473087 A | 2/2004 |
(Continued)

OTHER PUBLICATIONS

"Aviation Manufacturing Technology"; Beijing Aviation Manufacturing Engineering Research Institute Aviation Industry Press; (2013) p. 147.
(Continued)

*Primary Examiner* — Galen H Hauth
(74) *Attorney, Agent, or Firm* — Kevin L. Bray

(57) ABSTRACT

A method for laser processing a transparent workpiece includes forming a contour line that includes defects, by directing a pulsed laser beam output by a beam source through an aspheric optical element positioned offset in a radial direction from the beam pathway and into the transparent workpiece such that the portion of the pulsed laser beam directed into the transparent workpiece generates an induced absorption within the transparent workpiece that produces a defect within the transparent workpiece. The portion of the pulsed laser beam directed into the transparent workpiece includes a wavelength $\lambda$, an effective spot size $w_{o,eff}$, and a non-axisymmetric beam cross section having a minimum Rayleigh range $Z_{Rx,min}$ in an x-direction and a
(Continued)

minimum Rayleigh range $Z_{Ry,min}$ in a y-direction. Further, the smaller of $Z_{Rx,min}$ and $Z_{Ry,min}$ is greater than $$F_D = \frac{\pi w_{0,eff}^2}{\lambda},$$

where $F_D$ is a dimensionless divergence factor comprising a value of 10 or greater.

20 Claims, 53 Drawing Sheets

Related U.S. Application Data

(60) Provisional application No. 62/402,337, filed on Sep. 30, 2016.

(51) Int. Cl.
*B23K 26/06* (2014.01)
*B23K 26/00* (2014.01)
*B23K 26/067* (2006.01)
*B23K 26/073* (2006.01)
*B23K 26/08* (2014.01)
*B23K 26/38* (2014.01)
*C03B 33/10* (2006.01)
*B23K 103/00* (2006.01)

(52) U.S. Cl.
CPC ...... *B23K 26/0648* (2013.01); *B23K 26/0676* (2013.01); *B23K 26/0736* (2013.01); *B23K 26/0869* (2013.01); *B23K 26/38* (2013.01); *B23K 26/53* (2015.10); *C03B 33/102* (2013.01); *B23K 2103/50* (2018.08); *B23K 2103/54* (2018.08)

(56) References Cited

U.S. PATENT DOCUMENTS

| | | |
|---|---|---|
| 1,790,397 A | 1/1931 | Woods et al. |
| 2,682,134 A | 6/1954 | Stookey |
| 2,749,794 A | 6/1956 | O'Leary |
| 2,754,956 A | 7/1956 | Sommer |
| 3,647,410 A | 3/1972 | Heaton et al. |
| 3,673,900 A | 7/1972 | Jendrisak et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 3,947,093 A | 3/1976 | Goshima et al. |
| 4,076,159 A | 2/1978 | Farragher |
| 4,226,607 A | 10/1980 | Domken |
| 4,441,008 A | 4/1984 | Chan |
| 4,546,231 A | 10/1985 | Gresser et al. |
| 4,618,056 A | 10/1986 | Cutshall |
| 4,623,776 A | 11/1986 | Buchroeder et al. |
| 4,642,439 A | 2/1987 | Miller et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,951,457 A | 8/1990 | Deal |
| 4,997,250 A | 3/1991 | Ortiz, Jr. |
| 5,035,918 A | 7/1991 | Vyas |
| 5,040,182 A | 8/1991 | Spinelli et al. |
| 5,104,210 A | 4/1992 | Tokas |
| 5,104,523 A | 4/1992 | Masaharu et al. |
| 5,108,857 A | 4/1992 | Kitayama et al. |
| 5,112,722 A | 5/1992 | Tsujino et al. |
| 5,114,834 A | 5/1992 | Nachshon |
| 5,221,034 A | 6/1993 | Bando |
| 5,256,853 A | 10/1993 | McIntyre |
| 5,265,107 A | 11/1993 | Delfyett, Jr. |
| 5,326,956 A | 7/1994 | Lunney |
| 5,400,350 A | 3/1995 | Galvanauskas |
| 5,410,567 A | 4/1995 | Brundage et al. |
| 5,418,803 A | 5/1995 | Zhiglinsky et al. |
| 5,434,875 A | 7/1995 | Rieger et al. |
| 5,436,925 A | 7/1995 | Lin et al. |
| 5,475,197 A | 12/1995 | Wrobel et al. |
| 5,521,352 A | 5/1996 | Lawson |
| 5,541,774 A | 7/1996 | Blankenbecler |
| 5,553,093 A | 9/1996 | Ramaswamy et al. |
| 5,574,597 A | 11/1996 | Kataoka |
| 5,578,229 A | 11/1996 | Barnekov et al. |
| 5,586,138 A | 12/1996 | Yokoyama |
| 5,656,186 A | 8/1997 | Mourou et al. |
| 5,676,866 A | 10/1997 | Schulte et al. |
| 5,684,642 A | 11/1997 | Zumoto et al. |
| 5,692,703 A | 12/1997 | Murphy et al. |
| 5,696,782 A | 12/1997 | Harter et al. |
| 5,715,346 A | 2/1998 | Liu |
| 5,736,709 A | 4/1998 | Neiheisel |
| 5,776,220 A | 7/1998 | Allaire et al. |
| 5,781,684 A | 7/1998 | Liu |
| 5,796,112 A | 8/1998 | Ichie |
| 5,854,490 A | 12/1998 | Ooaeh et al. |
| 5,854,751 A | 12/1998 | Di et al. |
| 5,878,866 A | 3/1999 | Lisec |
| 5,968,441 A | 10/1999 | Seki |
| 6,003,418 A | 12/1999 | Bezama et al. |
| 6,016,223 A | 1/2000 | Suzuki et al. |
| 6,016,324 A | 1/2000 | Rieger et al. |
| 6,027,062 A | 2/2000 | Bacon et al. |
| 6,033,583 A | 3/2000 | Musket et al. |
| 6,038,055 A | 3/2000 | Haensch et al. |
| 6,055,829 A | 5/2000 | Witzmann et al. |
| 6,078,599 A | 6/2000 | Everage et al. |
| 6,137,632 A | 10/2000 | Bernacki |
| 6,156,030 A | 12/2000 | Neev |
| 6,160,835 A | 12/2000 | Kwon |
| 6,185,051 B1 | 2/2001 | Chen et al. |
| 6,186,384 B1 | 2/2001 | Sawada |
| 6,191,880 B1 | 2/2001 | Schuster |
| 6,210,401 B1 | 4/2001 | Lai |
| 6,256,328 B1 | 7/2001 | Delfyett et al. |
| 6,259,058 B1 | 7/2001 | Hoekstra |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,461,223 B1 | 10/2002 | Bando |
| 6,484,052 B1 | 11/2002 | Visuri et al. |
| 6,489,589 B1 | 12/2002 | Alexander |
| 6,501,576 B1 | 12/2002 | Seacombe |
| 6,501,578 B1 | 12/2002 | Bernstein et al. |
| 6,520,057 B1 | 2/2003 | Steadman |
| 6,552,301 B2 | 4/2003 | Herman et al. |
| 6,573,026 B1 | 6/2003 | Aitken et al. |
| 6,592,703 B1 | 7/2003 | Habeck et al. |
| 6,611,647 B2 | 8/2003 | Berkey et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,151 B1 | 5/2004 | Thompson |
| 6,729,161 B1 | 5/2004 | Miura et al. |
| 6,737,345 B1 | 5/2004 | Lin et al. |

(56) References Cited

U.S. PATENT DOCUMENTS

| | | |
|---|---|---|
| 6,744,009 B1 | 6/2004 | Xuan et al. |
| 6,787,732 B1 | 9/2004 | Xuan et al. |
| 6,791,935 B2 | 9/2004 | Hatano et al. |
| 6,800,237 B1 | 10/2004 | Yamamoto et al. |
| 6,800,831 B1 | 10/2004 | Hoetzel |
| 6,856,379 B2 | 2/2005 | Schuster |
| 6,885,502 B2 | 4/2005 | Schuster |
| 6,904,218 B2 | 6/2005 | Sun et al. |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,102,118 B2 | 9/2006 | Acker et al. |
| 7,187,833 B2 | 3/2007 | Mishra |
| 7,196,841 B2 | 3/2007 | Melzer et al. |
| 7,259,354 B2 | 8/2007 | Pailthorp et al. |
| 7,353,829 B1 | 4/2008 | Wachter et al. |
| 7,402,773 B2 | 7/2008 | Nomaru |
| 7,408,616 B2 | 8/2008 | Gruner et al. |
| 7,408,622 B2 | 8/2008 | Fiolka et al. |
| 7,511,886 B2 | 3/2009 | Schultz et al. |
| 7,535,634 B1 | 5/2009 | Savchenkov et al. |
| 7,555,187 B2 | 6/2009 | Bickham et al. |
| 7,565,820 B2 | 7/2009 | Foster et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 7,794,904 B2 | 9/2010 | Brueck |
| 7,800,734 B2 | 9/2010 | Komatsuda |
| 7,832,675 B2 | 11/2010 | Bumgarner et al. |
| 7,901,967 B2 | 3/2011 | Komura et al. |
| 7,920,337 B2 | 4/2011 | Perchak |
| 7,978,408 B2 | 7/2011 | Sawabe et al. |
| 8,035,803 B2 | 10/2011 | Fiolka |
| 8,035,882 B2 | 10/2011 | Fanton et al. |
| 8,035,901 B2 | 10/2011 | Abramov et al. |
| 8,041,127 B2 | 10/2011 | Whitelaw |
| 8,041,172 B2 | 10/2011 | Sillard et al. |
| 8,068,279 B2 | 11/2011 | Schuster et al. |
| 8,104,385 B2 | 1/2012 | Hayashi et al. |
| 8,118,971 B2 | 2/2012 | Hori et al. |
| 8,123,515 B2 | 2/2012 | Schleelein |
| 8,132,427 B2 | 3/2012 | Brown et al. |
| 8,144,308 B2 | 3/2012 | Muramatsu |
| 8,158,514 B2 | 4/2012 | Krueger et al. |
| 8,164,818 B2 | 4/2012 | Collins et al. |
| 8,168,514 B2 | 5/2012 | Garner et al. |
| 8,194,170 B2 | 6/2012 | Golub et al. |
| 8,211,259 B2 | 7/2012 | Sato et al. |
| 8,218,929 B2 | 7/2012 | Bickham et al. |
| 8,237,918 B2 | 8/2012 | Totzeck et al. |
| 8,245,539 B2 | 8/2012 | Lu et al. |
| 8,245,540 B2 | 8/2012 | Abramov et al. |
| 8,248,600 B2 | 8/2012 | Matousek et al. |
| 8,259,393 B2 | 9/2012 | Fiolka et al. |
| 8,269,138 B2 | 9/2012 | Garner et al. |
| 8,279,524 B2 | 10/2012 | Fiolka et al. |
| 8,283,595 B2 | 10/2012 | Fukuyo et al. |
| 8,283,695 B2 | 10/2012 | Salcedo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,339,578 B2 | 12/2012 | Omura |
| 8,341,976 B2 | 1/2013 | Dejneka et al. |
| 8,347,551 B2 | 1/2013 | Van Der Drift |
| 8,347,651 B2 | 1/2013 | Abramov et al. |
| 8,358,868 B2 | 1/2013 | Iketani |
| 8,358,888 B2 | 1/2013 | Ramachandran |
| 8,379,188 B2 | 2/2013 | Mueller et al. |
| 8,444,905 B2 | 5/2013 | Li et al. |
| 8,444,906 B2 | 5/2013 | Lee et al. |
| 8,448,471 B2 | 5/2013 | Kumatani et al. |
| 8,475,507 B2 | 7/2013 | Dewey et al. |
| 8,482,717 B2 | 7/2013 | Fiolka et al. |
| 8,491,983 B2 | 7/2013 | Ono et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,857 B2 | 1/2014 | Crosbie |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,687,932 B2 | 4/2014 | Peckham et al. |
| 8,697,228 B2 | 4/2014 | Carre et al. |
| 8,720,228 B2 | 5/2014 | Li |
| 8,724,937 B2 | 5/2014 | Barwicz et al. |
| 8,826,696 B2 | 9/2014 | Brown et al. |
| 8,847,112 B2 | 9/2014 | Panarello et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,028,613 B2 | 5/2015 | Kim et al. |
| 9,052,605 B2 | 6/2015 | Van et al. |
| 9,086,509 B2 | 7/2015 | Knutson |
| 9,138,913 B2 | 9/2015 | Arai et al. |
| 9,170,500 B2 | 10/2015 | Van et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,341,912 B2 | 5/2016 | Shrivastava et al. |
| 9,346,706 B2 | 5/2016 | Bazemore et al. |
| 9,446,590 B2 | 9/2016 | Chen et al. |
| 9,477,037 B1 | 10/2016 | Bickham et al. |
| 9,481,598 B2 | 11/2016 | Bergh et al. |
| 9,499,343 B2 | 11/2016 | Cornelissen et al. |
| 9,517,929 B2 | 12/2016 | Hosseini |
| 9,517,963 B2 | 12/2016 | Marjanovic et al. |
| 9,701,581 B2 | 7/2017 | Kangastupa et al. |
| 9,703,167 B2 | 7/2017 | Parker et al. |
| 9,815,730 B2 | 11/2017 | Marjanovic et al. |
| 9,850,160 B2 | 12/2017 | Marjanovic et al. |
| 9,873,628 B1 | 1/2018 | Haloui et al. |
| 9,878,304 B2 | 1/2018 | Kotake et al. |
| 10,190,363 B2 | 1/2019 | Behmke et al. |
| 10,730,783 B2 * | 8/2020 | Akarapu ............ B23K 26/0608 |
| 2001/0019404 A1 | 9/2001 | Schuster et al. |
| 2001/0027842 A1 | 10/2001 | Curcio et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0097488 A1 | 7/2002 | Hay et al. |
| 2002/0110639 A1 | 8/2002 | Bruns |
| 2002/0126380 A1 | 9/2002 | Schuster |
| 2002/0139786 A1 | 10/2002 | Amako et al. |
| 2003/0006221 A1 | 1/2003 | Hong et al. |
| 2003/0007772 A1 | 1/2003 | Borrelli et al. |
| 2003/0007773 A1 | 1/2003 | Kondo et al. |
| 2003/0038225 A1 | 2/2003 | Mulder et al. |
| 2003/0070706 A1 | 4/2003 | Fujioka |
| 2003/0227663 A1 | 12/2003 | Agrawal et al. |
| 2004/0021615 A1 | 2/2004 | Benson et al. |
| 2004/0051982 A1 | 3/2004 | Perchak |
| 2004/0108467 A1 | 6/2004 | Eurlings et al. |
| 2004/0144231 A1 | 7/2004 | Hanada |
| 2004/0218882 A1 | 11/2004 | Bickham et al. |
| 2004/0221615 A1 | 11/2004 | Postupack et al. |
| 2004/0228593 A1 | 11/2004 | Sun et al. |
| 2005/0024743 A1 | 2/2005 | Camy-Peyret |
| 2005/0098458 A1 | 5/2005 | Gruetzmacher et al. |
| 2005/0098548 A1 | 5/2005 | Kobayashi et al. |
| 2005/0115938 A1 | 6/2005 | Sawaki et al. |
| 2005/0116938 A1 | 6/2005 | Ito et al. |

(56) References Cited

U.S. PATENT DOCUMENTS

| | | |
|---|---|---|
| 2005/0205778 A1 | 9/2005 | Kitai et al. |
| 2005/0209898 A1 | 9/2005 | Asai et al. |
| 2005/0231651 A1 | 10/2005 | Myers et al. |
| 2005/0274702 A1 | 12/2005 | Deshi |
| 2005/0277270 A1 | 12/2005 | Yoshikawa et al. |
| 2006/0011593 A1 | 1/2006 | Fukuyo et al. |
| 2006/0021385 A1 | 2/2006 | Cimo et al. |
| 2006/0028706 A1 | 2/2006 | Totzeck et al. |
| 2006/0028728 A1 | 2/2006 | Li |
| 2006/0050261 A1 | 3/2006 | Brotsack |
| 2006/0109874 A1 | 5/2006 | Shiozaki et al. |
| 2006/0118529 A1 | 6/2006 | Aoki et al. |
| 2006/0127679 A1 | 6/2006 | Gulati et al. |
| 2006/0146384 A1 | 7/2006 | Schultz et al. |
| 2006/0151450 A1 | 7/2006 | You et al. |
| 2006/0170617 A1 | 8/2006 | Latypov et al. |
| 2006/0213883 A1 | 9/2006 | Eberhardt et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2006/0291835 A1 | 12/2006 | Nozaki et al. |
| 2007/0021548 A1 | 1/2007 | Hattori et al. |
| 2007/0030471 A1 | 2/2007 | Troost et al. |
| 2007/0044606 A1 | 3/2007 | Kang et al. |
| 2007/0045253 A1 | 3/2007 | Jordens et al. |
| 2007/0051706 A1 | 3/2007 | Bovatsek et al. |
| 2007/0053632 A1 | 3/2007 | Popp |
| 2007/0068648 A1 | 3/2007 | Hu et al. |
| 2007/0090180 A1 | 4/2007 | Griffis et al. |
| 2007/0091977 A1 | 4/2007 | Sohn et al. |
| 2007/0111119 A1 | 5/2007 | Hu et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0209029 A1 | 9/2007 | Ivonin et al. |
| 2007/0228616 A1 | 10/2007 | Bang |
| 2007/0298529 A1 | 12/2007 | Maeda et al. |
| 2008/0000884 A1 | 1/2008 | Sugiura et al. |
| 2008/0050584 A1 | 2/2008 | Noguchi et al. |
| 2008/0079940 A1 | 4/2008 | Sezerman et al. |
| 2008/0087629 A1 | 4/2008 | Shimomura et al. |
| 2008/0099444 A1 | 5/2008 | Misawa et al. |
| 2008/0158529 A1 | 7/2008 | Hansen |
| 2008/0165925 A1 | 7/2008 | Singer et al. |
| 2008/0190981 A1 | 8/2008 | Okajima et al. |
| 2008/0239268 A1 | 10/2008 | Mulder et al. |
| 2008/0309902 A1 | 12/2008 | Rosenbluth |
| 2008/0310465 A1 | 12/2008 | Achtenhagen |
| 2008/0314879 A1 | 12/2008 | Bruland et al. |
| 2008/0318028 A1 | 12/2008 | Winstanley et al. |
| 2009/0013724 A1 | 1/2009 | Koyo et al. |
| 2009/0032510 A1 | 2/2009 | Ando et al. |
| 2009/0033902 A1 | 2/2009 | Mulder et al. |
| 2009/0050661 A1 | 2/2009 | Na et al. |
| 2009/0060437 A1 | 3/2009 | Fini et al. |
| 2009/0091731 A1 | 4/2009 | Ossmann et al. |
| 2009/0104721 A1 | 4/2009 | Hirakata et al. |
| 2009/0157341 A1 | 6/2009 | Cheung |
| 2009/0170286 A1 | 7/2009 | Tsukamoto et al. |
| 2009/0176034 A1 | 7/2009 | Ruuttu et al. |
| 2009/0183764 A1 | 7/2009 | Meyer |
| 2009/0184849 A1 | 7/2009 | Nasiri et al. |
| 2009/0188543 A1 | 7/2009 | Bann |
| 2009/0199694 A1 | 8/2009 | Uh et al. |
| 2009/0212033 A1 | 8/2009 | Beck et al. |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0323160 A1 | 12/2009 | Egerton et al. |
| 2009/0323162 A1 | 12/2009 | Fanton et al. |
| 2009/0324899 A1 | 12/2009 | Feinstein et al. |
| 2009/0324903 A1 | 12/2009 | Rumsby |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0027951 A1 | 2/2010 | Bookbinder et al. |
| 2010/0029460 A1 | 2/2010 | Shojiya et al. |
| 2010/0032087 A1 | 2/2010 | Takahashi et al. |
| 2010/0038349 A1 | 2/2010 | Ke et al. |
| 2010/0046761 A1 | 2/2010 | Henn et al. |
| 2010/0086741 A1 | 4/2010 | Bovatsek et al. |
| 2010/0089631 A1 | 4/2010 | Sakaguchi et al. |
| 2010/0089682 A1 | 4/2010 | Martini et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0145620 A1 | 6/2010 | Georgi et al. |
| 2010/0147813 A1 | 6/2010 | Lei et al. |
| 2010/0206008 A1 | 8/2010 | Harvey et al. |
| 2010/0252538 A1 | 10/2010 | Zeygerman |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0320179 A1 | 12/2010 | Morita et al. |
| 2010/0326138 A1 | 12/2010 | Kumatani et al. |
| 2010/0332087 A1 | 12/2010 | Claffee et al. |
| 2011/0017716 A1 | 1/2011 | Rumsby |
| 2011/0037149 A1 | 2/2011 | Fukuyo et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0111179 A1 | 5/2011 | Blick et al. |
| 2011/0127697 A1 | 6/2011 | Milne |
| 2011/0132581 A1 | 6/2011 | Moss |
| 2011/0132881 A1 | 6/2011 | Liu |
| 2011/0136303 A1 | 6/2011 | Lee |
| 2011/0139760 A1 | 6/2011 | Shah et al. |
| 2011/0143470 A1 | 6/2011 | Lee |
| 2011/0177325 A1 | 7/2011 | Tomamoto et al. |
| 2011/0183116 A1 | 7/2011 | Hung et al. |
| 2011/0191024 A1 | 8/2011 | DeLuca |
| 2011/0210105 A1 | 9/2011 | Romashko et al. |
| 2011/0238308 A1 | 9/2011 | Miller et al. |
| 2011/0240476 A1 | 10/2011 | Wang et al. |
| 2011/0240611 A1 | 10/2011 | Sandstroem |
| 2011/0240617 A1 | 10/2011 | Cho et al. |
| 2011/0277507 A1 | 11/2011 | Lu et al. |
| 2011/0300691 A1 | 12/2011 | Sakamoto et al. |
| 2011/0318555 A1 | 12/2011 | Bookbinder et al. |
| 2012/0017642 A1 | 1/2012 | Teranishi et al. |
| 2012/0026573 A1 | 2/2012 | Collins et al. |
| 2012/0047951 A1 | 3/2012 | Dannoux et al. |
| 2012/0047956 A1 | 3/2012 | Li |
| 2012/0047957 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0106117 A1 | 5/2012 | Sundaram et al. |
| 2012/0111310 A1* | 5/2012 | Ryu ............... B23K 26/0869 |
| | | 125/30.01 |
| 2012/0125588 A1 | 5/2012 | Nam et al. |
| 2012/0131961 A1 | 5/2012 | Dannoux et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0147449 A1 | 6/2012 | Bhatnagar et al. |
| 2012/0196071 A1 | 8/2012 | Cornejo et al. |
| 2012/0196454 A1 | 8/2012 | Shah et al. |
| 2012/0205356 A1 | 8/2012 | Pluess |
| 2012/0211923 A1 | 8/2012 | Garner et al. |

(56) References Cited

U.S. PATENT DOCUMENTS

| | | |
|---|---|---|
| 2012/0214004 A1 | 8/2012 | Hashimoto et al. |
| 2012/0216570 A1 | 8/2012 | Abramov et al. |
| 2012/0229787 A1 | 9/2012 | Van et al. |
| 2012/0234049 A1 | 9/2012 | Bolton |
| 2012/0234807 A1 | 9/2012 | Sercel et al. |
| 2012/0237731 A1 | 9/2012 | Boegli et al. |
| 2012/0255935 A1 | 10/2012 | Kakui et al. |
| 2012/0262689 A1 | 10/2012 | Van et al. |
| 2012/0293784 A1 | 11/2012 | Xalter et al. |
| 2012/0297568 A1 | 11/2012 | Spezzani |
| 2012/0299219 A1 | 11/2012 | Shimoi et al. |
| 2012/0302139 A1 | 11/2012 | Darcangelo et al. |
| 2012/0320458 A1 | 12/2012 | Knutson |
| 2012/0324950 A1 | 12/2012 | Dale et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |
| 2013/0044371 A1 | 2/2013 | Rupp et al. |
| 2013/0047671 A1 | 2/2013 | Kohli |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0071079 A1 | 3/2013 | Peckham et al. |
| 2013/0071080 A1 | 3/2013 | Peckham et al. |
| 2013/0071081 A1 | 3/2013 | Peckham et al. |
| 2013/0075480 A1 | 3/2013 | Yokogi et al. |
| 2013/0078891 A1 | 3/2013 | Lee et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0126751 A1 | 5/2013 | Mizoguchi et al. |
| 2013/0129947 A1 | 5/2013 | Harvey et al. |
| 2013/0133367 A1 | 5/2013 | Abramov et al. |
| 2013/0136408 A1 | 5/2013 | Bookbinder et al. |
| 2013/0139708 A1 | 6/2013 | Hotta |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0171425 A1 | 7/2013 | Wang et al. |
| 2013/0174607 A1 | 7/2013 | Wootton et al. |
| 2013/0174610 A1 | 7/2013 | Teranishi et al. |
| 2013/0177033 A1 | 7/2013 | Muro et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0216573 A1 | 8/2013 | Trusheim et al. |
| 2013/0220982 A1 | 8/2013 | Thomas et al. |
| 2013/0221053 A1 | 8/2013 | Zhang |
| 2013/0222877 A1 | 8/2013 | Greer et al. |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0248504 A1 | 9/2013 | Kusuda |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2013/0344684 A1 | 12/2013 | Bowden |
| 2014/0023087 A1 | 1/2014 | Czompo |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0076869 A1 | 3/2014 | Lee et al. |
| 2014/0083986 A1 | 3/2014 | Zhang et al. |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1 | 5/2014 | Fernando et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0182125 A1 | 7/2014 | Rozbicki et al. |
| 2014/0199519 A1 | 7/2014 | Schillinger et al. |
| 2014/0216108 A1 | 8/2014 | Wiegel et al. |
| 2014/0238962 A1 | 8/2014 | Nawrodt et al. |
| 2014/0239034 A1 | 8/2014 | Cleary et al. |
| 2014/0239552 A1 | 8/2014 | Srinivas et al. |
| 2014/0290310 A1 | 10/2014 | Green |
| 2014/0291122 A1 | 10/2014 | Bando |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0352400 A1 | 12/2014 | Barrilado et al. |
| 2014/0361463 A1 | 12/2014 | Desimone et al. |
| 2015/0014891 A1 | 1/2015 | Amatucci et al. |
| 2015/0034612 A1 | 2/2015 | Hosseini et al. |
| 2015/0038313 A1 | 2/2015 | Hosseini |
| 2015/0044445 A1 | 2/2015 | Garner et al. |
| 2015/0059986 A1 | 3/2015 | Komatsu et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0121960 A1 | 5/2015 | Hosseini |
| 2015/0122656 A1 | 5/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Mattson et al. |
| 2015/0165548 A1 | 6/2015 | Marjanovic et al. |
| 2015/0165560 A1 | 6/2015 | Hackert et al. |
| 2015/0165561 A1 | 6/2015 | Le et al. |
| 2015/0165562 A1* | 6/2015 | Marjanovic ........ B23K 26/0738 428/64.1 |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0209922 A1 | 7/2015 | Yoshikawa |
| 2015/0232369 A1 | 8/2015 | Marjanovic et al. |
| 2015/0299018 A1 | 10/2015 | Bhuyan et al. |
| 2015/0311058 A1 | 10/2015 | Antsiferov et al. |
| 2015/0350991 A1 | 12/2015 | Sayadi et al. |
| 2015/0352671 A1 | 12/2015 | Darzi |
| 2015/0360991 A1 | 12/2015 | Grundmueller et al. |
| 2015/0362817 A1 | 12/2015 | Patterson et al. |
| 2015/0362818 A1 | 12/2015 | Greer |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0009585 A1 | 1/2016 | Bookbinder et al. |
| 2016/0016257 A1 | 1/2016 | Hosseini |
| 2016/0023922 A1 | 1/2016 | Addiego et al. |
| 2016/0031737 A1 | 2/2016 | Hoppe et al. |
| 2016/0031745 A1 | 2/2016 | Ortner et al. |
| 2016/0039044 A1 | 2/2016 | Kawaguchi |
| 2016/0059359 A1 | 3/2016 | Krueger et al. |
| 2016/0060156 A1 | 3/2016 | Krueger et al. |
| 2016/0097960 A1 | 4/2016 | Dixit et al. |
| 2016/0138328 A1 | 5/2016 | Behmke et al. |
| 2016/0152516 A1 | 6/2016 | Bazemore et al. |
| 2016/0154284 A1 | 6/2016 | Sano |
| 2016/0159679 A1 | 6/2016 | West |

(56) References Cited

U.S. PATENT DOCUMENTS

| | | |
|---|---|---|
| 2016/0168396 A1 | 6/2016 | Letocart et al. |
| 2016/0279895 A1 | 9/2016 | Marjanovic et al. |
| 2016/0280580 A1 | 9/2016 | Bohme |
| 2016/0282521 A1 | 9/2016 | Uchiyama et al. |
| 2016/0290791 A1 | 10/2016 | Buono et al. |
| 2016/0311717 A1 | 10/2016 | Nieber et al. |
| 2016/0368100 A1 | 12/2016 | Marjanovic et al. |
| 2017/0002601 A1 | 1/2017 | Bergh et al. |
| 2017/0008791 A1 | 1/2017 | Kim et al. |
| 2017/0052381 A1* | 2/2017 | Huang ............... B23K 26/073 |
| 2017/0100801 A1 | 4/2017 | Becker et al. |
| 2017/0169847 A1 | 6/2017 | Tamaki |
| 2017/0183168 A1 | 6/2017 | Jia |
| 2017/0197868 A1 | 7/2017 | Gupta et al. |
| 2017/0225996 A1 | 8/2017 | Bookbinder et al. |
| 2017/0252859 A1 | 9/2017 | Kumkar et al. |
| 2017/0355634 A1 | 12/2017 | Dumenil |
| 2017/0368638 A1 | 12/2017 | Tayebati et al. |
| 2018/0029919 A1 | 2/2018 | Schnitzler et al. |
| 2018/0029920 A1 | 2/2018 | Marjanovic et al. |
| 2018/0062342 A1 | 3/2018 | Comstock et al. |
| 2018/0118602 A1 | 5/2018 | Hackert et al. |
| 2018/0133837 A1 | 5/2018 | Greenberg et al. |
| 2018/0134606 A1 | 5/2018 | Wagner et al. |
| 2018/0186677 A1 | 7/2018 | Ito et al. |
| 2018/0186678 A1 | 7/2018 | Boeker et al. |
| 2018/0297887 A1 | 10/2018 | Spier et al. |

FOREIGN PATENT DOCUMENTS

| | | | |
|---|---|---|---|
| CN | 1517313 | A | 8/2004 |
| CN | 1573364 | A | 2/2005 |
| CN | 1619778 | A | 5/2005 |
| CN | 1735568 | A | 2/2006 |
| CN | 1283409 | C | 11/2006 |
| CN | 1930097 | A | 3/2007 |
| CN | 101048255 | A | 10/2007 |
| CN | 101386466 | A | 3/2009 |
| CN | 101502914 | A | 8/2009 |
| CN | 101610870 | A | 12/2009 |
| CN | 201357287 | Y | 12/2009 |
| CN | 101637849 | A | 2/2010 |
| CN | 201471092 | U | 5/2010 |
| CN | 101862907 | A | 10/2010 |
| CN | 101965242 | A | 2/2011 |
| CN | 102046545 | A | 5/2011 |
| CN | 102060437 | A | 5/2011 |
| CN | 102248302 | A | 11/2011 |
| CN | 102272355 | A | 12/2011 |
| CN | 102326232 | A | 1/2012 |
| CN | 102343631 | A | 2/2012 |
| CN | 102356049 | A | 2/2012 |
| CN | 102356050 | A | 2/2012 |
| CN | 102574246 | A | 7/2012 |
| CN | 102596830 | A | 7/2012 |
| CN | 102642092 | A | 8/2012 |
| CN | 102649199 | A | 8/2012 |
| CN | 102672355 | A | 9/2012 |
| CN | 102674709 | A | 9/2012 |
| CN | 102898014 | A | 1/2013 |
| CN | 102916081 | A | 2/2013 |
| CN | 102923939 | A | 2/2013 |
| CN | 102962583 | A | 3/2013 |
| CN | 103013374 | A | 4/2013 |
| CN | 103079747 | A | 5/2013 |
| CN | 103143841 | A | 6/2013 |
| CN | 103159401 | A | 6/2013 |
| CN | 203021443 | U | 6/2013 |
| CN | 103237771 | A | 8/2013 |
| CN | 103273195 | A | 9/2013 |
| CN | 103316990 | A | 9/2013 |
| CN | 103359947 | A | 10/2013 |
| CN | 103359948 | A | 10/2013 |
| CN | 103531414 | A | 1/2014 |
| CN | 103746027 | A | 4/2014 |
| CN | 203509350 | U | 4/2014 |
| CN | 103831539 | A | 6/2014 |
| CN | 104344202 | A | 2/2015 |
| CN | 105081564 | A | 11/2015 |
| CN | 105246850 | A | 1/2016 |
| CN | 103224117 | B | 2/2016 |
| CN | 105392593 | A | 3/2016 |
| DE | 1020448 | B | 12/1957 |
| DE | 2231330 | A1 | 1/1974 |
| DE | 10322376 | A1 | 12/2004 |
| DE | 102006042280 | A1 | 6/2007 |
| DE | 102006035555 | A1 | 1/2008 |
| DE | 102011000768 | A1 | 8/2012 |
| DE | 102012010635 | A1 | 11/2013 |
| DE | 102012110971 | A1 | 5/2014 |
| DE | 102013103370 | A1 | 10/2014 |
| DE | 102013223637 | A1 | 5/2015 |
| DE | 102014213775 | A1 | 1/2016 |
| DE | 102014116958 | A1 | 5/2016 |
| DE | 102016102768 | A1 | 8/2017 |
| EA | 004167 | B1 | 2/2004 |
| EP | 0270897 | A1 | 6/1988 |
| EP | 0609978 | A1 | 8/1994 |
| EP | 0656241 | A1 | 6/1995 |
| EP | 0938946 | A1 | 9/1999 |
| EP | 0949541 | A2 | 10/1999 |
| EP | 1043110 | A2 | 10/2000 |
| EP | 1159104 | A1 | 12/2001 |
| EP | 1306196 | A1 | 5/2003 |
| EP | 1609559 | A1 | 12/2005 |
| EP | 1990125 | A1 | 11/2008 |
| EP | 2105239 | A1 | 9/2009 |
| EP | 2133170 | A1 | 12/2009 |
| EP | 2202545 | A1 | 6/2010 |
| EP | 2258512 | A1 | 12/2010 |
| EP | 2398746 | A1 | 12/2011 |
| EP | 2574983 | A1 | 4/2013 |
| EP | 2754524 | A1 | 7/2014 |
| EP | 2781296 | A1 | 9/2014 |
| EP | 2783784 | A2 | 10/2014 |
| EP | 2859984 | A2 | 4/2015 |
| EP | 2922793 | A1 | 9/2015 |
| EP | 3311947 | A1 | 4/2018 |
| FR | 2989294 | A1 | 10/2013 |
| GB | 0768515 | A | 2/1957 |
| GB | 1242172 | A | 8/1971 |
| GB | 2481190 | A | 12/2011 |
| JP | 53-018756 | A | 2/1978 |
| JP | 61-027212 | A | 2/1986 |
| JP | 62-046930 | A | 2/1987 |
| JP | 63-018756 | A | 1/1988 |
| JP | 64-077001 | A | 3/1989 |
| JP | 01-179770 | A | 7/1989 |
| JP | 05-274085 | A | 10/1993 |
| JP | 05-300544 | A | 11/1993 |
| JP | 06-082720 | A | 3/1994 |
| JP | 06-318756 | A | 11/1994 |
| JP | 08-184581 | A | 7/1996 |
| JP | 09-106243 | A | 4/1997 |
| JP | 09-109243 | A | 4/1997 |
| JP | 11-079770 | A | 3/1999 |
| JP | 11-197498 | A | 7/1999 |
| JP | 11-269683 | A | 10/1999 |
| JP | 11-330597 | A | 11/1999 |
| JP | 11-347758 | A | 12/1999 |
| JP | 2000-225485 | A | 8/2000 |
| JP | 2000-327349 | A | 11/2000 |
| JP | 2001-130921 | A | 5/2001 |
| JP | 2001-138083 | A | 5/2001 |
| JP | 2001-179473 | A | 7/2001 |
| JP | 2002-045985 | A | 2/2002 |
| JP | 2002-210730 | A | 7/2002 |
| JP | 2002-228818 | A | 8/2002 |
| JP | 2002-321081 | A | 11/2002 |
| JP | 2003-025085 | A | 1/2003 |
| JP | 2003-062756 | A | 3/2003 |
| JP | 2003-088985 | A | 3/2003 |
| JP | 2003-114400 | A | 4/2003 |
| JP | 2003-154517 | A | 5/2003 |

(56) References Cited

FOREIGN PATENT DOCUMENTS

| | | |
|---|---|---|
| JP | 2003-181668 A | 7/2003 |
| JP | 2003-238178 A | 8/2003 |
| JP | 3445250 B2 | 9/2003 |
| JP | 2003-340579 A | 12/2003 |
| JP | 2004-182530 A | 7/2004 |
| JP | 2004-209675 A | 7/2004 |
| JP | 2004-348137 A | 12/2004 |
| JP | 2005-000952 A | 1/2005 |
| JP | 2005-104819 A | 4/2005 |
| JP | 2005-135964 A | 5/2005 |
| JP | 2005-144487 A | 6/2005 |
| JP | 2005-179154 A | 7/2005 |
| JP | 2005-205440 A | 8/2005 |
| JP | 2005-219960 A | 8/2005 |
| JP | 2005-263623 A | 9/2005 |
| JP | 2005-288503 A | 10/2005 |
| JP | 2006-108478 A | 4/2006 |
| JP | 2006-130691 A | 5/2006 |
| JP | 3775250 B2 | 5/2006 |
| JP | 3775410 B2 | 5/2006 |
| JP | 2006-150385 A | 6/2006 |
| JP | 2006-182009 A | 7/2006 |
| JP | 2006-240948 A | 9/2006 |
| JP | 2006-248885 A | 9/2006 |
| JP | 3823108 B2 | 9/2006 |
| JP | 2006-327711 A | 12/2006 |
| JP | 2007-021548 A | 2/2007 |
| JP | 2007-196277 A | 8/2007 |
| JP | 2007-253203 A | 10/2007 |
| JP | 2008-018547 A | 1/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009-056482 A | 3/2009 |
| JP | 2009-084089 A | 4/2009 |
| JP | 2009-172633 A | 8/2009 |
| JP | 2009-255114 A | 11/2009 |
| JP | 2009-269057 A | 11/2009 |
| JP | 2010-017990 A | 1/2010 |
| JP | 2010-042424 A | 2/2010 |
| JP | 4418282 B2 | 2/2010 |
| JP | 2010-046761 A | 3/2010 |
| JP | 4592855 B2 | 12/2010 |
| JP | 2011-011212 A | 1/2011 |
| JP | 2011-037707 A | 2/2011 |
| JP | 2011-049398 A | 3/2011 |
| JP | 4672689 B2 | 4/2011 |
| JP | 2011-517299 A | 6/2011 |
| JP | 2011-138083 A | 7/2011 |
| JP | 2011-520748 | 7/2011 |
| JP | 2011-147943 A | 8/2011 |
| JP | 2011-240291 A | 12/2011 |
| JP | 2012-024782 A | 2/2012 |
| JP | 2012-031018 A | 2/2012 |
| JP | 4880820 B2 | 2/2012 |
| JP | 2012-506837 | 3/2012 |
| JP | 2012-159749 A | 8/2012 |
| JP | 2012-517957 A | 8/2012 |
| JP | 2012-521889 | 9/2012 |
| JP | 2012-187618 A | 10/2012 |
| JP | 2012-232894 A | 11/2012 |
| JP | 2013-007842 A | 1/2013 |
| JP | 2013-031879 A | 2/2013 |
| JP | 2013-043808 A | 3/2013 |
| JP | 2013-063863 A | 4/2013 |
| JP | 2013-075802 A | 4/2013 |
| JP | 2013-091578 A | 5/2013 |
| JP | 2013-121908 A | 6/2013 |
| JP | 2013-136075 A | 7/2013 |
| JP | 2013-528492 A | 7/2013 |
| JP | 2013-150990 A | 8/2013 |
| JP | 2013-168445 A | 8/2013 |
| JP | 5274085 B2 | 8/2013 |
| JP | 2013-187247 A | 9/2013 |
| JP | 2013-536081 A | 9/2013 |
| JP | 5300544 B2 | 9/2013 |
| JP | 2013-203630 A | 10/2013 |
| JP | 2013-203631 A | 10/2013 |
| JP | 2013-223886 A | 10/2013 |
| JP | 5318748 B2 | 10/2013 |
| JP | 2013-245153 A | 12/2013 |
| JP | 2014-001102 A | 1/2014 |
| JP | 2014-104484 A | 6/2014 |
| JP | 2014-156289 A | 8/2014 |
| JP | 2015-030040 A | 2/2015 |
| JP | 2015-091606 A | 5/2015 |
| JP | 2015-129076 A | 7/2015 |
| JP | 2015-519722 A | 7/2015 |
| JP | 2015-536896 A | 12/2015 |
| JP | 2015-543336 | 2/2016 |
| JP | 2016-021077 A | 2/2016 |
| JP | 2016-503383 A | 2/2016 |
| JP | 6061193 B2 | 1/2017 |
| KR | 10-2002-0031573 A | 5/2002 |
| KR | 10-2009-0057161 A | 6/2009 |
| KR | 10-2009-0107417 A | 10/2009 |
| KR | 2010-0120297 A | 11/2010 |
| KR | 10-1020621 B1 | 3/2011 |
| KR | 10-2011-0120862 A | 11/2011 |
| KR | 2011-0121637 A | 11/2011 |
| KR | 10-2012-0000073 A | 1/2012 |
| KR | 10-2012-0015366 A | 2/2012 |
| KR | 10-1120471 B1 | 3/2012 |
| KR | 10-2012-0074508 A | 7/2012 |
| KR | 2012-0102675 A | 9/2012 |
| KR | 2013-0031377 A | 3/2013 |
| KR | 2013-0031380 A | 3/2013 |
| KR | 10-1259349 B1 | 4/2013 |
| KR | 10-1269474 B1 | 5/2013 |
| KR | 2013-0079395 A | 7/2013 |
| KR | 10-2013-0111269 A | 10/2013 |
| KR | 10-2013-0124646 A | 11/2013 |
| KR | 10-2013-0135873 A | 12/2013 |
| KR | 10-1344368 B1 | 12/2013 |
| KR | 10-2014-0022980 A | 2/2014 |
| KR | 10-2014-0022981 A | 2/2014 |
| KR | 10-2014-0064220 A | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201139025 A | 11/2011 |
| TW | I362370 B | 4/2012 |
| TW | 201226345 A | 7/2012 |
| TW | 201311592 A | 3/2013 |
| TW | 201331136 A | 8/2013 |
| TW | 201339111 A | 10/2013 |
| TW | 201436968 A | 10/2014 |
| TW | I468354 B | 1/2015 |
| TW | I520804 B | 2/2016 |
| WO | 98/21154 A1 | 5/1998 |
| WO | 99/29243 A1 | 6/1999 |
| WO | 99/63900 A1 | 12/1999 |
| WO | 00/51778 A1 | 9/2000 |
| WO | 02/39063 A1 | 5/2002 |
| WO | 20031007370 A1 | 1/2003 |
| WO | 2004/110693 A1 | 12/2004 |
| WO | 2006/017583 A2 | 2/2006 |
| WO | 2006/073098 A1 | 7/2006 |
| WO | 2007/094160 A1 | 8/2007 |
| WO | 2007/119740 A1 | 10/2007 |
| WO | 2008/012186 A1 | 1/2008 |
| WO | 2008/049389 A1 | 5/2008 |
| WO | 2008/080182 A1 | 7/2008 |
| WO | 2008/102848 A1 | 8/2008 |
| WO | 2008/108332 A1 | 9/2008 |
| WO | 2008/128612 A1 | 10/2008 |
| WO | 2009/012913 A1 | 1/2009 |
| WO | 2009/114372 A2 | 9/2009 |
| WO | 2009/114375 A2 | 9/2009 |
| WO | 2009/119694 A1 | 10/2009 |

(56) References Cited

FOREIGN PATENT DOCUMENTS

| | | |
|---|---|---|
| WO | 2010/035736 A1 | 4/2010 |
| WO | 2010/096359 A1 | 8/2010 |
| WO | 2010/111609 A2 | 9/2010 |
| WO | 2010/129459 A2 | 11/2010 |
| WO | 2011/025908 A1 | 3/2011 |
| WO | 2011/056781 A1 | 5/2011 |
| WO | 2012/006736 A2 | 1/2012 |
| WO | 2012/075072 A2 | 6/2012 |
| WO | 2012/108052 A1 | 8/2012 |
| WO | 2012/166753 A1 | 12/2012 |
| WO | 2013/016157 A1 | 1/2013 |
| WO | 2013/022148 A1 | 2/2013 |
| WO | 2013/043173 A1 | 3/2013 |
| WO | 2013/084877 A1 | 6/2013 |
| WO | 2013/084879 A1 | 6/2013 |
| WO | 2013/138802 A1 | 9/2013 |
| WO | 2013/150990 A1 | 10/2013 |
| WO | 2013/153195 A1 | 10/2013 |
| WO | 2014/010490 A1 | 1/2014 |
| WO | 2014/012125 A1 | 1/2014 |
| WO | 2014/028022 A1 | 2/2014 |
| WO | 2014/058663 A1 | 4/2014 |
| WO | 2014/064492 A1 | 5/2014 |
| WO | 2014/075995 A2 | 5/2014 |
| WO | 2014/079478 A1 | 5/2014 |
| WO | 2014/079570 A1 | 5/2014 |
| WO | 2014/085663 A1 | 6/2014 |
| WO | 2014/111385 A1 | 7/2014 |
| WO | 2014/111794 A1 | 7/2014 |
| WO | 2014/121261 A1 | 8/2014 |
| WO | 2014/161534 A2 | 10/2014 |
| WO | 2014/161535 A2 | 10/2014 |
| WO | 2015/077113 A1 | 5/2015 |
| WO | 2015/094898 A2 | 6/2015 |
| WO | 2015/095088 A1 | 6/2015 |
| WO | 2015/095090 A1 | 6/2015 |
| WO | 2015/095146 A1 | 6/2015 |
| WO | 2015/095151 A2 | 6/2015 |
| WO | 2015/114032 A1 | 8/2015 |
| WO | 2015/127583 A1 | 9/2015 |
| WO | 2015/128833 A1 | 9/2015 |
| WO | 2015/132008 A1 | 9/2015 |
| WO | 2016/005455 A1 | 1/2016 |
| WO | 2016/007843 A1 | 1/2016 |
| WO | 2016/010954 A2 | 1/2016 |
| WO | 2016/079275 A1 | 5/2016 |
| WO | 2016/089799 A1 | 6/2016 |
| WO | 2016/100954 A1 | 6/2016 |
| WO | 2016/154284 A1 | 9/2016 |
| WO | 2017/009149 A1 | 1/2017 |
| WO | 2017/079570 A2 | 5/2017 |
| WO | 2017/091529 A1 | 6/2017 |
| WO | 2017/093393 A1 | 6/2017 |

OTHER PUBLICATIONS

"EagleEtch" Product Brochure, EuropeTec USA Inc., pp. 1-8, Aug. 1, 2014.
"TruMicro 5000" Product Manual, Trumpf Laser GmbH +Co.KG, pp. 1-4, Aug. 2011.
"Pharos High-power femtosecond laser system" product brochure; Light Conversion, Vilnius, LT; Apr. 18, 2011, pp. 1-2.
Abakians, H. et al.; Evaporative Cutting of a Semitransparent Body With a Moving CW Laser; Journal of Heat Transfer; Nov. 1988; pp. 924-930; vol. 110; ASME.
Abramov, A. et al.; Laser separation of chemically strengthened glass; ScienceDirect Physics Procedia; 2010; pp. 285-290; vol. 5; Elsevier B.V.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Amended claims 1, 2 Amended Claims (Nov. 21, 2018) GMvp4 p. 1.
Analyse of claims 1-11 GMvP7 p. 1.
Arimoto, R. et al.; Imaging properties of axicon in a scanning optical system; Applied Optics; Nov. 1, 1991; pp. 6653-6657; vol. 31, No. 31; Optical Society of America.
Bagchi, "Fast Ion Beams From Intense, Fennosecond Laser Irradiated Nanostructured Surfaces," Appl. Phys. B88: 167-173(2007).
Betriebsanleitung TruMicro Series 5000, "Ausgabe May 2008 Betriebsanleitung TruMicro Series 5000_Anlage E2a-1.pdf".
Betriebsanleitung; TruMicro 5000; Aug. 2011; pp. 1-4.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Bhuyan et al., Single shot high aspect ratio bulk nanostructuring of fused silica using chirp-controlled ultrafast laser Bessel beams, Applied Physics Letters 104, 021107, Jan. 2014 (Year: 2014).
Bhuyan, "Laser micro and nanostructuring using femtosecond Bessel beams." Eur. Phys. J Special Topics 199: 101-110 (2011.).
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices Release R5 (https://web.archive.org/web/20131006050442/https://developer.apple.com/resources/cases/Case-Design-Guidelines.pdf; archived on Oct. 6, 2013).
Case Design Guidelines for Apple Devices; Sep. 13, 2013; pp. 1-58; Apple Inc.
Case study: Simulation einer Beschneidung des Femfelds eines Bessel-Gauß-Strahls GMvP6 p. 1.
Chiao, R. Y. et al.; Self-Trapping of Optical Beams; Physical Review Letters; Oct. 12, 1964; pp. 479-482; vol. 13, No. 15.
Claim 1—published on Nov. 20, 2019 EP947: Anspruch 1—erteilt am 20. Nov. 2019 GMvp5 p. 1.
Coming 1737 AMLCD Glass Substrates Material Information; Aug. 2002; pp. MIE 101-1-MIE 101-3; Corning Incorporated.
Corning Inc., Corning Eagle2000TM AMLCD Glass Substrates Material Information, issued Apr. 2005. (Year: 2005).
Couairon, A. et al.; Femtosecond filamentation in transparent media; ScienceDirect Physical Reports; Feb. 6, 2007; pp. 47-189; vol. 441; Elsevier B.V.
Courvoisier et al "Applications of femtosecond Bessel beams to laser ablation" Applied Physics A (2013) 112, p. 29-34.
Courvoisier, "Surface nanoprocessing with nondiffracting femtosecond Bessel beams." Optics Letters, vol. 34, No. 20, 3163-3165, Oct. 15, 2009.
Cubeddu et al, "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al, "Compact tissue oximeter based on dual-wavelength multichannel time-resolved reflectance"; Applied Optics, vol. 38, No. 16, Jun. 1, 1999, pp. 3670-3680.
D5 Claims GMvP2 p. 1.
D6 Amended claim 1 EP947: Anspruch 1—geandert am 21. Nov. 2018 GMvp3 p. 1.
Ding et al, "High-resolution optical coherence tomography over a large depth range with an axicon lens"; Optic Letters, vol. 27, No. 4, pp. 243-245, Feb. 15, 2002, Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Lid.
Duocastella, M. et al.; Bessel and annular beams for materials processing; Laser & Photonics Reviews; 2012; gs. 607-621; vol. 6, No. 5.
Dumin, J.; Exact solutions for nondiffracting beams. I. The scalar theory; J. Opt. Soc. Am. A; Apr. 1987; pp. 651-654; vol. 4, No. 4; Optical Society of America.

(56) References Cited

OTHER PUBLICATIONS

EagleEtch; TheAnti-glare Glass for Technical Display Applications; Glass and Polymer Technologies; pp. 1-8; EuropTec USA Inc.
Eaton et al. "Heat accumulation effects in femtosecond laser written waveguides with variable repetition rates", Opt. Exp. 5280, vol. 14, No. 23 Jun. 2006.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Faccio et al. "Kerr-induced spontaneous Bessel beam formation in the regime of strong two-photon absorption" Optics Express 16(11) 2008, pp. 8213-8218.
Flamm et al., "Higher-order Bessel-like Beams for Optimized Ultrafast Processing of Transparent Materials" GMvP 19.
Flamm et al., "Higher-order Bessel-like Beams for Optimized Ultrafast Processing of Transparent Materials" GMvP 20.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer et al., "Ultrafast-laser driven micro-explosions in transparent materiamaterials"; Applied Physics Letters, vol. 71 (1997), pp. 882-884.
Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.
Golub, I.; Fresnel axicon; Optics Letters; Jun. 15, 2006; pp. 1890-1892;. vol. 31, No. 12; Optical Society of Ameriec.
Gori, F. et al.; Analytical derivation of the optimum triplicator; Optics Communications; Dec. 1, 1998; pp. 13-16; vol. 157; Elsevier B.V.
GT ASF Grown Sapphire Cover and Touch Screen Material; wvvw.gtat.com, 2012; pp. 1-2; GTAT Corporation.
U.S. Appl. No. 62/137,443, "Laser Cutting and Processing of Display Glass Compositions", filed Mar. 24, 2015., U.S. Appl. No. 62/137,443.
Unichains, Engineering Manual: Innovative Belt & Chain solutions for every industry and application, available publically at least as of Jun. 1, 2015 as evidenced at the following hyperlink: https://web.archive.org/web/20160601OOOOOO/http://www.unichains.com/.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag(1997).
Velpula, "Ultrafast imaging of free carriers: controlled excitation with chirped ultrafast laser Bessel beams." Prof of SPIE vol. 8967, : 896711-1-896711-8, (2014.).
Wang et al, "Investigation on CO2 laser irradiation inducing glass strip peeling for microchannel formation", Biomicrofluidics 6, 012820 (2012).
What is the difference between Ra and RMS?; Harrison Electropolishing LP; (http://www.harrisonep.com/electropolishingra.html), Accessed Aug. 8, 2016.
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 30 laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.

Zeng, D. et at.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
ICNIRP, Infrared Radiation, https://www.icnirp.org/en/frequencies/infrared/index.html#:~:text=Wavelength, accessed Apr. 7, 2021 (Year: 2014).
Liu,Xiuwen, "Graphical Audio-Visual Technology Tips", Apr. 30, 2006, pp. 58-59. (Original Document Only).
Tian e al., "Development status and Prospects of TFT-LCD Substrate Glass Chemical Composition", vol. 29, No. 6, 2010, pp. 1348-1362 (English Abstract Submitted).
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155. High aspect ratio machining . . . Anlage E8-1.pdf.
Honda et al. "A Novel Polymer Film that Controls Light Transmission", Progress in Pacific Polymer Science 3, 159-169 (1994).
http://www.gtat.com/Collateral/Documents/Engltsh-US/Sapphire/12-21-12_GT_TnuchScreen_ V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Jonas Weiss, et al., "Optical Interconnects for Disaggregated Resources in Future Datacenters", ECOC 2014, Cannes-France, 3 pgs.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Kerr. "Filamentary tracks formed in transparent optical glass by laser beam self-focusing. II. Theoretical Analysis" Physical Review A., 4(3) 1971, pp. 1196-1218.
Kosareva et al., "Formation of extended plasma channels in a condensed medium upon axicon focusing of a femtosecond laser pulse", Quantum Electronics 35 (22) 1013-1014 (2005), Kvantovaya Elektronika and Turpion Ltd., doi: 10.1070/QE2005v035n11ABEH013031.
Kroger et al., "Structuring of dielectric and metallic materials with ultrashort laser pulses between 20 fs and 3 ps"; SPIE vol. 2991, 0277-786X/97, pp. 40-47.
Kruger, et al., "Laser micromachining of barium aluminum borosilicate glass with pulse durations between 20 fs and 3 ps,", Applied Surface Science, 127-129(1998), 892-898.
Kruger, J. et al.; Femtosecond-pulse visible laser processing of transparent materials; Applied Surface Science; 1996; pp. 430-438; Elsevier B.V.
Lapczyna et al., "Ultra high repetition rate (133 MHz) laser ablation of aluminum with 1.2-ps. pulses"; Applied Physics A 69 [Suppl.], S883-S886, Springer-Verlag (1999); doi: 10.1007/s003399900300.
Levy, U. et al.: Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise, G. et al.; Angular selective window coatings; theory and experiments; J_ Phys. D: Appl. Phys.; 1997; pp. 2103-2122; vol. 30; IOP Publishing Lid.

(56) References Cited

OTHER PUBLICATIONS

McGloin, D. et al.; Bessel beams: diffraction in a new light; Contemporary Physics; Jan.-Feb. 2005; pp. 15-28; vol. 46; Taylor & Francis Ltd.

Merkmalsgliederung Patentanspruch 1 des Streitpatents, "Merkmalsgliederung Patentanspruch 1 _Anlage E15-1.pd1".

Merkmalsgliederung Patentanspruch 12 des Streitpatents,"Merkmalsgliederung Patentanspruch 12 _Anlage E16-1.pdf".

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Norm: DI N EN ISO 11146-2, 2005 DIN EN ISO 11146-2 May 2, 2005 GMvP 21 pages.

Norm: DIN EN ISO 11146-1, 2005 GMvP DIN EN ISO 11146:Sep. 1999 Apr. 1, 2005 GMvP 23 pages.

Norm: ISO/TR 11146-3 , Technical Report First edition GMvP Norm-TR 1 Pages.

Perry et al., "Ultrashort-pulse laser machining of dielectric materials"; Journal of Applied Physics, vol. 85, No. 9, May 1999, American Institute of Physics, pp. 6803-6810.

Perry et al., "Ultrashort-pulse laser machining"; UCRL-10-132159, Sep. 1998, pp. 1-38.

Perry et al., "Ultrashort-pulse laser machining"; UCRL-JC-132159 Rev 1., Jan. 22, 1999, pp. 1-24.

Perry, M. et al.; Ultrashort-Pulse Laser Machining; International Congress on Applications of Lasers and Electro-Optics; Orlando, Florida; Nov. 16-19, 1998; pp. 1-24.

Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).

Polynkin et al, "Extended filamentation with temporally chirped femtosecond Bessel-Gauss beams in air"; Optics Express, vol. 17, No. 2, Jan. 19, 2009, OSA, pp. 575-584.

Product Data Sheet for Corning Eagle XG Slim Glass, Issued Aug. 2013; 2 Pages.

Product data sheet for Corning Eagle XR glass substrate, issued Jan. 2006 (Year: 2006).

Produktbeschreibung Pharos Laser vom Apr. 18, 2011, "Pharos_ 2011 Anlage E 1 a-1. pdf".

U.S. Appl. No. 62/208,282, filed Aug. 21, 2015.

Romero et al. "Theory of optimal beam splitting by phase gratings. II. Square and hexagonal gratings" J. Opt. Soc. Am. A/vol. 24 No. 8 (2007) pp. 2296-2312.

Salleo, A. et al.; Machining of transparent materials using an IR and UV nanosecond pulsed laser; Applied Physics a Materials Science & Processing; Sep. 20, 2000; pp. 601-608; vol. 71; Springer-Verlag.

Serafetinides et al., "Ultra-short pulsed laser ablation of polymers"; Applied Surface Science 180 (2001) 42-56.

Serafetinides et al., "Polymer ablation by ultra-short pulsed lasers" Proceedings of SPIE vol. 3885 (2000) http://proceedings.spiedigitallibrary.org/. pp. 409-415.

Shah, L. et al.; Micromachining with a High Repetition Rate Femtosecond Fiber Laser; JLMN—Journal of Laser Micro/ Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).

Sukumaran, "Through-Package-Via Formation and Metallization of Glass Interposers.", Electronic Components and Technology Conference: 557-563, (2010.).

Sundaram, S. et al.; Inducing and probing non-thermal transitions in semiconductors using femtosecond laser pulses; Nature Materials; Dec. 2002; pp. 217-224; vol. 1; Nature Publishing Group.

Thiele, E.; Relation between Catalytic Activity and Size of Particle; Industrial and Engineering Chemistry; Jul. 1939; pp. 916-920; vol. 31, No. 7.

Toytman et al. "Optical breakdown in transparent media with adjustable axial length and location", Optics Express vol. 18 No. 24, 24688-24698 (2010).

Tymon Barwicz, et al., "Assembly of Mechanically Compliant Interfaces between Optical Fibers and Nanophotonic Chips", Tymon Barwicz (IBM), et al., Electronic Components & Technology Conference, 2014, . 978-1-4799-2407-3, 2014 IEEE, pp. 179-185.

Japanese Patent Application No. 2019-517001, Office Action dated Nov. 26, 2020, 12 pages (6 pages of English Translation and 6 pages of Original Document); Japanese Patent Office.

Tsai et al. , "Internal modification for cutting transparent glass using femtosecond Bessel beams", Optical Engineering, Soc. of Photo-optical Instrumentation Engineering, Bellingham, vol. 53, May 2014, p. 51503.

* cited by examiner

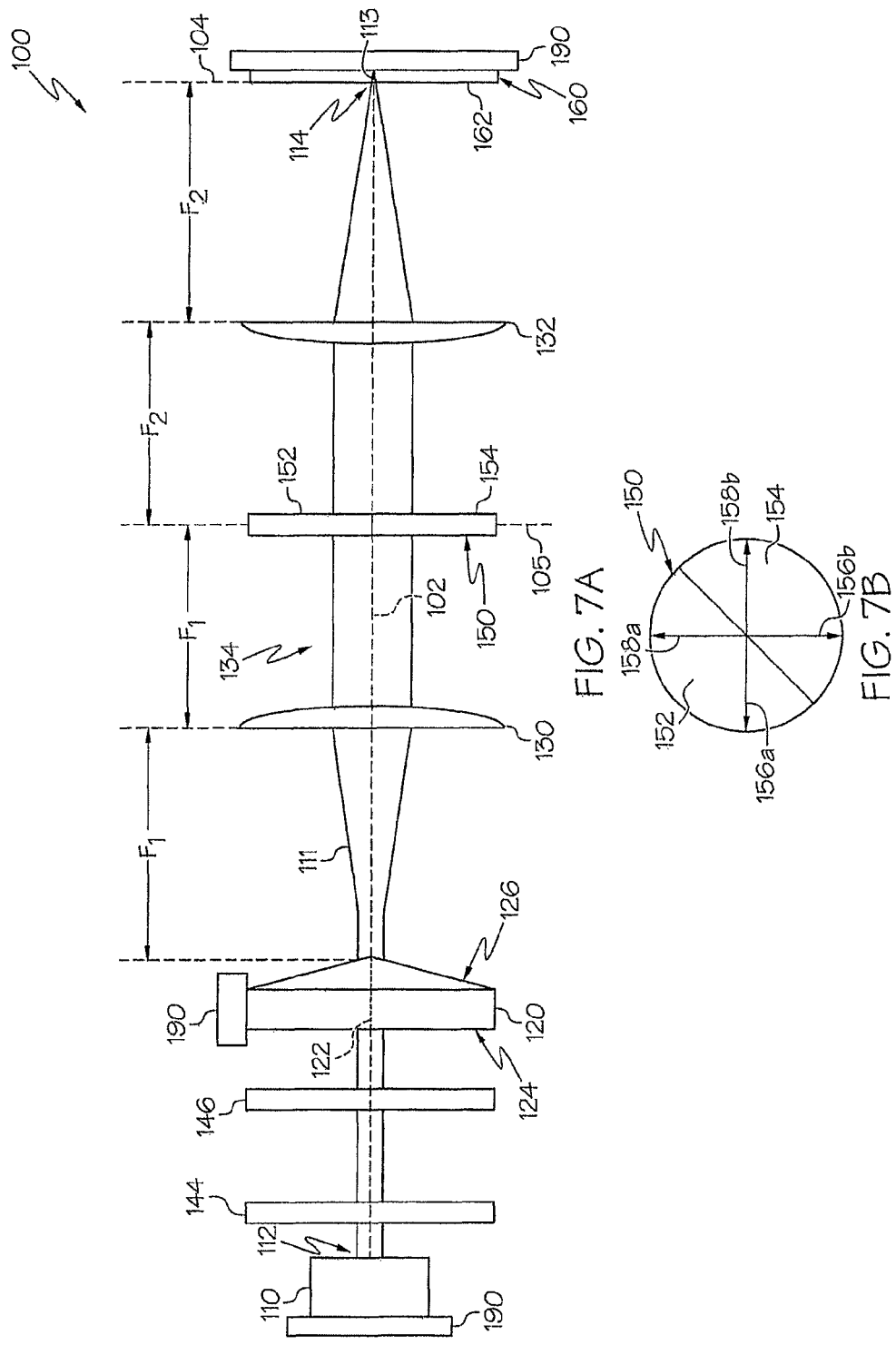

APPARATUSES AND METHODS FOR LASER PROCESSING TRANSPARENT WORKPIECES USING NON-AXISYMMETRIC BEAM SPOTS

This application is a continuation and claims the benefit of priority under 35 U.S.C. § 120 of U.S. patent application Ser. No. 15/718,848, filed on Sep. 28, 2017, which claims the benefit of priority under 35 U.S.C. § 119 of U.S. Provisional Application Ser. No. 62/402,337, filed on Sep. 30, 2016, the contents of which are relied upon and incorporated herein by reference in their entirety.

FIELD

The present specification generally relates to apparatuses and methods for laser processing transparent workpieces, and more particularly, to forming contour lines in transparent workpieces for separating transparent workpieces.

BACKGROUND

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to one embodiment, a method for laser processing a transparent workpiece includes forming a contour line in the transparent workpiece, the contour line including defects in the transparent workpiece. Forming the contour line includes directing a pulsed laser beam oriented along a beam pathway and output by a beam source through an aspheric optical element positioned offset in a radial direction from the beam pathway and into the transparent workpiece such that the portion of the pulsed laser beam directed into the transparent workpiece generates an induced absorption within the transparent workpiece. The induced absorption produces a defect within the transparent workpiece and the portion of the pulsed laser beam directed into the transparent workpiece includes a wavelength λ, an effective spot size $w_{o,eff}$, and a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction. Further, the smaller of $Z_{Rx,min}$ and $Z_{Ry,min}$ is greater than $$F_D \frac{\pi w_{0,eff}^2}{\lambda},$$

where $F_D$ is a dimensionless divergence factor comprising a value of 10 or greater.

In another embodiment, a method for laser processing a transparent workpiece includes forming a contour line in the transparent workpiece, the contour line including defects in the transparent workpiece. Forming the contour line includes directing a pulsed laser beam oriented along a beam pathway and output by a beam source through an aspheric optical element, and beyond an optical blocking element, where the aspheric optical element and the optical blocking element are each positioned between the beam source and the transparent workpiece, and into the transparent workpiece, such that the portion of the pulsed laser beam directed into the transparent workpiece generates an induced absorption within the transparent workpiece. The induced absorption produces a defect within the transparent workpiece and the portion of the pulsed laser beam directed into the transparent workpiece includes a wavelength λ, an effective spot size $w_{o,eff}$, and a non-axisymmetric cross section that comprises a minimum Rayleigh range $Z_{Rx,min}$ in a cross-sectional x-direction and a minimum Rayleigh range $Z_{Ry,min}$ in a cross-sectional y-direction. Further, the smaller of $Z_{Rx,min}$ and $Z_{Ry,min}$ is greater than $$F_D \frac{\pi w_{0,eff}^2}{\lambda},$$

where $F_D$ is a dimensionless divergence factor comprising a value of 10 or greater.

In another embodiment, a method for laser processing a transparent workpiece includes forming a contour line in the transparent workpiece, the contour line including defects in the transparent workpiece. Forming the contour line includes directing a pulsed laser beam oriented along a beam pathway and output by a beam source through an aspheric optical element, decohering a first beam portion of the pulsed laser beam from a second beam portion of the pulsed laser beam using a decohering optical element positioned between the beam source and the transparent workpiece, and directing the first beam portion and the second beam portion of the pulsed laser beam into the transparent workpiece, such that the first beam portion and the second beam portion of the pulsed laser beam directed into the transparent workpiece generate an induced absorption within the transparent workpiece. The induced absorption produces a defect within the transparent workpiece and a combination of the first beam portion and the second beam portion directed into the transparent workpiece includes a wavelength λ, an effective spot size $w_{o,eff}$, and a non-axisymmetric cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor comprising a value of 10 or greater.

In yet another embodiment a processing method includes localizing a pulsed laser beam in a transparent workpiece, the pulsed laser beam propagating in a z-direction and including (i) a wavelength λ; (ii) an effective spot size $w_{o,eff}$; (iii) a pulse energy and pulse duration sufficient to exceed a damage threshold of the transparent workpiece; (iv) a first portion and a second portion, the first portion being incoherent with respect to the second portion; and (v) a non-axisymmetric beam cross section with a minimum Rayleigh range $Z_{Rx,min}$ in the x-direction and a minimum Rayleigh range $Z_{Ry,min}$ the y-direction. Further, the smaller of $Z_{Rx,min}$ and $Z_{Ry,min}$ is greater than $$F_D \frac{\pi w_{0,eff}^2}{\lambda},$$

where $F_D$ is a dimensionless divergence factor having a value of 10 or greater.

The disclosure also includes the following clauses:

1. A method for laser processing a transparent workpiece such as a glass substrate, the method comprising;
   providing a transparent workpiece,
   directing a laser beam onto the workpiece to thereby form a contour line in the transparent workpiece, along which contour line the transparent workpiece is separable, wherein the laser beam is a pulsed laser beam emitted by a laser beam source, wherein the pulsed laser beam is localized in the transparent workpiece, the pulsed laser beam propagating along a beam pathway in a z direction,
   which pulsed laser beam has,
   a wavelength $\lambda$;
   a non-axisymmetric beam cross section;
   a maximum beam intensity;
   an effective spot size $w_{o,eff}$, which effective spot size is defined as a shortest radial distance in any direction from the beam propagation pathway z at which beam intensity decreases to $1/e^2$ of the maximum beam intensity;
   a pulse energy and pulse duration sufficient to exceed a damage threshold of the transparent workpiece to thereby form the contour line in the transparent workpiece which contour line comprises a defect in the transparent work piece;
   wherein the non-axisymmetric beam cross section has a minimum Rayleigh range $Z_{Rx,min}$ in the x-direction and a minimum Rayleigh range $Z_{Ry,min}$ in the y-direction wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor having a value of 10 or greater, and wherein the smaller of the minimum Rayleigh ranges in the x and y direction is the distance along the beam pathway at which the optical intensity of the beam decays to one half of the maximum beam intensity.

2. The method according to clause 1 wherein the laser beam has a pulse energy and a pulse duration sufficient to exceed a damage threshold of the transparent workpiece the thereby form the contour line, which contour line comprises a defect in the transparent workpiece, and preferably further comprising translating the transparent workpiece and the pulsed laser beam relative to each other along the contour line, thereby laser forming a plurality of defects along the contour line within the transparent workpiece.

3. The processing method of clause 1 or 2 wherein the non-axisymmetric beam cross section has maximum spot size parameter $w_{o,max}$, a minimum spot size parameter $w_{o,min}$, and an aspect ratio $$\frac{w_{o,max}}{w_{o,min}},$$

and wherein me aspect ratio is greater than 1.1, 1.3 or 2.0, or is in the range from 1.2 to 15.0, is in the range from 1.5 to 3.0.

4. Method according to any of the preceding clauses wherein the laser beam comprises a first portion and a second portion, the first portion being incoherent with respect to the second portion.

5. Method according to any of the preceding clauses wherein the laser beam is directed through an aspheric optical element so that the laser beam generates an induced absorption within the transparent workpiece, preferably wherein the aspherical optical element is positioned offset in a radial direction from the beam pathway.

6. The method of any of the clause 5 wherein:
   the aspheric optical element is offset from the beam pathway in the radial direction by an offset distance; and
   the offset distance is a distance from about 10% to about 75% of a cross sectional diameter of the pulsed laser beam at a contact location between the pulsed laser beam and the aspheric optical element.

7. The method of any of the preceding clauses 2-20 wherein the dimensionless divergence factor $F_D$ comprises a value of from about 10 to about 2000, preferably wherein the dimensionless divergence factor $F_D$ comprises a value of from about 50 to about 1500, more preferably wherein the dimensionless divergence factor $F_D$ comprises a value of from about 100 to about 1000.

8. The method of any of the preceding clauses 3-22 wherein the defect comprises a central defect region and at least one radial arm that extends outward from the central defect region along the long axis of the non-axisymmetric beam cross section of the pulsed laser beam directed into the transparent workpiece.

9. The method according to any of the preceding clauses further comprising decohering a first beam portion of the laser beam from a second beam portion of the laser beam using a decohering optical element positioned between the beam source and the transparent workpiece, preferably wherein the decohering optical element is positioned between the aspheric optical element and the transparent workpiece, or between the beam source and the aspheric optical element.

10. The method of clause 9 wherein the decohering optical element comprises an optical delay plate and decohering the first beam portion from the second beam portion comprises directing the first beam portion of the pulsed laser beam through the optical delay plate to induce optical retardation of the first beam portion relative to the second beam portion.

11. The method of clause 10 wherein decohering the first beam portion from the second beam portion comprises:
    polarizing the first beam portion of the pulsed laser beam such that the first beam portion of the pulsed laser beam comprises a first polarization at the transparent workpiece; and polarizing the second beam portion of the pulsed laser beam such that the second beam portion of the pulsed laser beam comprises a second polarization at the transparent workpiece, wherein the first polarization is orthogonal to the second polarization.

12. System for carrying out the method according to any of the preceding clauses, the system comprising:
    a laser beam source for providing a pulsed laser beam,
    means for converting the laser beam provided from the source to a laser beam having a non-axisymmetric cross section, the non-axisymmetric laser beam having
    a wavelength λ;
    a maximum beam intensity;
    an effective spot size $w_{o,eff}$, which effective spot size is defined as a shortest radial distance in any direction from a beam propagation pathway z at which beam intensity decreases to $1/e^2$ of the maximum beam intensity;
    a pulse energy and pulse duration sufficient to exceed a damage threshold of a transparent workpiece to thereby form the contour line in the transparent workpiece which contour line comprises a defect in the transparent work piece;
    wherein the non-axisymmetric beam cross section has a minimum Rayleigh range $Z_{Rx,min}$ in the x-direction and a minimum Rayleigh range $Z_{Ry,min}$ in the y-direction wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor having a value of 10 or greater, and wherein the smaller of the minimum Rayleigh ranges in the x and y direction is the distance along the beam pathway at which the optical intensity of the beam decays to one half of the maximum beam intensity.

13. System according to clause 12 further comprising means for converting the laser beam to a quasi non-diffracting laser beam.

14. System according to clause 13 wherein the means for converting the laser beam provided from the source to a laser beam having a non-axisymmetric cross section and the means for converting the laser beam to a quasi non-diffracting laser beam include, an aspheric element, preferably an axicon lens, offset relative to the beam propagation pathway and a beam decohering element.

15. System according to clause 14 comprising in sequence;
    the laser beam source,
    a first quarter wave plate for circularly polarizing the laser beam
    an axicon lens
    a collimating lens,
    a second, preferably, rotatable split quarter wave plate for creating a polarization based decoherence of two sections of the laser beam, and a focusing lens for focusing the laser beam on the transparent workpiece Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7A schematically depicts an embodiment of an optical assembly for pulsed laser processing comprising a split quarter waveplate, according to one or more embodiments described herein;

FIG. 7B schematically depicts the split quarter waveplate of FIG. 7A, according to one or more embodiments described herein;

DETAILED DESCRIPTION

Figure 1A:
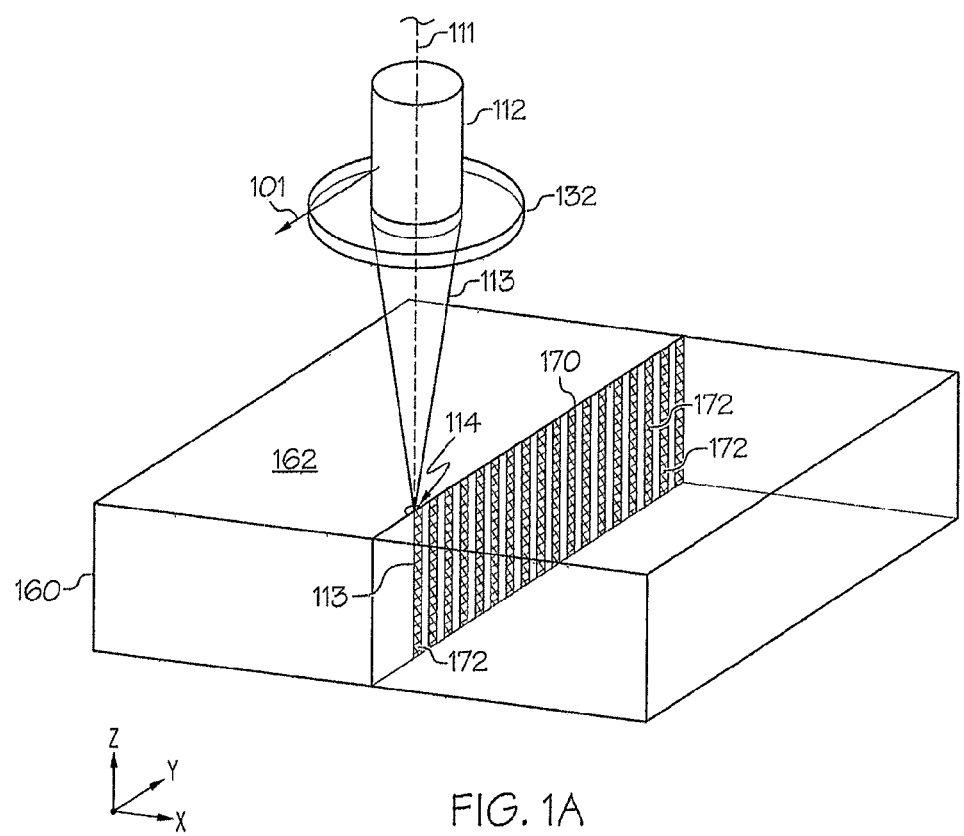
FIG. 1A schematically depicts the formation of a contour line of defects, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a contour line in the transparent workpiece comprising a series of defects that define a line of intended separation of the transparent workpiece into two or more portions. According to one embodiment, a pulsed laser beam that projects a non-axisymmetric extended focal line having a beam cross section with a long axis and a short axis onto the transparent workpiece may be utilized to create a series of defects in the transparent workpiece thereby defining the contour line. These defects may be referred to, in various embodiments herein, as line defects, perforations, or nano-perforations in the workpiece. Further, these defects may include a central defect region and radial arms that primarily form along the long axis of the non-axisymmetric beam spot. In some embodiments, the process may further include separating the transparent workpiece along the contour line, for example, using an infrared laser or other laser configured to heat the area of the transparent workpiece adjacent to the contour line or to bend, scribe, or otherwise mechanically stress the transparent workpiece. In other embodiments, the transparent workpiece may be mechanically stressed to cause separation, or separation may occur spontaneously. While not intended to be limited by theory, stressing the transparent workpiece at the contour line may propagate a crack along the contour line. By controlling the direction of the radial arms of each defect along the contour line, the crack propagation may be better controlled. Various embodiments of methods and apparatuses for processing a transparent workpiece will be described herein with specific reference to the appended drawings.

The phrase "transparent workpiece," as used herein, means a workpiece formed from glass or glass-ceramic which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent workpiece may have a thickness of from about 50 microns to about 10 mm (such as from about 100 microns to about 5 mm, or from about 0.5 mm to about 3 mm).

According to one or more embodiments, the present disclosure provides methods for processing workpieces. As used herein, "laser processing" may include forming contour lines in workpieces, separating workpieces, or combinations thereof. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components which are transparent to the wavelength of the laser, for example, crystals such as sapphire or zinc selenide.

Some transparent workpieces may be utilized as display and/or TFT (thin film transistor) substrates. Some examples of such glasses or glass compositions suitable for display or TFT use are EAGLE XG®, CONTEGO, and CORNING LOTUS™ available from Corning Incorporated of Corning, N.Y. The alkaline earth boro-aluminosilicate glass compositions may be formulated to be suitable for use as substrates for electronic applications including, without limitation, substrates for TFTs. The glass compositions used in conjunction with TFTs typically have CTEs similar to that of silicon (such as less than $5 \times 10^{-6}$/K, or even less than $4 \times 10^{-6}$/K, for example, approximately $3 \times 10^{-6}$/K, or about $2.5 \times 10^{-6}$/K to about $3.5 \times 10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable. According to embodiments, the laser cutting processes described herein may be used to separate transparent workpieces in a controlled fashion with negligible debris, minimum defects, and low subsurface damage to the edges, preserving workpiece integrity and strength.

The phrase "contour line," as used herein, denotes a line (e.g., a line, a curve, etc.) formed along a desired line of separation on the surface of a transparent workpiece along which a transparent workpiece will be separated into multiple portions upon exposure to the appropriate processing conditions. The contour line generally consists of one or more defects introduced into the transparent workpiece using various techniques. As used herein, a "defect" may include an area of modified material (relative to the bulk material), void space, scratch, flaw, hole, or other deformities in the transparent workpiece which enables separation by additional processing, such as by infrared laser processing, mechanical stress, or other separation processes. Moreover, each defect may comprise a central defect region and one or more radial arms extending outward from the central defect region along an imaging surface of the transparent workpiece. As used herein the "imaging surface" of the transparent workpiece is the surface of the transparent workpiece at which the pulsed laser beam initially contacts the transparent workpiece. As described in more detail below, the radial length of the one or more radial arms may be controlled by the shape of a beam spot projected onto the transparent workpiece by a pulsed laser beam. As one example, a pulsed laser beam comprising a non-axisymmetric beam spot generally comprising a long axis and a short axis may irradiate the imaging plane of the transparent workpiece to generate defects that comprise a central defect region formed at the intersection of the long axis and the short axis of the non-axisymmetric beam spot and one or more radial arms formed in the direction of the long axis of the non-axisymmetric beam spot.

A transparent workpiece, such as a glass substrate or the like, may be separated into multiple portions by first forming a contour line on the surface of the workpiece and, thereafter, heating, for example, using an infrared laser, the surface of the workpiece on the contour line to create stresses in the workpiece, such as thermal stresses. The stresses ultimately lead to the spontaneous separation of the workpiece along the contour line. Further, when each defect is formed using a pulsed laser beam having a non-axisymmetric beam spot oriented such that the long axis of the beam axis extends along the desired line of separation, crack propagation caused by stressing defects in the transparent workpiece along the contour line may extend in the desired line of separation. Forming defects having radial arms that extend in the direction of the desired line of separation may allow the defects to be spaced apart at larger spacing distances than defects having randomly extending radial arms or no radial arms, without damage to the edges of the separated transparent workpieces where the contour line existed prior to separation. Moreover, forming defects having radial arms that extend in the direction of the desired line of separation allows crack propagation to be generated by less stress, e.g., less energy, such as thermal energy, applied to the workpiece, limiting damage to the edges of the separated transparent workpieces where the contour line existed prior to separation. In contrast, when defects include randomly extending radial arms or no radial arms, cracks may propagate from the separated edge in a direction generally perpendicular to the edge of the separated transparent workpiece (i.e., generally perpendicular to the intended line of separation denoted by the contour line) which weaken the edges of separated transparent workpiece.

Figure 1B:
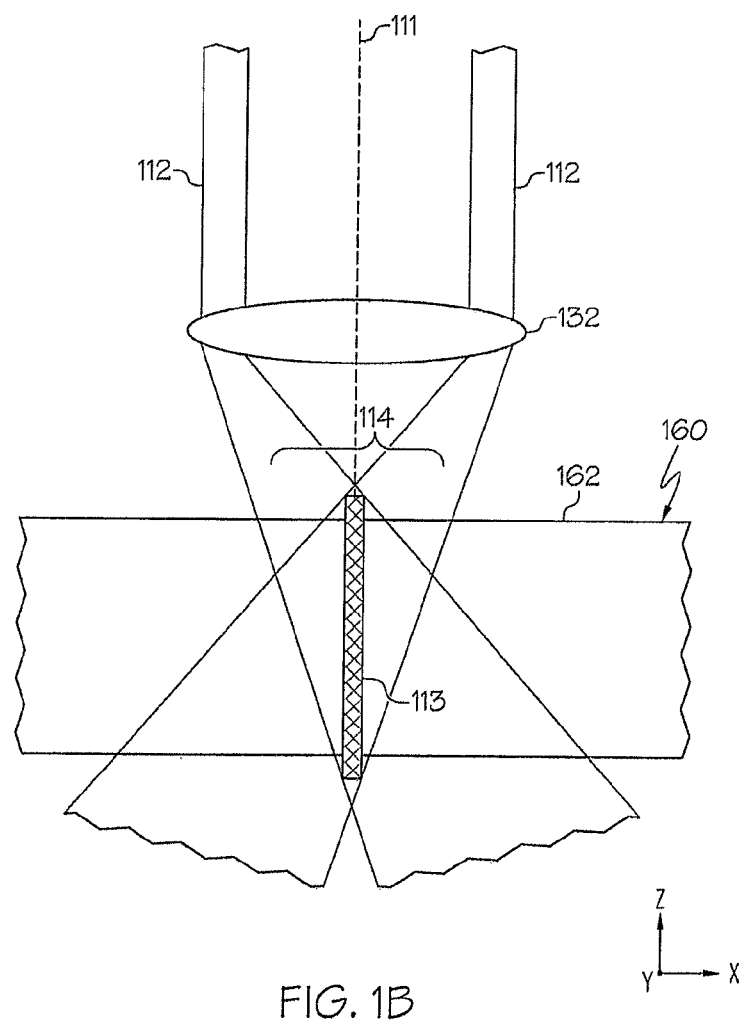
FIG. 1B schematically depicts an example pulsed laser beam focal line during processing of a transparent workpiece, according to one or more embodiments described herein.

Referring now to FIGS. 1A and 1B by way of example, a transparent workpiece 160, such as a glass workpiece or a glass-ceramic workpiece, is schematically depicted undergoing processing according to the methods described herein. FIGS. 1A and 1B depict the formation of a contour line 170 in the transparent workpiece 160, which may be formed by translating a pulsed laser beam 112 relative to the transparent workpiece in a translation direction 101. FIGS. 1A and 1B depict the pulsed laser beam 112 along a beam pathway 111 and oriented such that the pulsed laser beam 112 may be focused into a pulsed laser beam focal line 113 within the transparent workpiece 160 by a lens (e.g., a second lens 132 as described below). Further, the pulsed laser beam focal line 113 is a portion of a quasi non-diffracting beam, as defined in more detail below. FIGS. 1A and 1B depict that the pulsed laser beam 112 forms a non-axisymmetric beam spot 114 projected onto an imaging surface 162 of the transparent workpiece 160. Further, the pulsed laser beam focal line 113 is non-axisymmetric at cross sections of the pulsed laser beam focal line 113 normal to the propagation axis of the pulsed laser beam 112 (e.g., normal to the beam pathway 111). As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the propagation axis of the laser beam. As also used herein "beam spot" refers to a cross section of a laser beam (e.g., the pulsed laser beam 112) at a point of first contact with a workpiece (e.g., the transparent workpiece 160).

Figure 2:
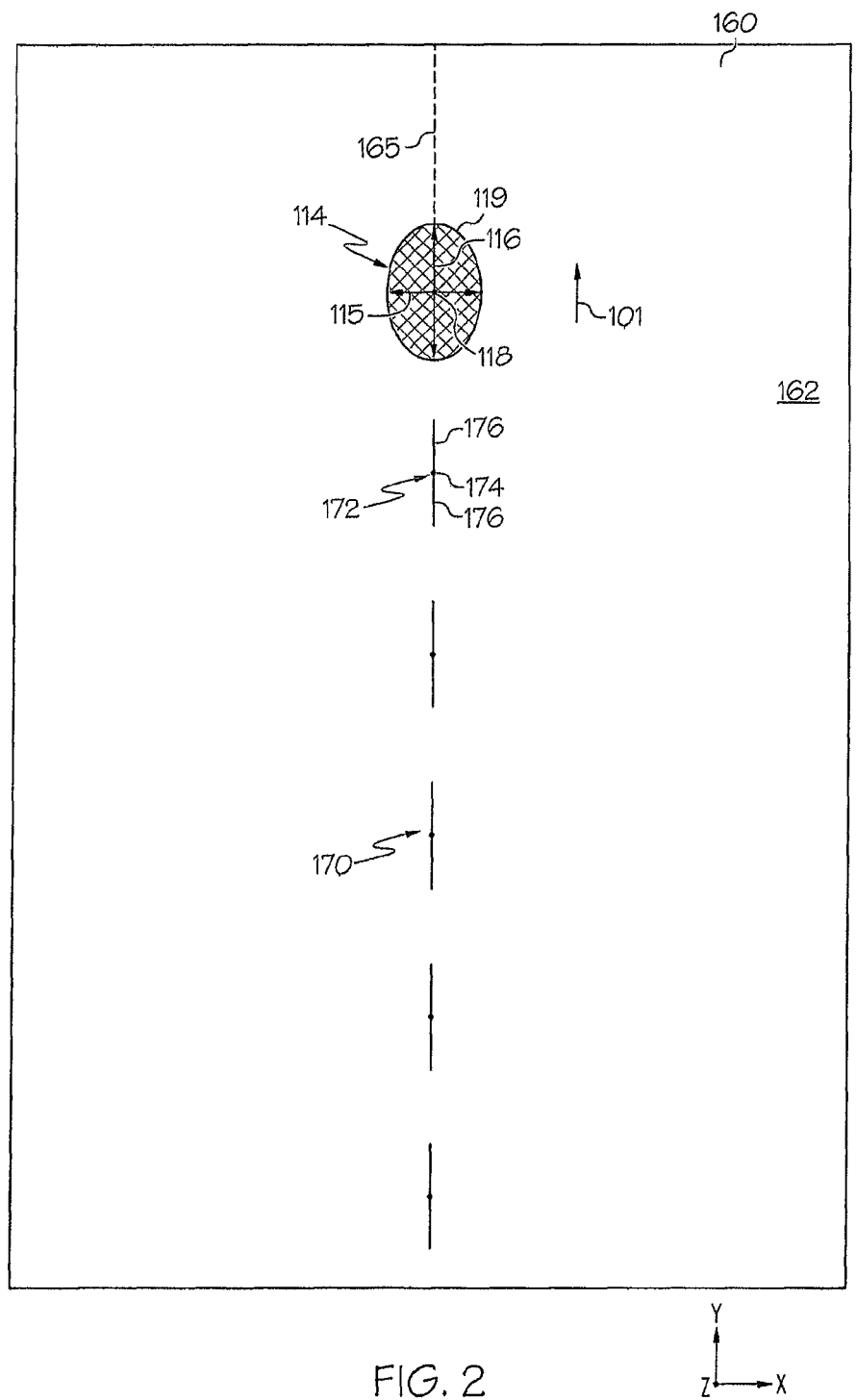
FIG. 2 schematically depicts a non-axisymmetric beam spot traversing a line of desired separation to form a contour line in a transparent workpiece, according to one or more embodiments described herein.

Referring also to FIG. 2, the contour line 170 extends along the desired line of separation 165 and delineates a line of intended separation about which the transparent workpiece 160 may be separated into two or more portions. The contour line 170 comprises a plurality of defects 172 that extend into the surface of the transparent workpiece 160 and establish a path for crack propagation for separation of the transparent workpiece 160 into separate portions along the contour line 170. While the contour line 170 is depicted in FIG. 1A and FIG. 2 as being substantially linear, it should be understood that other configurations are contemplated and possible including, without limitation, curves, patterns, regular geometric shapes, irregular shapes, and the like.

As depicted in FIG. 2, each defect 172 includes a central defect region 174 and one or more radial arms 176 extending outward in a direction substantially perpendicular to the beam pathway 111 (e.g., in the X and/or Y directions as shown in FIGS. 1A, 1B, and 2). In operation, after the defects 172 of the contour line 170 are formed, for example, using the methods and systems described herein, the defects 172 may be further acted upon in a subsequent separating step to induce spontaneous separation of the transparent workpiece 160 along the contour line 170. The subsequent separating step may include using mechanical force, thermal stress induced force, or a spontaneous break occurring due to stress present in the transparent workpiece, depending on the type, thickness, and structure of the transparent workpiece 160. For example, stress may be present in the transparent workpiece 160 which may cause spontaneous separation without further heating or mechanical separation steps.

Referring to FIGS. 1A, 1B, and 2, in the embodiments described herein, a pulsed laser beam 112 (with a non-axisymmetric beam spot 114 projected onto the transparent workpiece 160) may be directed onto the transparent workpiece 160 (e.g., condensed into a high aspect ratio line focus that penetrates through at least a portion of the thickness of the transparent workpiece 160). This forms the pulsed laser beam focal line 113 having non-axisymmetric cross sections correlated with the non-axisymmetric beam spot 114. In particular, the non-axisymmetric beam spot 114 is an example cross section of the pulsed laser beam focal line 113 and the pulsed laser beam focal line 113 remains non-axisymmetric as the pulsed laser beam focal line 113 penetrates at least a portion of the transparent workpiece 160. Further, the pulsed laser beam 112 may be translated relative to the transparent workpiece 160 (e.g., in the translation direction 101) to form the plurality of defects 172 of the contour line 170. Directing the pulsed laser beam 112 into the transparent workpiece 160 causes portions of the transparent workpiece 160 to fracture, for example, depositing enough energy to break chemical bonds in the transparent workpiece 160 at spaced locations along the desired line of separation 165 to form the defects 172. According to one or more embodiments, the pulsed laser beam may be translated across the transparent workpiece 160 by motion of the transparent workpiece 160 (e.g., motion of a translation stage 190 coupled to the transparent workpiece 160), motion of the pulsed laser beam (e.g., motion of the pulsed laser beam focal line 113), or motion of both the transparent workpiece 160 and the pulsed laser beam focal line 113. By translating the pulsed laser beam focal line 113 relative to the transparent workpiece 160, the plurality of defects 172 may be formed in the transparent workpiece 160.

As depicted in FIG. 2, the non-axisymmetric beam spot 114 comprises a long axis 116, a short axis 115, an axis intersection 118, which may be positioned at the center of the non-axisymmetric beam spot 114, and a beam spot perimeter 119. According to embodiments, the long axis 116 is defined as the axis of the non-axisymmetric beam spot 114 having the longest distance from center within the non-axisymmetric beam spot 114 and the short axis 115 is defined as the axis of the non-axisymmetric beam spot 114 having the shortest distance from center within the non-axisymmetric beam spot 114. While the non-axisymmetric beam spot 114 is depicted in FIG. 2 as an ellipse, it should be understood that any non-axisymmetric shape is contemplated, such as a non-elliptical shape. Further, the non-axisymmetric beam spot 114 may comprise a collection of multiple beam spots. Moreover, it should be understood that while the non-axisymmetric beam spot 114 is substantially discussed herein, other cross sections of the pulsed laser beam focal line 113 within the transparent workpiece 160 are also non-axisymmetric and also comprise a short axis and a long axis, as described above with respect to the non-axisymmetric beam spot 114.

As examples, the distance from center of the non-axisymmetric beam spot 114 along the long axis may comprise from about 0.25 µm to about 20 µm, such as from about 1 µm to about 10 µm, from about 2 µm to about 8 µm, or from about 3 µm to about 6 µm. Further, the distance from center of the non-axisymmetric beam spot 114 along the short axis may comprises from about 0.01 µm to about 10 µm, from about 0.1 µm to about 10 µm, or from about 0.7 µm to about 3 µm. For example, the distance from center of the non-axisymmetric beam spot 114 along the short axis may be from about 5% to about 95% of the distance from center of the non-axisymmetric beam spot 114 along the long axis, such as from about 10% to about 50%, from about 20% to about 45%, or from about 30% to about 40% of the distance from center of the non-axisymmetric beam spot 114 along the long axis. Methods for determining beam spot size are disclosed hereinbelow.

Figure 3:
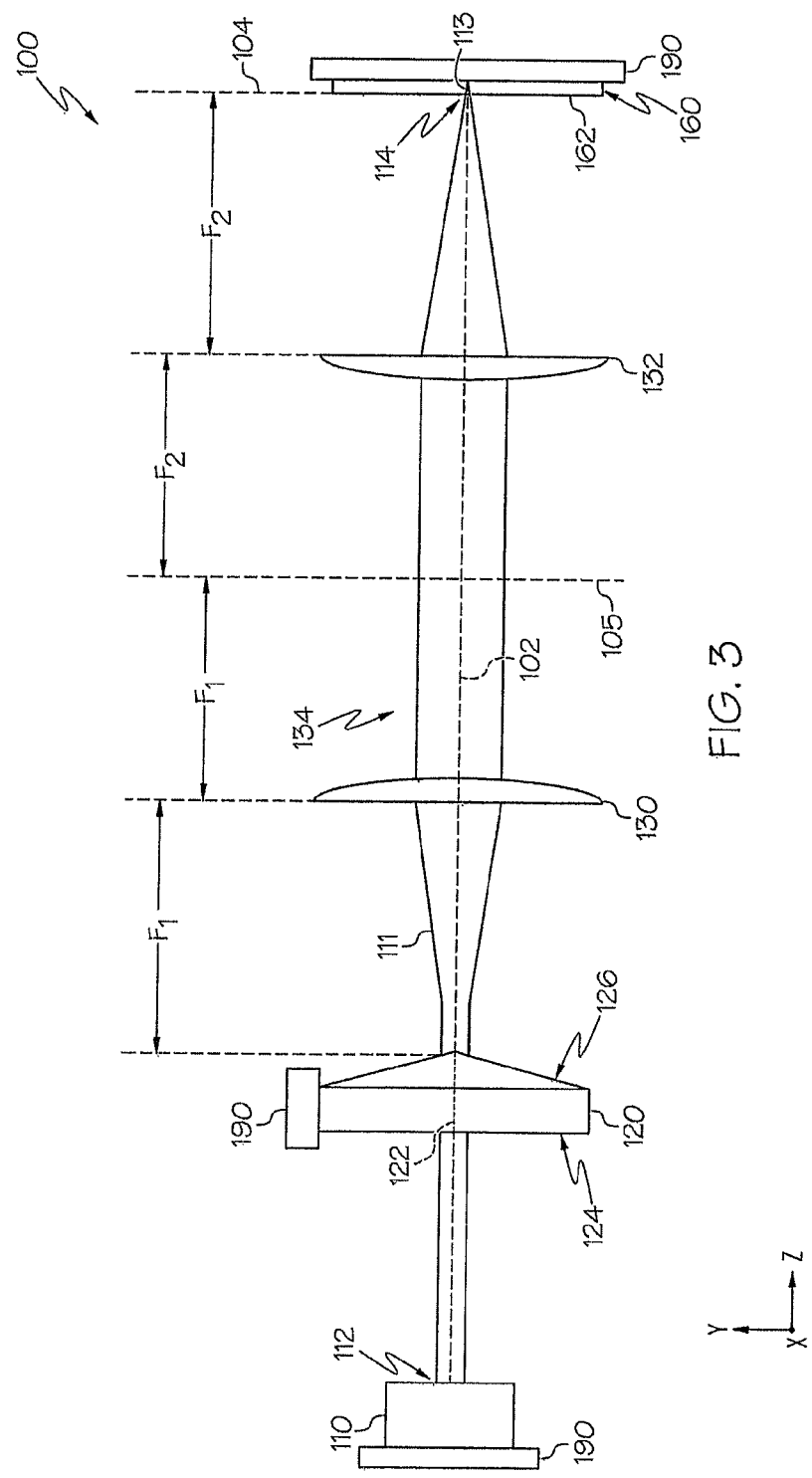
FIG. 3 schematically depicts a conventional embodiment of an optical assembly for pulsed laser processing, according to one or more embodiments described herein.

The optical assemblies shown in FIG. 1B and FIG. 3, when operated using a Gaussian beam laser having axial symmetry (e.g., when a beam source 110 outputs a Gaussian beam), will form an optical beam at the transparent workpiece 160 known in the art as a Gauss-Bessel beam. Such a beam is one form of a quasi-non-diffracting beam (defined in greater detail below). When the axial symmetry of the Gaussian beam is broken, even slightly broken, the beam may then be termed an non-axisymmetric Gauss-Bessel beam. However, the principles and effects described herein extend beyond beams having a Gauss-Bessel intensity profile and extend to non-axisymmetric quasi-non-diffracting laser beams in general. However, it should be noted that measuring the asymmetry in a quasi-non-diffracting beam cannot be done as simply as measuring the asymmetry of a more traditional Gaussian beam. For instance, quasi non-diffracting beams typically have transverse profiles that are oscillatory, as compared to Gaussian beams, which decay monotonically. The diameter of a Gaussian beam is typically defined by a $1/e^2$ drop in intensity. In contrast, the intensity of a quasi-non-diffracting beam can fluctuate above and below a $1/e^2$ intensity threshold multiple times as a function of radial distance. Thus, defining the size of even a radially symmetric quasi-non-diffracting beam is challenging.

Moreover, while asymmetric Gaussian beams are known in the art, they are most often discussed as being single spots, where the Gaussian beam may have a larger diameter in the x-direction than in the y-direction, for example.

However, for both higher-order Gaussian beams and quasi-non-diffracting beams, the cross section of the beam may not have a single monotonically decaying core or spot. In such a situation, the "long" or "short" cross sectional axes of the beam are not readily apparent, which makes defining how to measure the asymmetry of a beam even more difficult.

While not intending to be limited by theory, it is with the above motivation that the following discussion is made to define both a quasi-non-diffracting beam and methods of measuring the asymmetry of a quasi-non-diffracting beam. This discussion is broadly applicable to all forms of laser beams, whether they are simple low-order Gaussian beams with monotonic intensity profiles or more complex quasi non-diffracting beams that project multiple spots or behave in an oscillatory manner. In the case of Gaussian beams, the results will reduce to more simple forms that are familiar from the Gaussian beam literature for defining spots size and Rayleigh range.

Referring again to FIGS. 1A-2, the pulsed laser beam 112 used to form the defects 172 further has an intensity distribution I(X,Y,Z), where Z is the direction of propagation of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

Referring still to FIG. 2, the non-axisymmetric beam spot 114 comprises a cross-sectional intensity distribution that is non-axisymmetric. For example, the non-axisymmetric beam spot 114 may have a greater intensity and thereby a greater distribution of cumulated energy from the pulsed laser beam 112 in areas along the long axis 116 of the non-axisymmetric beam spot 114 than along the short axis 115 of the non-axisymmetric beam spot 114. That is, when the long axis 116 of the non-axisymmetric beam spot 114 is aligned with the desired line of separation 165, the pulsed laser beam 112 may transfer more energy along the desired line of separation 165 than onto areas adjacent the desired line of separation 165, forming defects 172 comprising longer radial arms 176 extending along the desired line of separation 165 than radial arms 176 extending in directions not along the desired line of separation 165. As used herein, "cumulated energy" refers to all energy transferred onto a particular area of the transparent workpiece 160 by the pulsed laser beam 112 as the pulsed laser beam 112 irradiates the transparent workpiece 160.

Further, the pulsed laser beam 112 at the non-axisymmetric beam spot 114 may comprise a quasi-non-diffracting beam, for example, a beam having low beam divergence as mathematically defined below, by propagating the pulsed laser beam 112 through a aspheric optical element 120, as described in more detail below with respect to the optical assemblies 100 depicted in FIGS. 3-7A. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the direction of propagation of the pulsed laser beam 112, for example, along the X-Y plane. One example beam cross section discussed herein is the beam spot (e.g., the non-axisymmetric beam spot 114) of the pulsed laser beam 112 projected onto the transparent workpiece 160.

Diffraction is one factor that leads to divergence of pulsed laser beams 112. Other factors include focusing or defocusing caused by the optical systems forming the pulsed laser beams 112 or refraction and scattering at interfaces. Pulsed laser beams 112 for forming the defects 172 of the contour line 170 may have small, non-axisymmetric beam spots 114, with low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x,y,z) are given by the following expressions:

$$\bar{x}(z) = \frac{\int_{-\infty}^{\infty}\int_{-\infty}^{\infty} xI(x,y,z)dxdy}{\int_{-\infty}^{\infty}\int_{-\infty}^{\infty} I(x,y,z)dxdy} \quad (1)$$

$$\bar{y}(z) = \frac{\int_{-\infty}^{\infty}\int_{-\infty}^{\infty} yI(x,y,z)dxdy}{\int_{-\infty}^{\infty}\int_{-\infty}^{\infty} I(x,y,z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x,y,z)

with Fourier transform $\tilde{I}(v_x,v_y)$ (where $v_x$ and $v_y$ are spatial frequencies in the X-direction and Y-direction, respectively), the near field and far field variances in the x-direction and y-direction are given by the following expressions:

$$\sigma_{0x}^2(z) = \frac{\int_{-\infty}^{\infty}\int_{-\infty}^{\infty} x^2 I(x,y,z)dxdy}{\int_{-\infty}^{\infty}\int_{-\infty}^{\infty} I(x,y,z)dxdy} \quad (3)$$

$$\sigma_{0y}^2(z) = \frac{\int_{-\infty}^{\infty}\int_{-\infty}^{\infty} y^2 I(x,y,z)dxdy}{\int_{-\infty}^{\infty}\int_{-\infty}^{\infty} I(x,y,z)dxdy} \quad (4)$$

$$\sigma_{\infty x}^2 = \frac{\int_{-\infty}^{\infty}\int_{-\infty}^{\infty} v_x^2 \tilde{I}(v_x,v_y)dv_xdv_y}{\int_{-\infty}^{\infty}\int_{-\infty}^{\infty} \tilde{I}(v_x,v_y)dv_xdv_y} \quad (5)$$

$$\sigma_{\infty y}^2 = \frac{\int_{-\infty}^{\infty}\int_{-\infty}^{\infty} v_y^2 \tilde{I}(v_x,v_y)dv_xdv_y}{\int_{-\infty}^{\infty}\int_{-\infty}^{\infty} \tilde{I}(v_x,v_y)dv_xdv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x,y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

It should also be noted that the origin of the x,y coordinate system used in equations 3 through equations 6 are the centroid of the laser beam.

Through the Fourier transform relationship between the transverse amplitude profile $\tilde{u}(x,y,z)$ for an arbitrary optical beam (where $I(x,y,z) \equiv |\tilde{u}(x,y,z)|^2$) and the spatial-frequency distribution $\tilde{P}(v_x,v_y,z)$ for an arbitrary optical beam (where $\tilde{I}(v_x,v_y) \equiv |\tilde{P}(v_x,v_y,z)|^2$), it can be shown that:

$$\sigma_x^2(z) = \sigma_{0x}^2(z_{0x}) + \lambda^2 \sigma_{\infty x}^2 (z-z_{0x})^2 \quad (7)$$

$$\sigma_y^2(z) = \sigma_{0y}^2(z_{0y}) + \lambda^2 \sigma_{\infty y}^2 (z-z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the beam. Equations (7) and (8) indicate that $\sigma_x^2(z)$ and $\sigma_y^2(z)$ increase quadratically with z in either direction from the minimum values associated with the waist position of the beam.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \quad (9)$$

$$M_y^2 = 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

which can be rewritten as:
where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the direction of propagation than laser beams with small Rayleigh ranges.

The formulas above can be applied to any laser beam (not just Gaussian beams) by using the intensity profile I(x,y,z) that describes the laser beam. In the case of the $TEM_{00}$ mode of a Gaussian beam, the intensity profile is given by:

$$I(x,y) = \frac{\sqrt{\pi}}{2} w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

-continued $$Z_{Rx} = \frac{4\pi\sigma_{0x}^2}{M_x^2\lambda} = \frac{\pi w_0^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. As stated previously, it may be desired to project a beam spot onto the transparent workpiece 160 that is a non-axisymmetric beam spot 114. Example non-axisymmetric cross sections include elliptical cross sections. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_0$, which from Equation (18) corresponds to $2\sigma_{0x}$ or $2\sigma_{0y}$. Spot size can be similarly defined for non-axisymmetric beam cross sections where, unlike an axisymmetric beam, $\sigma_{0x} \neq \sigma_{0y}$. As a result, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

The lack of axial (i.e. arbitrary rotation angle) symmetry for a non-axisymmetric beam means that the results of a calculation of values of $\sigma_{0x}$ and $\sigma_{0y}$ will depend on the choice of orientation of the x-axis and y-axis. For example, in some embodiments, the x-axis may be the long axis 116 of the non-axisymmetric beam spot 114 and the y-axis may be the short axis 115. In other embodiments, the x-axis may be the short axis 115 and the y-axis may be the long axis 116. ISO 11146-1:2005(E) refers to these reference axes as the principal axes of the power density distribution (Section 3.3-3.5) and in the following discussion we will assume that the x and y axes are aligned with these principal axes. Further, an angle $\phi$ about which the x-axis and y-axis may be rotated in the cross-sectional plane (e.g., an angle of the x-axis and y-axis relative to reference positions for the x-axis and y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, or the like The beam cross section influences the cross sectional shape of the defects 172 formed by the pulsed laser beam 112 in the transparent workpiece 160. Cross-sectional shape of the defects 172 refers to shape of the defects in the direction perpendicular to the direction of propagation of the pulsed laser beam 112. If, for example, a laser beam is normally incident to the imaging surface 162 of the transparent workpiece 160, the cross-sectional shape of the defect 172 corresponds to the shape of the defects 172 in the plane of the imaging surface 162, or in any plane parallel to the plane of the imaging surface 162 of the workpiece. As an example, a laser beam with a circular beam cross section forms a defect 172 with a circular shape and a laser beam with a non-circular beam cross section forms a defect 172 with a non-circular shape.

Control of the beam cross section leads to more effective cutting, fewer defects, and higher edge strength in separated parts. Control of the beam cross section includes control of the spot size, cross-sectional shape, and orientation of the beam cross section. Without wishing to be bound by theory, it is believed that non-axisymmetric beam cross sections having a maximum spot size parameter $w_{o,max}$ oriented along (or approximately along) the desired line of separation 165 improves cutting by directing crack orientation along the trajectory of cutting. In the case of an axisymmetric beam cross section, it is believed that stresses associated with the formation of damage regions are concentrated near the damage region, but with random orientations. The random stress orientations are believed to lead to fracture in directions away from the intended trajectory of cutting, manifested as micro cracks and other defects in separated parts. It is believed that such micro cracks and defects reduce the mechanical strength of the bulk and/or edges of separated parts. By employing non-axisymmetric beam cross sections and beam spots and orienting the direction of the maximum spot size $w_{o,max}$ (e.g., the long axis 116) along the desired line of separation 165, it is believed that defects or cracks associated with forming damage regions can be directed along the cut with the formation of fewer cracks or defects in directions away from the desired line of separation 165. Defects of cracks aligned with the desired line of separation 165 are preferred to defects or cracks directed away from the desired line of separation 165.

Aspect ratios $$\frac{w_{o,max}}{w_{o,min}}$$

of the beam cross section of the pulsed laser beam 112 (e.g., aspect ratios of the non-axisymmetric beam spot 114) used to form defects 172 may be greater than 1.1, greater than 1.3, greater than 1.5, greater than 2.0, greater than 2.5, greater than 3.0, greater than 3.5, greater than 4.0, greater than 5.0, greater than 7.5, greater than 10.0, in the range from 1.1 to 20.0, in the range from 1.2 to 15.0, in the range from 1.3 to 10.0, in the range from 1.3 to 7.5, in the range from 1.3 to 5.0, in the range from 1.5 to 7.5, in the range from 1.5 to 5.0, in the range from 1.5 to 3.0, in the range from 1.75 to 5.0, in the range from 2.0 to 4.0, or the like.

To promote uniformity of defects 172 in the direction of laser propagation (e.g. depth dimension of the transparent workpiece 160), a pulsed laser beam 112 having low divergence may be used. In one or more embodiments, non-axisymmetric laser beams having low divergence may be utilized for forming defects 172. As noted above, divergence can be characterized by the Rayleigh range. For non-axisymmetric beams, Rayleigh ranges for the principal axes X and Y are defined by Equations (15) and (16) for the x-direction and y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed, for a beam with a Gaussian intensity distribution, by Equation (22) or Equation (23). Low divergence correlates with large values of the Rayleigh range and weak diffraction of the laser beam.

Beams with Gaussian intensity profiles may be less preferred for laser processing to form defects because, when focused to small enough spot sizes (such as spot sizes in the range of microns, such as about 1-5 microns or about 1-10 microns) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$. In a similar manner to the formulas that characterize the Rayleigh ranges of an axially symmetric Gaussian beam (Equation (22) or Equation (23)), for an arbitrary beam profile $Z_{Rx,min}$ and $Z_{Ry,min}$ can be shown to be given by $$Z_{Rx,min} = \frac{4\pi\sigma_{0,min}^2}{M_x^2\lambda} \tag{29}$$

and $$Z_{Ry,min} = \frac{4\pi\sigma_{0,min}^2}{M_y^2\lambda} \tag{30}$$

For a Gaussian beam this curve would be expected to be to be symmetric about $z_{0x}$.

Figure 24:
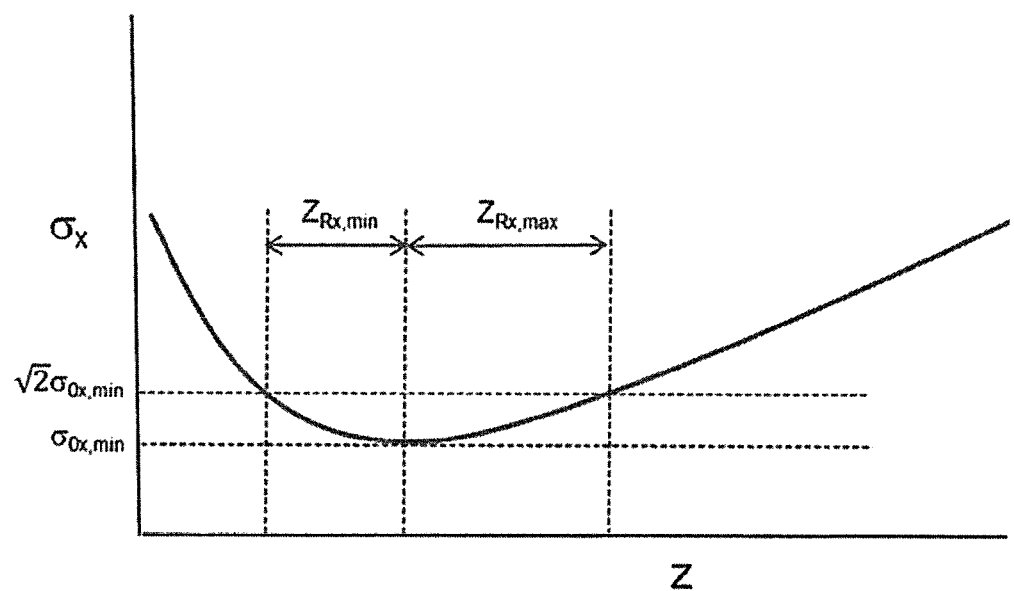
FIG. 24 depicts a Rayleigh range for a non-axisymmetric beam.

In the case of asymmetry (as shown in FIG. 24), there is a $Z_{Rx,min}$ and a $Z_{Rx,max}$ where both are measured from the minimum at $z_{0x}$ to a z value at which the $\sigma_{0x,min}$ has increased by a factor of $\sqrt{2}$. $Z_{Rx,min}$ is clearly the smaller of the two values while $Z_{Rx,max}$ is the larger. The same analysis can be done of the perpendicular y axis.

Since divergence of the laser beam occurs over a shorter distance in the direction having the smallest Rayleigh range, the intensity distribution of the pulsed laser beam used for cutting may be controlled so that the minimum values of $Z_{Rx}$ and $Z_{Ry}$ are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam with an intensity distribution may be used that makes the smaller of $Z_{Rx,min}$ and $Z_{Ry,min}$ as large as possible when forming damage regions.

In different embodiments, the smaller of $Z_{Rx,min}$ and $Z_{Ry,min}$ is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

The Rayleigh range of the laser beam used to form damage regions may be greater than the Rayleigh range of a Gaussian beam having the same wavelength. Accordingly, the ratio of the smaller of $Z_{Rx,min}$ and $Z_{Ry,min}$ to the Rayleigh range $Z_R$ of a Gaussian beam (as specified in either of Equations (22) or (23)), at a common wavelength λ, may be greater than or equal to 2, greater than or equal to 5, greater than or equal to 10, greater than or equal to 25, greater than or equal to 50, greater than or equal to 100, greater than or equal to 250, greater than or equal to 500, greater than or equal to 1000, in the range from 2 to 1500, in the range from 5 to 1250, in the range from 10 to 1000, in the range from 25 to 1000, in the range from 100 to 1000, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. A criterion for Rayleigh range based on the effective spot size $w_{o,eff}$ can be specified for non-diffracting or quasi non-diffracting beams for forming damage regions, as follows:

$$\text{Smaller of } Z_{Rx,min}, Z_{Ry,min} > F_D \frac{\pi w_{0,eff}^2}{\lambda} \tag{31}$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}, Z_{Ry,min}$ in Equation (31), over which the effective beam size doubles, is $F_D$ times the distance expected if a typical Gaussian beam profile were used.

The Rayleigh range can also be determined by measuring the distance over which the peak intensity of the beam drops by a factor of 2, as detailed above. This is referred to herein as the intensity method for determining the Rayleigh range.

The inventors have found that the criterion for the Rayleigh range based on the effective spot size $\omega_{0,eff}$ can also be specified non-diffracting or quasi non-diffracting beams for forming damage regions, as follows:

$$Z_{R,min} > F_D \frac{\pi \omega_{0,eff}^2}{\lambda} \quad (31')$$

When determining the Rayleigh range, either the variance method, i.e utilizing equations (31) or (31') can be used, or the intensity method can be used. When using the intensity method, there is only one answer, i.e. one value for the minimum Rayleigh range, since there is then no difference between x and y.

The dimensionless divergence factor $F_D$ provides a criterion for determining whether or not a laser beam is quasi-non-diffracting. As used herein, a laser beam is considered quasi-non-diffracting if the characteristics of the laser beam satisfy Equation (31) with a value of $F_D \geq 10$. As the value of $F_D$ increases, the laser beam approaches a more nearly perfectly non-diffracting state.

Referring now to FIGS. 3-7A, optical assemblies 100 for producing a pulsed laser beam 112 that is quasi non-diffracting (FIGS. 3-7A) and, in some embodiments, produce a non-axisymmetric beam spot 114 at the transparent workpiece 160 (FIGS. 4-7A). For example, FIG. 3 depicts a conventional optical assembly 100 for pulsed laser processing, for example, for producing a pulsed laser beam 112 that is quasi-non-diffracting. Further, FIGS. 4-7A each depict optical assemblies 100 that comprise additional components and arrangements not present in FIG. 3, for forming the non-axisymmetric beam spot 114 at the transparent workpiece 160. For example, the optical assembly 100 of FIG. 4 comprises an aspheric optical element 120 that is offset relative to the beam pathway 111, the optical assemblies 100 of FIGS. 5A and 5B include one or more optical blocking elements 140 positioned in the beam pathway 111. Further, the optical assemblies 100 of FIGS. 6 and 7A each comprise one or more decohering optical elements configured to decohere a first beam portion of the pulsed laser beam 112 from a second beam portion of the pulsed laser beam 112. In particular, decohering optical element of the optical assembly 100 of FIG. 6 comprises an optical delay plate 142 positioned in the beam pathway 111, and the decohering optical element of the optical assembly 100 of FIG. 7A comprises a split quarter waveplate 150 (also depicted in FIG. 7B) positioned in the beam pathway 111. As used herein, to "decohere" means to make a first portion of the pulsed laser beam incoherent with a second portion of the pulsed laser beam.

Figure 4:
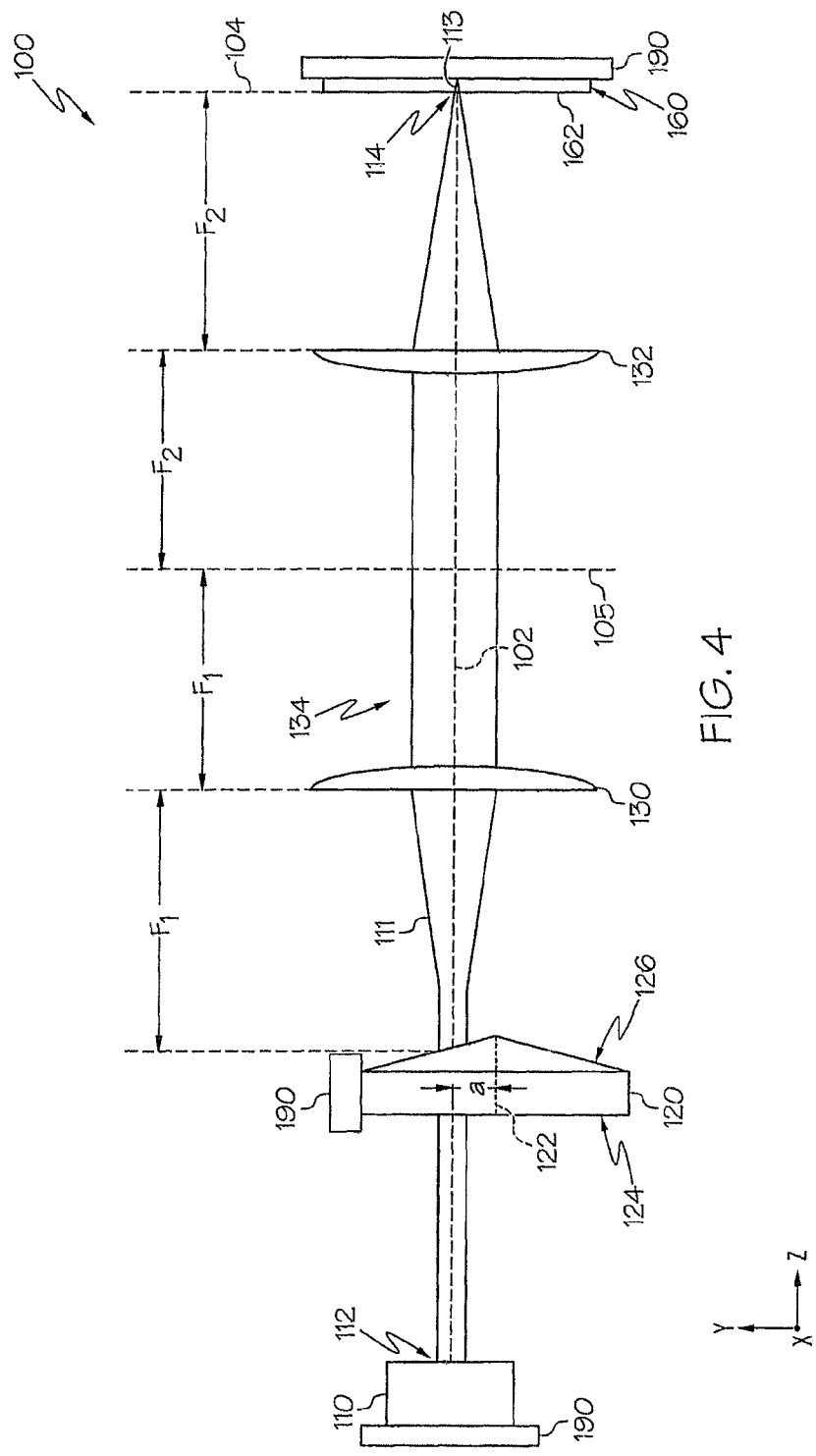
FIG. 4 schematically depicts an embodiment of an optical assembly for pulsed laser processing comprising an offset aspheric optical element, according to one or more embodiments described herein.
Figure 5A:
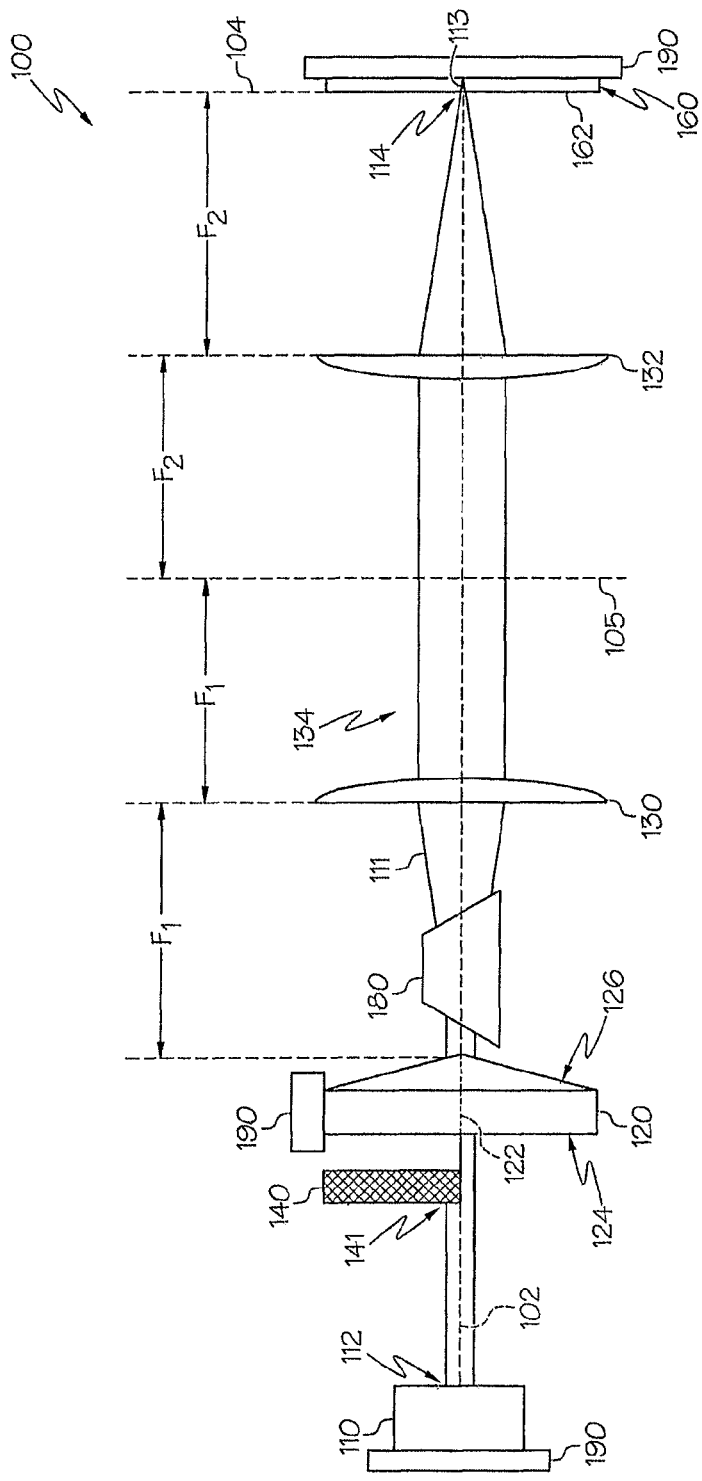
FIG. 5A schematically depicts an embodiment of an optical assembly for pulsed laser processing comprising an optical blocking element, according to one or more embodiments described herein.
Figure 5B:
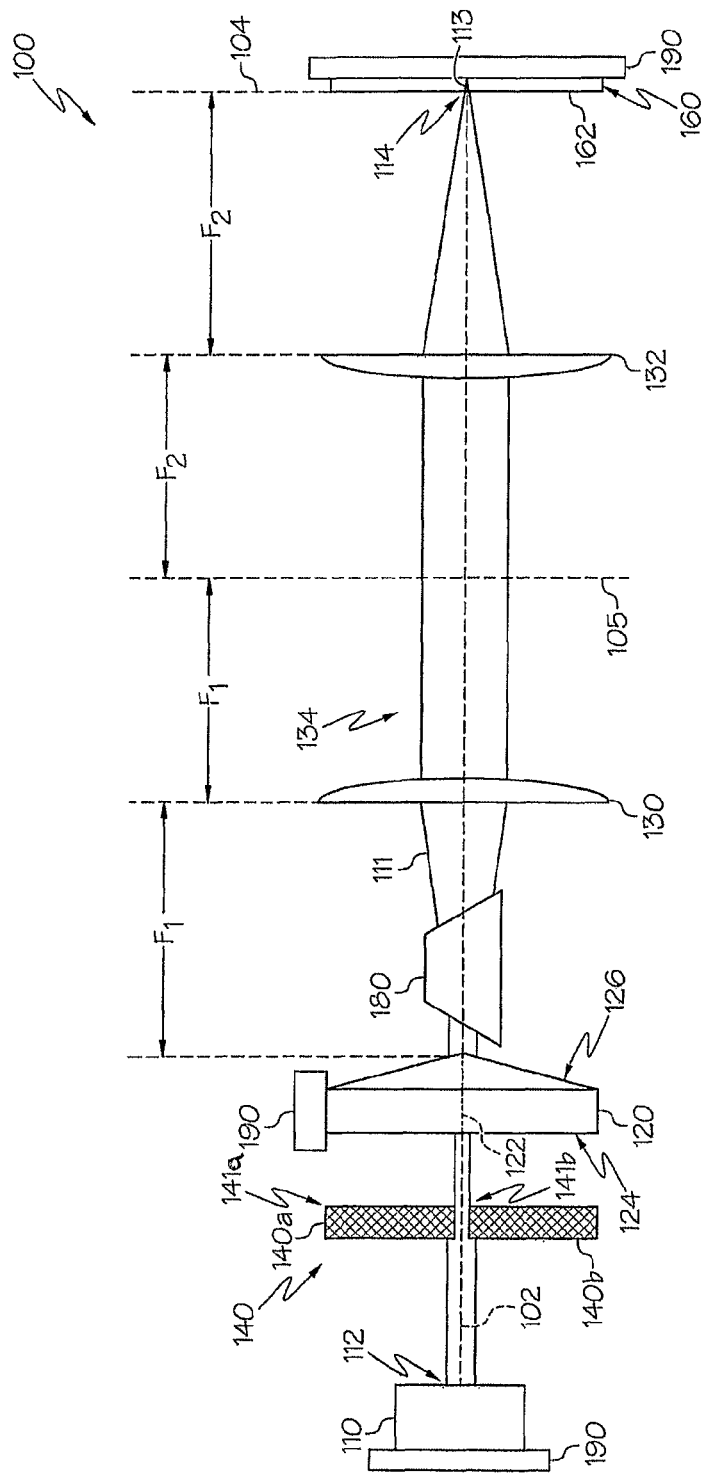
FIG. 5B schematically depicts an embodiment of an optical assembly for pulsed laser processing comprising two optical blocking elements, according to one or more embodiments described herein.
Figure 6:
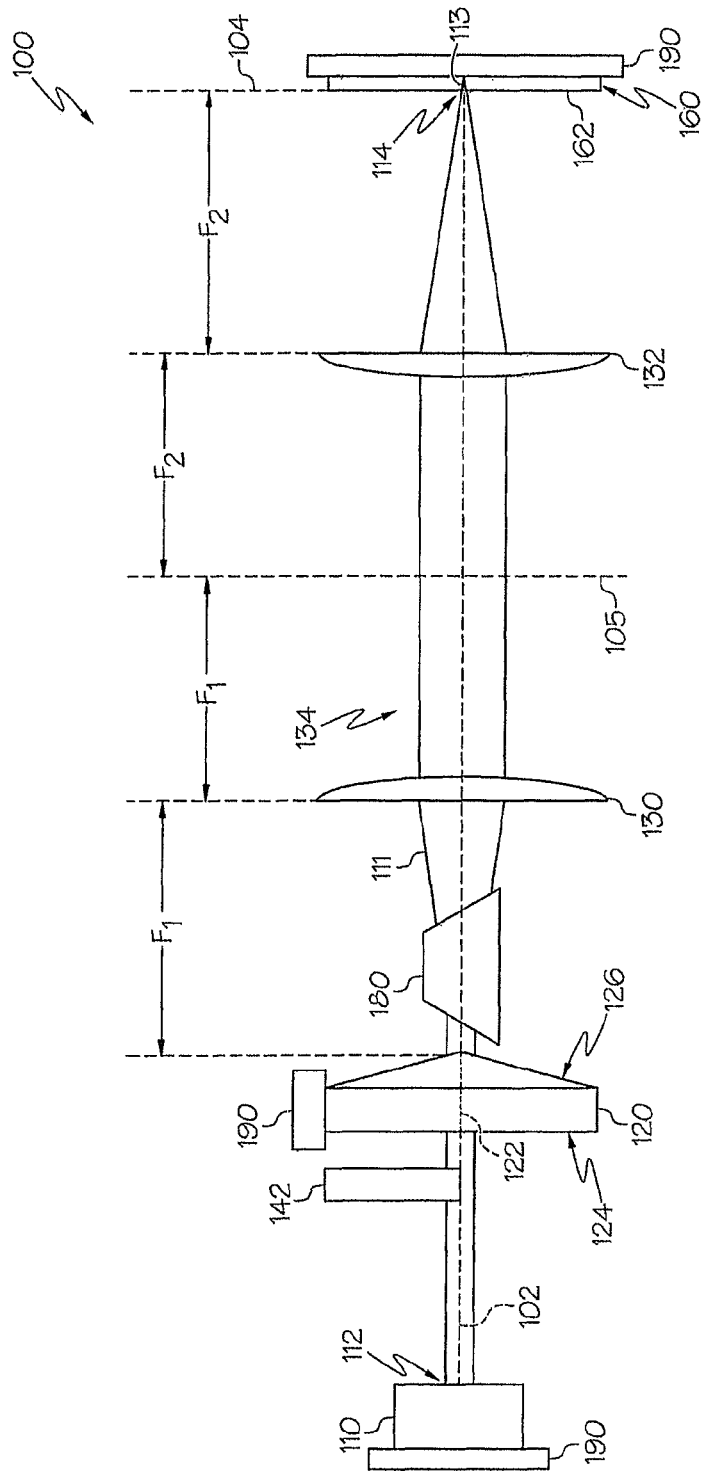
FIG. 6 schematically depicts an embodiment of an optical assembly for pulsed laser processing comprising an optical delay plate, according to one or more embodiments described herein.

Each of FIGS. 3-7A comprise a beam source 110, the aspheric optical element 120 (e.g., an axicon lens), a first lens 130, and a second lens 132. Further, the transparent workpiece 160 may be positioned such that the pulsed laser beam 112 output by the beam source 110 irradiates the transparent workpiece 160, for example, after traversing the aspheric optical element 120 and thereafter, both the first and second lens 130, 132. An optical axis 102 extends between the beam source 110 and the transparent workpiece 160 along the Z-axis. Moreover, the optical assemblies 100 of FIGS. 3-7A may optionally comprise a dove prism 180 positioned between the aspheric optical element 120 and the transparent workpiece 160 in the beam pathway 111. While the dove prism 180 is depicted in FIGS. 5A, 5B, and 6, it should be understood that any of the optical assemblies 100 described herein may comprise the dove prism 180. Further, rotation of the dove prism 180 about the optical axis 102 may rotate the beam cross section of the pulsed laser beam 112 (e.g., the non-axisymmetric beam spot 114). Rotation of the non-axisymmetric beam spot 114 facilitates orienting the long axis 116 of the non-axisymmetric beam spot 114 along the desired line of separation 165 of the transparent workpiece 160. As described in the embodiments below, other methods of rotating the non-axisymmetric beam spot 114 are contemplated.

Referring still to FIGS. 3-7A, the beam source 110 may comprise any known or yet to be developed beam source 110 configured to output pulsed laser beams 112. In operation, the defects 172 of the contour line 170 are produced by interaction of the transparent workpiece 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent workpiece 160 may be well suited for materials that are transparent to the selected pulsed laser wavelength.

Suitable laser wavelengths for forming defects 172 are wavelengths at which the combined losses of absorption and scattering by the transparent workpiece 160 are sufficiently low. In embodiments, the combined losses due to absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the direction of propagation of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined absorption and scattering loss requirement for a given substrate material can also be used.

In operation, the pulsed laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour line 170 may utilize the beam source 110 (e.g., an ultra-short pulse laser) in combination with the optics depicted and described below with respect to FIGS. 3A-7A, to project the non-axisymmetric beam spot 114 on the transparent workpiece 160 and generate the pulsed laser beam focal line 113 of FIG. 1B. The pulsed laser beam focal line 113 comprises a quasi non-diffracting beam, such as a non-axisymmetric Gauss-Bessel beam, as defined above, to fully perforate the transparent workpiece 160 to form the series of defects 172 in the transparent workpiece 160. In some embodiments, the pulse duration of the individual pulses is in a range of from about 1 picosecond to about 100 picoseconds, such as from about 5 picoseconds to about 20 picoseconds, and the repetition rate of the individual pulses may be in a range from about 1 kHz to 4 MHz, such as in a range from about 10 kHz to about 3 MHz, or from about 10 kHz to about 650 kHz.

Figure 7D:
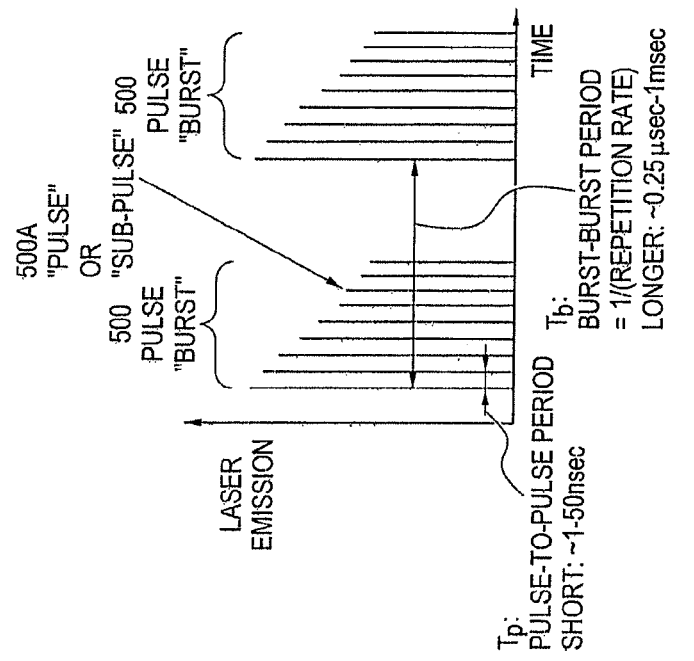
FIG. 7D graphically depicts relative intensity of laser pulses vs. time within another exemplary pulse burst, according to one or more embodiments described herein.
Figure 7C:
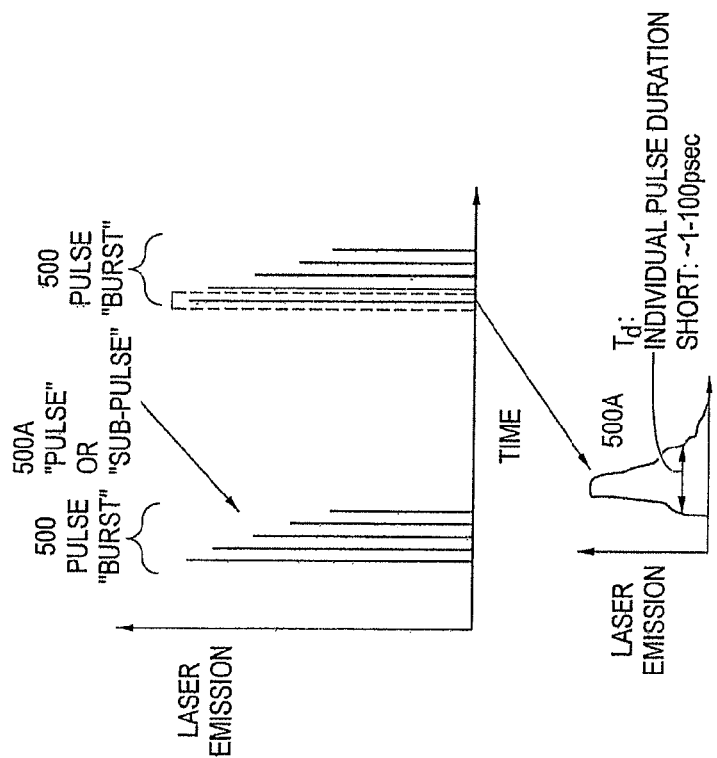
FIG. 7C graphically depicts the relative intensity of laser pulses within an exemplary pulse burst vs. time, according to one or more embodiments described herein, according to one or more embodiments described herein.

Referring also to FIGS. 7C and 7D, in addition to a single pulse operation at the aforementioned individual pulse repetition rates, the pulses may be produced in pulse bursts 500 of two pulses 500A (e.g., sub-pulses) or more (such as, for example, 3 pulses, 4 pulses, 5 pulses, 10 pulses, 15 pulses, 20 pulses, or more per pulse burst, such as from 1 to 30 pulses per pulse burst 500, or from 5 to 20 pulses per pulse burst 500). The pulses 500A within the pulse burst 500 may be separated by a duration that is in a range from about 1 nsec to about 50 nsec, for example, from about 10 nsec to about 30 nsec, such as about 20 nsec. In other embodiments, the pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 7D) between adjacent pulses 500A within a pulse burst 500 may be relatively uniform (e.g., within about 10% of one another). For example, in some embodiments, each pulse 500A within a pulse burst 500 is separated in time from the subsequent pulse by approximately 20 nsec (50 MHz). For example, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 7D) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d \le 15$ psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 may be described in terms of the burst energy (i.e., the energy contained within a pulse burst 500 where each pulse burst 500 contains a series of pulses 500A), or in terms of the energy contained within a single laser pulse (many of which may comprise a burst). The energy per pulse burst may be from about 25 µJ to about 750 µJ, e.g., from about 50 µJ to about 500 µJ, or from about 500 µJ to about 250 µJ. For some glass compositions, the energy per pulse burst may be from about 100 µJ to about 250 µJ. However, for display or TFT glass compositions, the energy per pulse burst may be higher (e.g., from about 300 µJ to about 500 µJ, or from about 400 µJ to about 600 µJ, depending on the specific glass composition of the transparent workpiece 160). The use of a pulsed laser beam 112 capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst allows access to larger timescales of high intensity interaction with the material than is possible with single-pulse lasers.

Referring again to FIGS. 3-7A, the aspheric optical element 120 is positioned within the beam pathway 111 between the beam source 110 and the transparent workpiece 160. In operation, propagating the pulsed laser beam 112, e.g., an incoming Gaussian beam, through the aspheric optical element 120 may alter pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1 r+a_2 r^2+a_3 r^3+a_4 r^4+a_5 r^5+a_6 r^6+a_7 r^7+a_8 r^8+a_9 r^9+a_{10} r^{10}+$ $a_{11}r^{11}+a_{12}r^{12}$ where z' is the surface sag of the aspheric surface, r is the distance between the aspheric surface and the optical axis 102 in a radial direction (e.g., in an x-direction or a y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2, a_3 \ldots, a_{12} \neq 0$). In one example embodiment, the aspheric optical element 120 comprises a third-order aspheric optical element such as a cubically shaped optical element, which comprises a coefficient $a_3$ that is non-zero.

In some embodiments, when the aspheric optical element comprises an axicon, the axicon may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon lens. Further, the laser output surface 126 terminates at a conical tip. Moreover, the aspheric optical element 120 includes a centerline axis 122 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIGS. 3-7A, the first lens 130 and the second lens 132 may collimate the pulsed laser beam 112 within a collimation space 134 between the first and second lens 130, 132. Further, the second lens 132 may focus the pulsed laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Further, the first lens 130 comprises a first focal length $F_1$ and the second lens 132 comprises a second focal length $F_2$. As used herein "focal length" is defined as the distance between the lens and the focal point of the lens. In some embodiments, the first focal length $F_1$ and second focal length $F_2$ may be equal. In other embodiments, the first focal length $F_1$ and the second focal length $F_2$ may be different, for example, the second focal length $F_2$ may be less than the first focal length $F_1$ or alternatively may be greater than the second focal length $F_2$. In some embodiments, the first and second lens 130, 132 may have focal lengths $F_1$, $F_2$. respectively, of from about 10 mm to about 200 mm (such as from about 25 mm to about 200 mm, or from about 50 mm to 150 mm or from about 75 mm to about 100 mm, or from about from about 25 mm to about 50 mm, or the like).

In some embodiments, the first lens 130 may be spaced from the second lens 132 by the sum of the first focal length $F_1$ and the second focal length $F_2$ such that a common focal plane 105 is positioned in the collimation space 134 between the first lens 130 and the second lens 132. However, it should be understood that other spacing arrangements are contemplated. The common focal plane 105 is a location along the beam pathway 111 between the first lens 130 and the second lens 132 spaced a first focal length $F_1$ downstream from the first lens 130 and spaced a second focal length $F_2$ upstream from the second lens 132. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Referring now to FIG. 4, an embodiment of the optical assembly 100 is depicted comprising the aspheric optical element 120 positioned offset relative to the beam pathway 111 of the pulsed laser beam 112 in a radial direction (e.g., a direction along a radius of the pulsed laser beam 112, orthogonal to the beam propagation direction). By offsetting the aspheric optical element 120 relative to the beam pathway 111, the resultant beam spot projected onto the transparent workpiece 160 may comprise the non-axisymmetric beam spot 114 depicted in FIG. 2. The aspheric optical element 120 may be positioned offset from the beam pathway 111 (e.g., offset in the X-Y plane) by an offset distance a. In particular, the offset distance a is the distance in the X-Y plane between the centerline axis 122 of the aspheric optical element 120 and the cross-sectional center of the pulsed laser beam as the pulsed laser beam irradiates the laser input surface 124 of the aspheric optical element 120. The relative offset between the aspheric optical element 120 and the beam pathway may be achieved by shifting the aspheric optical element 120 along the X-Y plane, shifting the beam source 110 along the X-Y plane, or both. The magnitude of the offset required to sufficiently break the symmetry of the resulting beam spot is a function of the diameter of the pulsed laser beam 112, with smaller input laser beam diameters requiring less offset to sufficiently break the symmetry. In some embodiments, the offset distance a may comprise from about 10 microns to about 500 microns, for example, 20 microns, 50 microns, 100 microns, 250 microns, or the like. In some embodiments, the offset distance a may be from about 20 microns to about 100 microns, or from about 50 microns to about 100 microns, or the like. In some embodiments, the offset distance may comprise a distance from about 10% to about 75% of a cross sectional diameter of the pulsed laser beam 112 at a contact location between the pulsed laser beam 112 and the aspheric optical element 120 (e.g., at the laser input surface 124 of the aspheric optical element 120).

By offsetting the aspheric optical element 120 relative to the beam pathway 111, the resultant pulsed laser beam 112 may comprise a decreased overall intensity, for example, by a factor of about 4. Further the cross section of the pulsed laser beam 112 may broaden in the X-direction, the Y-direction, or a combination thereof in the X-Y plane by a factor of from about 1.2 to about 2, for example, 1.4, 1.6, 1.8, or the like. Broadening the cross section of the pulsed laser beam 112 forms the non-axisymmetric beam spot 114 having the long axis 116 in the direction of broadening. The resultant pulsed laser beam 112 may comprise a non-axisymmetric cone of rays, which form a non-axisymmetric ring in the collimation space 134 after traversing the first lens 130. Further, the cross section of the pulsed laser beam 112 (e.g., the non-axisymmetric beam spot 114) may be rotated by rotating the aspheric optical element 120 about the optical axis 102.

Referring now to FIGS. 5A and 5B, embodiments of the optical assembly 100 are depicted comprising one or more optical blocking elements 140 (e.g., opaque optical elements) that are positioned at one or more blocking locations 141 along the beam pathway 111, blocking a portion of the pulsed laser beam 112 propagating between the beam source 110 and the transparent workpiece 160. In some embodiments, the optical blocking elements 140 may comprise an opaque plate which may further comprise an aperture. For example, the optical blocking elements 140 may comprise a metal plate, or other substance that can withstand the energy of the pulsed laser beam 112 without breaking or being damaged. The optical blocking element 140 may be positioned in the beam pathway 111 such that the optical blocking element 140 blocks from about 5% to about 95% of the beam intensity of the pulsed laser beam 112, for example, at least about 10%, 20%, 30%, 40%, 50%, 60%, 70%, 80%, 85%, 90%, or the like. As one example, the optical blocking element 140 blocks from about 25% to about 80% of the beam intensity of the pulsed laser beam 112. Blocking a larger percentage of the beam intensity of the pulsed laser beam 112 increases the length of the long axis 116 of the non-axisymmetric beam spot 114 relative to the length of the short axis 115 of the non-axisymmetric beam spot 114. However, blocking a larger percentage of the beam intensity of the pulsed laser beam 112 increases the amount of power in the pulsed laser beam 112 lost at the optical blocking element 140.

In some embodiments, the optical blocking element 140 may block a cross sectional sector of the pulsed laser beam 112 (i.e., a sector defined by an azimuthal angle range or "pie slice" of the pulsed laser beam 112 that extends from a central location of the pulsed laser beam 112 to the outermost diameter of the pulsed laser beam 112). An optical blocking element 140 in the form of a sector has the advantage that equal percentages of the rays at all radii in the pulsed laser beam 112 are blocked. In such an optical assembly, the optics map rays of specific radii to corresponding specific locations along the pulsed laser beam focal line 113. In the example embodiment depicted in FIGS. 5A and 5B, the lower radius rays in the vicinity of the aspheric optical element 120 will be mapped to locations at the upstream end of the pulsed laser beam focal line 113, and the higher radius rays in the vicinity of the aspheric optical element 120 will be mapped to locations near the downstream end of the pulsed laser beam focal line 113. If the optical blocking element 140 cuts out a larger fraction of rays at small radii than at large radii, then the magnitude or aspect ratio of the ellipticity of the cross sections of pulsed laser beam focal line 113 (the non-axisymmetric beam spot 114, as one example) will change throughout its length. As such, shaping the optical blocking element 140 in the form of a pie slice ensures that the resulting cross sections of the pulsed laser beam focal line 113 will maintain a constant ellipticity through the full length of the pulsed laser beam focal line 113.

In other embodiments, the optical blocking element 140 may block a cross sectional chord portion of the pulsed laser beam 112, wherein the cross-sectional chord portion of the pulsed laser beam 112 is bounded by a portion of the cross sectional circumference of the pulsed laser beam 112 and an arbitrary cross-sectional chord of the pulsed laser beam 112. Further, in this example embodiment, a portion of the optical blocking element 140 that is positioned in the beam pathway 111 is coterminous with the arbitrary cross-sectional chord. Moreover, it should be understood that the optical blocking element 140 may block any arbitrary cross sectional portion of the pulsed laser beam 112.

Further, the optical blocking element 140 may be positioned between the beam source 110 and the transparent workpiece 160. Because the optical blocking element 140 is positioned between the beam source 110 and the transparent workpiece 160, in operation, the pulsed laser beam 112 will travel through the aspheric optical element 120 and beyond the optical blocking element 140 (e.g., an unblocked portion of the pulsed laser beam 112 will travel beyond the optical blocking element 140 but the blocked portion of the pulsed laser beam 112 not travel beyond the optical blocking element 140). Further, the pulsed laser beam 112 will travel through the aspheric optical element 120 and beyond the optical blocking element 140 regardless of the relative order of positioning of the aspheric optical element 120 and the optical blocking element 140 along the direction of beam propagation (e.g., the Z-direction). For example, the optical blocking element 140 may be positioned upstream from the aspheric optical element 120, such that the optical blocking element 140 is positioned between the beam source 110 and the aspheric optical element 120. Further, the optical blocking element 140 may be positioned downstream from the aspheric optical element 120, such that the optical blocking element 140 is positioned between the aspheric optical element 120 and the transparent workpiece 160.

In some embodiments, the optical blocking element 140 may be positioned in the collimation space 134 between the first and second lens 130, 132, for example, at the common focal plane 105. Further, the cross-section of the pulsed laser beam focal line 113 (e.g., the non-axisymmetric beam spot 114) may be rotated by rotating the optical blocking element 140 about the optical axis 102. In some embodiments, the non-axisymmetric beam spot 114 may be formed by both offsetting the aspheric optical element 120 relative to the beam pathway 111 and blocking a portion of the pulsed laser beam 112 with the optical blocking element 140. If the offset of the aspheric optical element 120 is used to direct more of the laser beam energy past the optical blocking element 140, then this combination of offsetting and blocking may lower the amount of power loss caused by the optical blocking element 140 while still ensuring that the elliptical or otherwise non-axisymmetric beam spot 114 is generated and projected onto the transparent workpiece 160.

Further, as depicted in FIG. 5B, in some embodiments, the optical assembly 100 may comprise a first optical blocking element 140a and a second optical blocking element 140b. The first optical blocking element 140a is positioned in the beam pathway 111 at a first blocking location 141a and the second optical blocking element is positioned in the beam pathway 111 at a second blocking location 141b. The first optical blocking element 140a and the second optical blocking element 140b may be positioned such that they each block a portion of the beam pathway 111, for example, different portions of the beam pathway 111. In some embodiments, the first optical blocking element 140a and the second optical blocking element 140b may each block different cross section segments of the pulsed laser beam 112. For example, the optical blocking element 140a, 140b may define cross sectional chord portions of each blocked cross sectional segment that are positioned in parallel such that they block opposite sides of the cross section of the pulsed laser beam 112. Or, in another example, the optical blocking element 140a, 140b may define different sectors of a circle, such that they block opposite sides of the cross section of the pulsed laser beam 112.

In some embodiments, the first and second blocking locations 141a, 141b are positioned at the same Z-axis location along the optical axis 102, as depicted in FIG. 5B. In other embodiments, the first and second blocking locations 141a 141b may be different locations along optical axis 102. Further, the first and second optical blocking elements 140a, 140b may collectively block from about 5% to about 75% of the intensity of the pulsed laser beam 112. Further, the first and second first and second optical blocking elements 140a, 140b may block equivalent percentages of the intensity of the pulsed laser beam 112 or different percentages of the intensity of the pulsed laser beam 112.

Moreover, while the blocking locations 141, 141a, 141b in FIGS. 5A and 5B are each depicted between the beam source 110 and the aspheric optical element 120, it should be understood that the blocking locations 141, 141a, 141b may be any location between the beam source 110 and the and the transparent workpiece 160, for example, between the first lens 130 and the second lens 132, for example, at the common focal plane 105. While not intending to be limited by theory, blocking the pulsed laser beam 112 with multiple (e.g., two) optical blocking elements 140 may project multiple beam spots onto the imaging surface 162 of the transparent workpiece shaped such that the multiple beam spots collectively defining the non-axisymmetric beam spot 114 at the transparent workpiece 160, as depicted in FIG. 2.

Referring now to FIG. 6, an example embodiment of the optical assembly 100 is depicted comprising one or more optical delay plates 142 positioned between the beam source 110 and the transparent workpiece 160. In operation, positioning the optical delay plate 142 in the beam pathway 111 may form the non-axisymmetric beam spot 114 depicted in FIG. 2 by inducing an optical delay within a portion of the pulsed laser beam 112 to decohere a first beam portion of the pulsed laser beam 112 from a second beam portion by directing the first portion of the pulsed laser beam 112 through the optical delay plate to induce optical retardation of the first beam portion. The optical delay plate 142 may be positioned within the beam pathway 111 such that about 50% of the pulsed laser beam 112 (e.g., about 50% of the intensity of the pulsed laser beam 112) traverses the optical delay plate 142. While not intending to be limited by theory, the optical delay over half the pulsed laser beam 112 may form two beams collectively defining a non-axisymmetric beam spot 114 at the transparent workpiece 160. Further, the cross section of the pulsed laser beam 112 (e.g., the non-axisymmetric beam spot 114) may be rotated by rotating the optical delay plate 142 about the optical axis 102. Further, the optical delay plate 142 may be positioned upstream or downstream the aspheric optical element 120. For example, in some embodiments the optical delay plate 142 is positioned between the aspheric optical element 120 and the transparent workpiece 160 and in other embodiments, the optical delay plate 142 is positioned between the beam source 110 and the aspheric optical element 120.

Optically delaying a portion (for example, one half) of the pulsed laser beam 112 may form a single non-axisymmetric beam spot 114 if the portion of the beam that traverses the optical delay plate 142 and the portion of the beam that does not traverse the optical delay plate 142 combine incoherently. To achieve incoherence, the coherence length of the pulsed laser beam 112 may be shorter than the optical thickness of the optical delay plate 142. In such a case, the optical delay of the two beams need not be set to any exact amount or controlled precisely; the optical delay may only be greater than the coherence time of the laser pulse. This is substantially equivalent to randomizing the optical phase difference between the two portions of the laser beam. The coherence time $T_C$ of an individual laser pulse may be calculated using methods known in the art, and is mathematically described as $T_C = \lambda/c\Delta\lambda$ where $\lambda$ is the wavelength of the radiation, c is the speed of light, and $\Delta\lambda$ is the spectral bandwidth of the laser pulse. The thickness difference supplied by the optical delay plate 142 may be greater than the coherence time of the laser pulse, or equivalently, thicker than the coherence length of the laser pulse in the plate, which is mathematically described as $L_C = \sqrt{2\ln2}/\pi n(\lambda^2/\Delta\lambda)$, where n is the refractive index of the material of the optical delay plate 142. For example, for a 1030 nm laser of 12.2 nm spectral pulse width, the coherence time $T_C$ will be about 290 psec, and the required thickness of a n=1.5 glass plate to decohere the beam will be greater than 38 microns. In another example, for a 1064 nm laser of 0.38 nm spectral pulse width, the coherence time will be about 290 psec, the required thickness of an index n=1.5 glass plate to decohere the beam will be greater than 1.3 mm.

While not intending to be limited by theory, the exact coherence time and coherence length are functions of the exact temporal and spectral shapes of the laser pulses, and as such, the formulas above are approximations. Thus, it is possible for sufficient decohering functionality of the delay plate to be achieved with thickness that may be slightly less than the values calculated by the above formulas (e.g. about 10% less, about 25% less, about 50% less, or the like).

Further, in some embodiments, rather than decohere the two portions of the beam, the optical delay plate 142 may be configured to induce a specific optical delay, for example, the optical delay plate 142 may induce an optical retardation of $\pi$ over half the pulsed laser beam 112 (where one optical period of the laser wavelength is considered to cover $2\pi$ radians of optical phase, so an optical retardation of $\pi$ is a delay of one-half the optical period), an optical retardation of $0.875\pi$ over half the pulsed laser beam 112, and, in some embodiments, an optical retardation of $0.5\pi$ over half the laser beam. The exact profile of the intensity cross section of the beam can be altered from that of two equal high intensity spots near the center of the beam, to having one spot with more intensity and the other with less intensity near the center of the beam, to other more complex interference patterns, simply by adjusting the precise optical phase delay between the two portions of the beam. The specific optical retardation induced by the optical delay plate 142 is correlated with the optical thickness of the optical delay plate 142. However, while such a system generates a non-axisymmetric beam spot 114, the resultant beam spot is sensitive to exact optical path lengths of the two beam portions, which can be altered by environmental changes such as temperature and humidity. Moreover, such a multi-spot pattern has a complex multi-axis stress concentration, which is may not be useful as a stress concentration for controlling crack formation as would a beam with an elliptical core.

Referring now to FIGS. 7A and 7B, embodiments of the optical assembly 100 are depicted comprising the split quarter waveplate 150 positioned between the beam source 110 and the transparent workpiece 160. The split quarter waveplate 150 comprises a first plate portion 152 having a first fast axis 156a and a first slow axis 158a. The split quarter waveplate 150 also comprises and a second plate portion 154 having a second fast axis 156b and a second slow axis 158b. Further, the first fast axis 156a is orthogonal to the second fast axis 156b and the first slow axis 158a is orthogonal to the second slow axis 158b. When the pulsed laser beam 112 traverses the split quarter waveplate 150, the first plate portion 152 having the first fast axis 156a and first slow axis 158a polarizes a first beam portion of the pulsed laser beam 112 into a first polarization (e.g., a specific horizontal, vertical, or circular polarization) and the second plate portion 154 having the second fast axis 156b polarizes a second beam portion of the pulsed laser beam 112 into a second polarization (e.g., another specific horizontal, vertical, or circular polarization). Polarizing the first beam portion to a first polarization and polarizing the second beam portion to a second polarization that is orthogonal the second beam portion decoheres the first beam portion from the second beam portion.

Further, the first polarization is orthogonal to the second polarization such that the first beam portion and the second beam portion combine incoherently downstream from the split quarter waveplate 150 to form the non-axisymmetric beam spot 114 depicted in FIG. 2. While not intending to be limited by theory, two pulsed laser beam portions having orthogonal polarizations (e.g., vertical and horizontal, right-handed circular and left-handed circular) do not interfere and, when each are projected onto the transparent workpiece 160, each beam portion combines incoherently and collectively form the non-axisymmetric beam spot 114 (e.g., an ellipse). As an illustrative example, the first polarization and the second polarization each comprise a location on a Poincaré Sphere positioned apart by about 90° such that they are orthogonal. It should be understood that incoherent combination between the first and second beam portions may occur with any two orthogonal polarizations.

As depicted in FIG. 7A, the optical assembly 100 may further comprise a polarizer 144 and a quarter waveplate 146. The polarizer 144 and the quarter waveplate 146 are each positioned in the beam pathway 111 between the beam source 110 and the split quarter waveplate 150 such that the pulsed laser beam 112 traverses the polarizer 144 and the quarter waveplate 146 prior to traversing the split quarter waveplate 150. In operation, the polarizer 144 may filter (e.g., prevent) one or more specific polarizations from traversing the polarizer 144. The quarter waveplate 146 may polarize the pulsed laser beam 112 into a single polarization such that the pulsed laser beam 112 comprises a single polarization, such as right-handed circular polarization, or left-handed circular polarization, when the pulsed laser beam 112 reaches the split quarter waveplate 150. Further, as depicted in FIG. 7A, the split quarter waveplate 150 is positioned in the beam pathway 111 between the quarter waveplate 146 and the transparent workpiece 160. The split quarter waveplate 150 may be positioned upstream or downstream the aspheric optical element 120. For example, in some embodiments, the split quarter waveplate 150 is positioned between the aspheric optical element 120 and the transparent workpiece 160, and in other embodiments, the split quarter waveplate 150 is positioned between the beam source 110 and the aspheric optical element 120.

In the non-limiting example depicted in FIG. 7A, the split quarter waveplate 150 may be positioned in the collimation space 134 between the first lens 130 and the second lens 132, for example, positioned at the common focal plane 105, such that a minimal amount of power in the pulsed laser beam 112 is lost due to interaction at the contact location between the first plate portion 152 and the second plate portion 154 of the split quarter waveplate 150.

While the split quarter waveplate 150 is depicted as comprising two plate portions (e.g., the first and second plate portions 152, 154), other embodiments of the split quarter waveplate 150 may comprise any number of plate portions. As with the previously described blocking elements, these portions of the spilt quarter waveplate 150 may be made in the form of cross sectional chord portions, or more preferably sectors. In these embodiments, a first plurality of plate portions comprise the first fast axis 156a and the first slow axis 158a and a second plurality of plate portions comprise the second fast axis 156b and the second slow axis 158b. Further, the first plurality of plate portions may collectively comprise about 50% of the split quarter waveplate 150 and the second plurality of plate portions may collectively comprise another 50% of the split quarter waveplate 150.

Referring again to FIGS. 1A-7B, a method for forming the contour line 170 comprising defects 172 along the desired line of separation 165 includes directing (e.g., localizing) a pulsed laser beam 112 oriented along the beam pathway 111 and output by the beam source 110 into the transparent workpiece 160 such that the portion of the pulsed laser beam 112 directed into the transparent workpiece 160 generates an induced absorption within the transparent workpiece and the induced absorption produces a defect 172 within the transparent workpiece 160. For example, the pulsed laser beam 112 may comprise a pulse energy and a pulse duration sufficient to exceed a damage threshold of the transparent workpiece 160. In some embodiments, directing the pulsed laser beam 112 into the transparent workpiece 160 comprises focusing the pulsed laser beam 112 from output by the beam source 110 into a pulsed laser beam focal line 113 oriented along the beam propagation direction (e.g., the Z axis). The transparent workpiece 160 is positioned in the beam pathway 111 to at least partially overlap the pulsed laser beam focal line 113 of pulsed laser beam 112. The pulsed laser beam focal line 113 is thus directed into the transparent workpiece 160. The pulsed laser beam 112, e.g., the pulsed laser beam focal line 113 generates induced absorption within the transparent workpiece 160 to create the defect 172 in the transparent workpiece 160. In some embodiments, the first lens 130 and/or the second lens 132 may focus the pulsed laser beam 112. In other embodiments, for example, embodiments that do not include the first lens 130 and second lens 132, the aspheric optical element 120 (e.g., an axicon lens) may focus the pulsed laser beam 112. In some embodiments, individual defects 172 may be created at rates of several hundred kilohertz (i.e., several hundred thousand defects per second).

In operation, the position of pulsed laser beam focal line 113 may be controlled by suitably positioning and/or aligning the pulsed laser beam 112 relative to the transparent workpiece 160 as well as by suitably selecting the parameters of the optical assembly 100. Further, the pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

Referring still to FIGS. 1A-7A, the method for forming the contour line 170 comprising defects 172 along the desired line of separation 165 may include translating the transparent workpiece 160 relative to the pulsed laser beam 112 (or the pulsed laser beam 112 may be translated relative to the transparent workpiece 160, for example, in a translation direction 101 depicted in FIGS. 1A and 2) to form contour lines 170 that trace out the shape of a desired part with defects 172. The defects 172 that may penetrate the full depth of the glass. It should be understood that while sometimes described as "holes" or "hole-like," the defects 172 disclosed herein may generally not be void spaces, but are rather portions of the workpiece which has been modified by laser processing as described herein. In some embodiments, the defects 172 may generally be spaced apart from one another by a distance of from about 5 microns to about 20 microns. For example, suitable spacing between the defects 172 may be from about 0.1 microns to about 30 microns, such as from about 5 microns to about 15 microns, from about 5 microns to about 12 microns, from about 7 microns to about 15 microns, or from about 7 microns to about 12 microns for the TFT/display glass compositions. Further, the translation of the transparent workpiece 160 relative to the pulsed laser beam 112 may be performed by moving the transparent workpiece 160 and/or the beam source 110 using one or more translation stages 190.

Beyond the perforation of a single transparent workpiece 160, the process may also be used to perforate stacks of transparent workpieces 160, such as stacks of sheets of glass, and may fully perforate glass stacks of up to a few mm total height with a single laser pass. A single glass stack can comprise of various glass types within the stack, for example one or more layers of soda-lime glass layered with one or more layers of Corning code 2318 glass. The glass stacks additionally may have air gaps in various locations. According to another embodiment, ductile layers such as adhesives may be disposed between the glass stacks. However, the pulsed laser process described herein will still, in a single pass, fully perforate both the upper and lower glass layers of such a stack.

Further, following the formation of the contour line 170 in the transparent workpiece 160, a stress inducing source, such as a mechanical or thermal source may be utilized to separate the transparent workpiece 160 along the contour line 170. According to embodiments, the thermal source, such as an infrared laser beam, may be used to create thermal stress and thereby separate the transparent workpiece 160 at the contour line 170. In embodiments, an infrared laser may be used to initiate spontaneous separation and then the separation may be finished mechanically. Suitable infrared lasers to create thermal stress in glass would typically have wavelengths that are readily absorbed by glass, typically having wavelengths ranging from 1.2 microns to 13 microns, for example, a range of 4 microns to 12 microns. The infrared laser beam, such as a laser beam produced by a carbon dioxide laser (a "$CO_2$ laser"), a carbon monoxide laser (a "CO laser"), a solid state laser, a laser diode, or combinations thereof, is a controlled heat source that rapidly increases the temperature of the transparent workpiece 160 at or near the contour line 170. This rapid heating may build compressive stress in the transparent workpiece 160 on or adjacent to the contour line 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour line 170 and through the thickness of the transparent workpiece 160, resulting in full separation of the transparent workpiece 160 along the contour line 170. Without being bound by theory, it is believed that the tensile stress may be caused by expansion of the glass (i.e., changed density) in portions of the workpiece with higher local temperature.

In view of the foregoing description, it should be understood that formation of a contour line comprising defects along a desired line of separation may be enhanced by utilizing a pulsed laser beam which is shaped by an optical assembly such that the pulsed laser beam projects a non-axisymmetric beam spot onto the workpiece along the desired line of separation.

EXAMPLES

Example 1

Figure 8A:
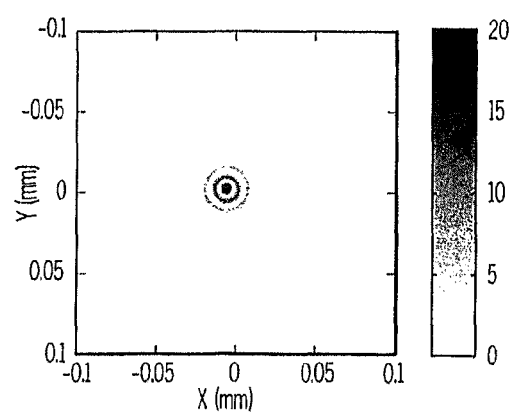
FIG. 8A depicts a cross-sectional intensity plot of an example pulsed laser beam, according to one or more embodiments described herein.
Figure 8B:
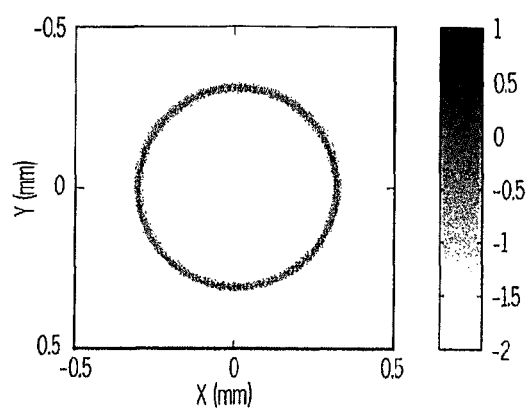
FIG. 8B depicts a logarithmic intensity plot of a Fourier transform plane of an example pulsed laser beam, according to one or more embodiments described herein.
Figure 8C:
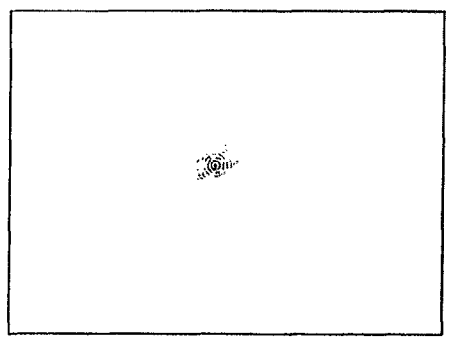
FIG. 8C depicts a near-field micrograph of an example pulsed laser beam, according to one or more embodiments described herein.

Example 1 is a modeled result of a pulsed laser beam having a 532 nm wavelength output into an example optical assembly having an aspheric optical element that is aligned with the beam pathway (e.g., no offset). The pulsed laser beam is output as a symmetric Gaussian beam and is formed into a quasi-non-diffracting beam by the aspheric optical element. FIG. 8A depicts an example cross-sectional intensity plot of the pulsed laser beam focal line (e.g., quasi-non diffracting pulsed laser beam focal line). As shown in FIG. 8A, without an offset, the beam spot is radially symmetric. The full-width half maximum (FWHM) of the cross-sectional intensity plot of FIG. 8A is 3.8 microns. FIG. 8B depicts a logarithmic intensity plot of the Fourier transform plane of the quasi-non diffracting pulsed laser beam focal line formed without an offset. Further, FIG. 8C depicts an experimental near-field micrograph of the quasi-non diffracting pulsed laser beam focal line formed without an offset at a peak line-focus position.

Example 2

Figure 9:
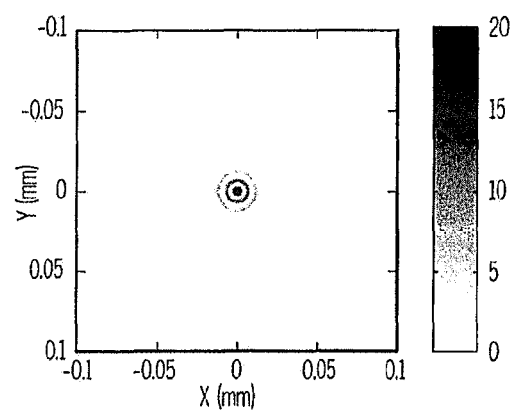
FIG. 9 depicts a cross-sectional intensity plot of an example pulsed laser beam, according to one or more embodiments described herein.

Example 2 is a modeled result of a pulsed laser beam having a 1064 nm wavelength output into an example optical assembly having an aspheric optical element that is offset relative to the beam pathway by an offset distance of 20 microns in the X-direction. The pulsed laser beam is output as an axisymmetric Gaussian beam and is formed into a quasi-non-diffracting beam by the aspheric optical element. FIG. 9 depicts an example cross-sectional intensity plot of the resultant non-axisymmetric pulsed laser beam focal line formed by the offset between the aspheric optical element and the beam pathway.

Example 3

Figure 10:
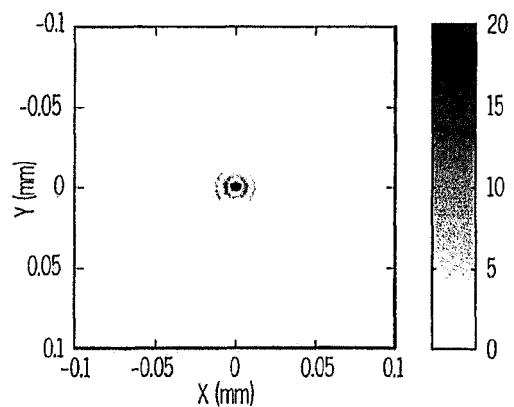
FIG. 10 depicts a cross-sectional intensity plot of an example pulsed laser beam, according to one or more embodiments described herein.

Example 3 is a modeled result of a pulsed laser beam having a 1064 nm wavelength output into an example optical assembly having an aspheric optical element that is offset relative to the beam pathway by an offset distance of 50 microns in the X-direction. The pulsed laser beam is output as an axisymmetric Gaussian beam and is formed into a quasi-non-diffracting beam by the aspheric optical element. FIG. 10 depicts an example cross-sectional intensity plot of the resultant non-axisymmetric pulsed laser beam focal line formed by the offset between the aspheric optical element and the beam pathway.

Example 4

Figure 11A:
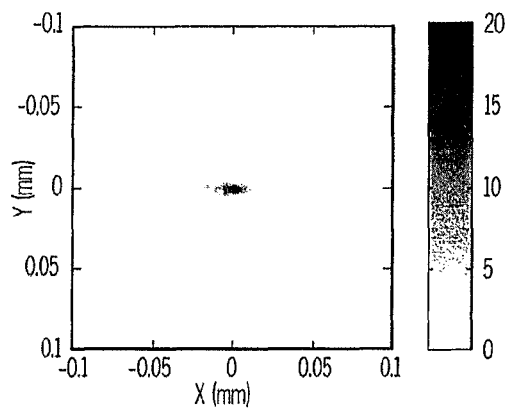
FIG. 11A depicts a two-dimensional cross-sectional intensity plot of an example pulsed laser beam, according to one or more embodiments described herein.
Figure 11B:
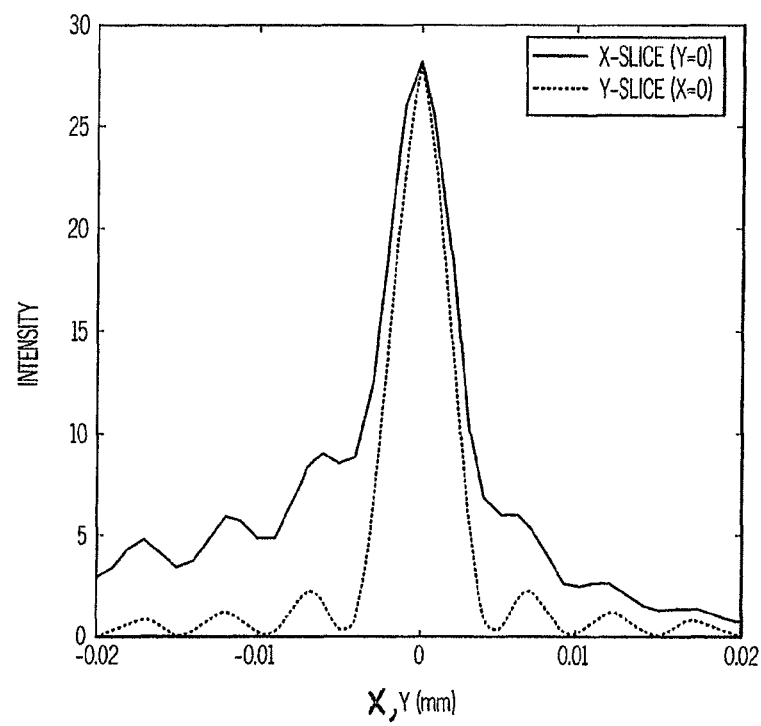
FIG. 11B depicts a set of one-dimensional horizontal and vertical line cross sections of the two-dimensional cross-sectional intensity plot of FIG. 11A, according to one or more embodiments described herein.
Figure 11C:
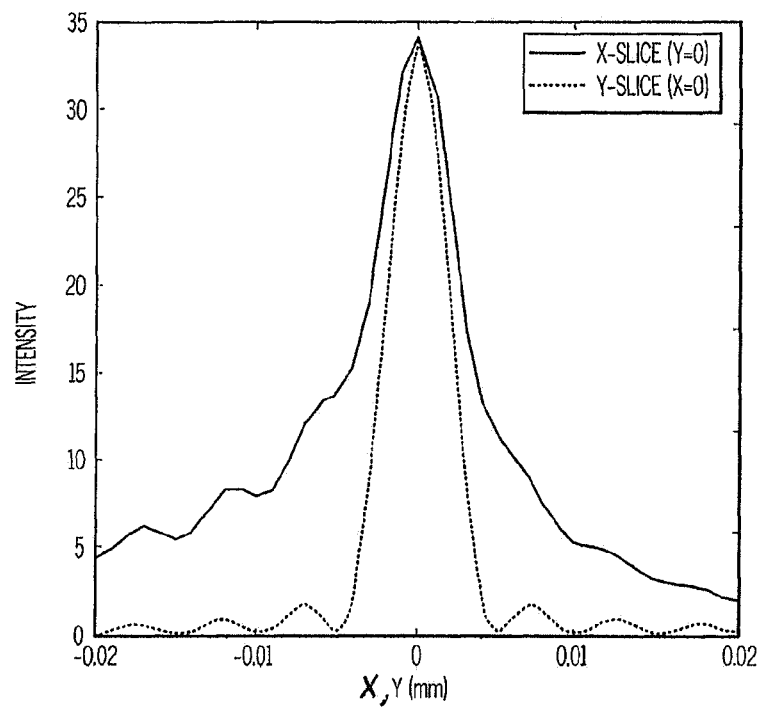
FIG. 11C depicts another set of one-dimensional horizontal and vertical line cross sections of the two-dimensional cross-sectional intensity plot of FIG. 11A, according to one or more embodiments described herein.
Figure 11D:
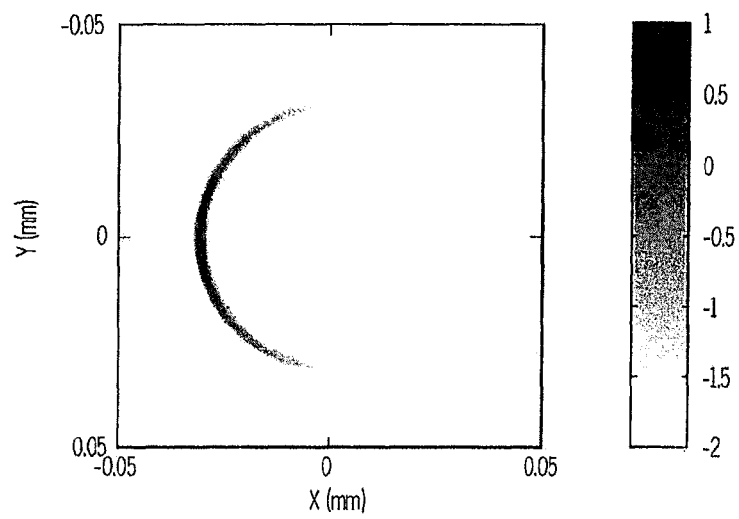
FIG. 11D depicts a logarithmic intensity plot of a Fourier transform plane of an example pulsed laser beam, according to one or more embodiments described herein.
Figure 11E:
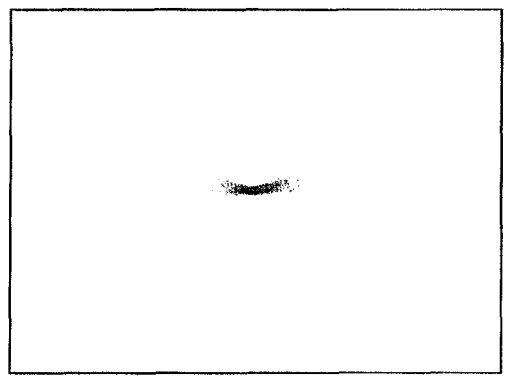
FIG. 11E depicts a near-field micrograph of an example pulsed laser beam, according to one or more embodiments described herein.

Example 4 includes modeled and experimental results of a pulsed laser beam having a 1064 nm wavelength that is output into an example optical assembly having an aspheric optical element that is offset relative to the beam pathway by an offset distance of 100 microns in the X-direction. The pulsed laser beam is output as an axisymmetric Gaussian beam and is formed into a quasi-non-diffracting beam by the aspheric optical element. FIG. 11A depicts an example cross-sectional intensity plot of the modeled resultant non-axisymmetric pulsed laser beam focal line formed by the offset between the aspheric optical element and the beam pathway. FIG. 11B depicts X and Y cross-sections of the cross-sectional intensity plot of the modeled result of FIG. 11A at a best focus axial position, which a location approximately mid-way along the length of the pulsed laser beam focal line. FIG. 11C depicts a cross-section of the cross-sectional intensity plot of the modeled result of FIG. 11A at an axial position shifted by about 200 microns from the best focus axial position of FIG. 11B. The FWHM of the intensity plot of FIG. 11C is 7.0×4.5 microns, showing an asymmetry of about 1.6. Further, FIG. 11D depicts a modeled logarithmic intensity plot of the Fourier transform plane of the pulsed laser beam (e.g., quasi-non diffracting pulsed laser beam) formed with a 100 micron offset. As shown in FIG. 11D, the logarithmic intensity plot is not uniform. Further, FIG. 11E depicts an experimental near-field micrograph of the pulsed laser beam focal line of example 4 at the peak line-focus position.

Example 5

Example 5 is a modeled result of an example optical assembly includes an axicon as the aspheric optical element and an optical blocking element positioned between the first and second lens such that the optical blocking element blocks 50% of the intensity of a pulsed Gauss-Bessel beam. Blocking 50% of the intensity of the pulsed Gauss-Bessel beam produces the same mathematical outcome as multiplying a Fourier transform of the pulsed Gauss-Bessel beam by a one-dimensional Heaviside step function. In a 2D image space this generates a 2D Gauss-Bessel beam convolved with the Fourier transform of a 1D Heaviside step function H(x). The Heaviside step function is related to the Sgn step function by H(x)=½(Sgn(x)+1). Tables of Fourier transforms show that in two dimensions:

$$\mathfrak{I}_{xy}(\text{Sgn}(k_x)) = \frac{-i}{\pi x}\delta(k_y) \quad (32)$$

Such that:

$$\mathfrak{I}_{xy}(H(k_x)) = \frac{1}{2}(\delta(x) + \mathfrak{I}_{xy}(\text{Sgn}(k_x)))\delta(y) \quad (33)$$

Figure 12A:
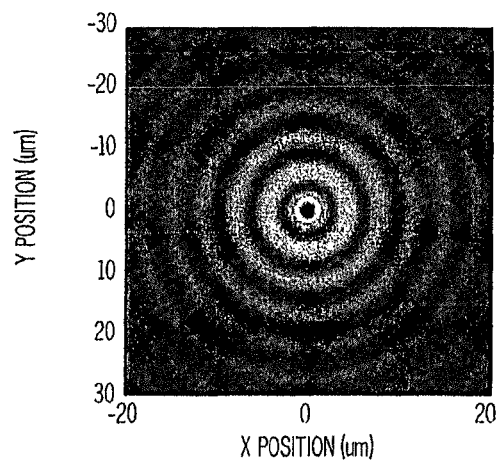
FIG. 12A depicts a cross-sectional intensity plot of an example pulsed laser beam, according to one or more embodiments described herein.
Figure 12B:
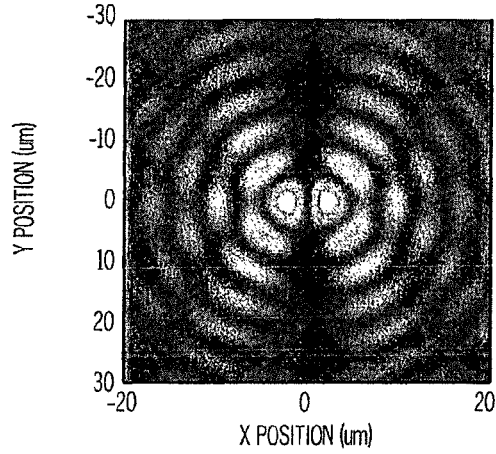
FIG. 12B depicts a cross-sectional intensity plot of an example pulsed laser beam, according to one or more embodiments described herein.
Figure 12C:
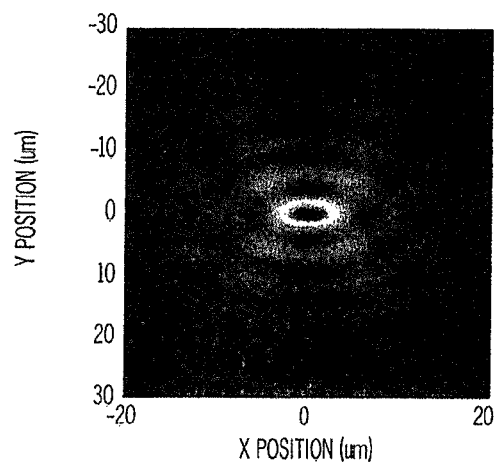
FIG. 12C depicts a cross-sectional intensity plot of an example pulsed laser beam, according to one or more embodiments described herein.
Figure 12D:
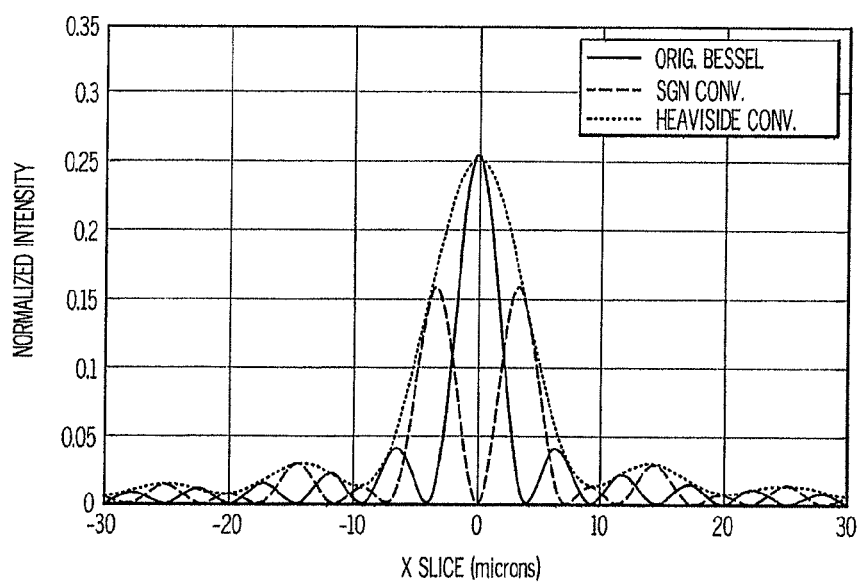
FIG. 12D graphically depicts one-dimensional cross sections of the intensity plots of FIGS. 12A-12C, according to one or more embodiments described herein.
Figure 12E:
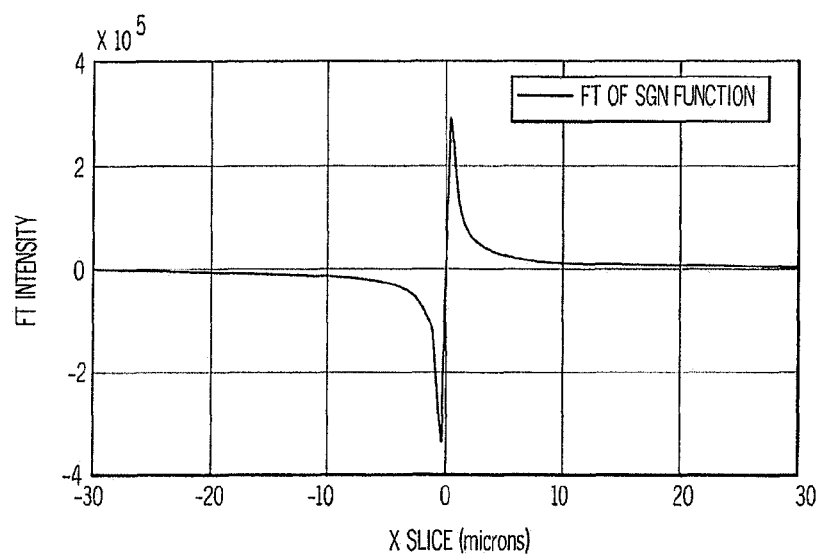
FIG. 12E graphically depicts the Fourier transform of an example Sgn step function, accordingly to one or more embodiments described herein.

A Gauss-Bessel beam convolved with a delta function mathematically describes a Gauss-Bessel at an origin point. For illustration, FIG. 12A depicts a cross sectional intensity plot (along the X-Y plane) of a Bessel-Gauss beam convolved with a delta function. Further, FIG. 12B depicts a cross sectional intensity plot (along the X-Y plane) of a Gauss-Bessel beam convolved with i/2πx. Moreover, equation 33 mathematically describes a convolution of the Gauss-Bessel beam with the Fourier transform of a Sgn function which is mathematically equivalent to blocking 50% of the intensity of the Gauss-Bessel beam. FIG. 12C depicts a cross sectional intensity plot (along the X-Y plane) of a Gauss-Bessel beam convolved with the Fourier transform of a Heaviside step function as mathematically described in Eq. 33. The cross-sectional intensity plot (along the X-Y plane) of FIG. 12C is also the resultant cross sectional intensity of the pulsed laser beam focal line formed by blocking 50% of the beam pathway. Accordingly, spacing of the spots or peaks of intensity in the resultant non-axisymmetric pulsed laser beam focal line is governed by the axicon angle and the telescope magnification (e.g., the magnification generated by the ratio of the focal length of the lens 132 to the focal length of the lens 130) but not the tilt, offset, or aberrations in the optics. Further, FIG. 12D graphically depicts X-axis cross sections of the intensity plots of FIGS. 12A-12C and FIG. 12E graphically depicts the Fourier transform of an example Sgn step function.

Figure 12F:
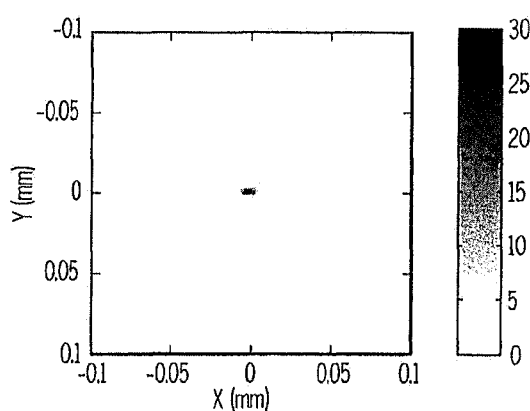
FIG. 12F depicts a cross-sectional intensity plot of an example pulsed laser beam, according to one or more embodiments described herein.
Figure 12G:
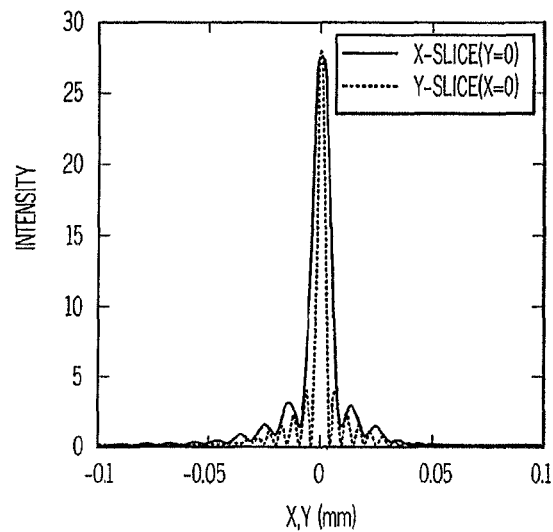
FIG. 12G graphically depicts one-dimensional X and Y cross-sections of the two dimensional cross-sectional intensity plot of FIG. 12F, according to one or more embodiments described herein.
Figure 12H:
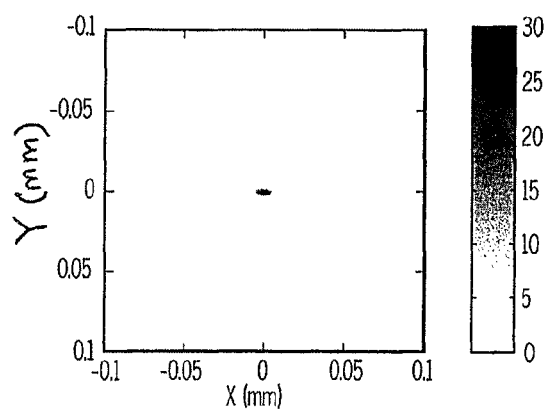
FIG. 12H depicts a cross-sectional intensity plot of an example pulsed laser beam, according to one or more embodiments described herein.
Figure 12I:
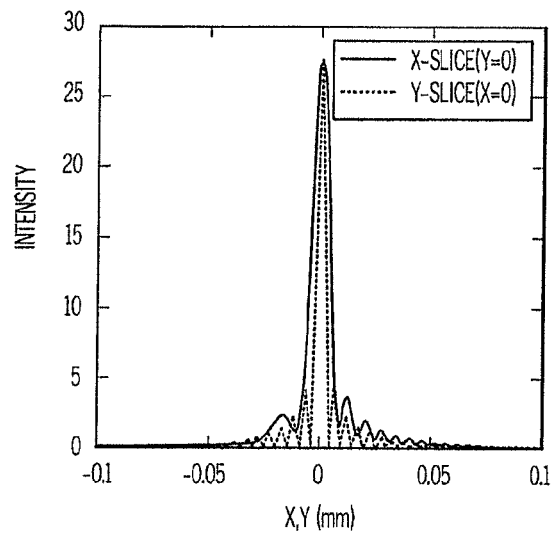
FIG. 12I graphically depicts one-dimensional X and Y cross-sections of the two dimensional cross-sectional intensity plot of FIG. 12H, accordingly to one or more embodiments described herein.

FIG. 12F depicts a cross-sectional intensity plot of a resultant non-axisymmetric pulsed laser beam focal line formed when the pulsed laser beam traverses the axicon and 50% of the beam intensity of the pulsed laser beam is blocked by an optical blocking element positioned along the beam pathway halfway between the first lens and the second lens. FIG. 12G graphically depicts X and Y cross-sections of the intensity plot of FIG. 12F. FIG. 12H depicts a cross-sectional intensity of a resultant non-axisymmetric pulsed laser beam focal line when 50% of the beam intensity is blocked by an optical blocking element positioned at the beam source (e.g., positioned at a Z=0 location). FIG. 12I graphically depicts X and Y cross-sections of the intensity plot of FIG. 12H. As shown in FIGS. 12F-12I, the Z-axis position of the optical blocking element along the beam pathway has minimal effect on the resultant pulsed laser beam focal line. This shows that the optical blocking element can be effective whether it is placed in the space before the axicon, or after the axicon, such as in the collimation space 134 between the two lens 130 and 132. Thus, it may be preferred to generate non-axisymmetric pulsed laser beam focal line using the optical blocking element.

Example 6

Figure 13A:
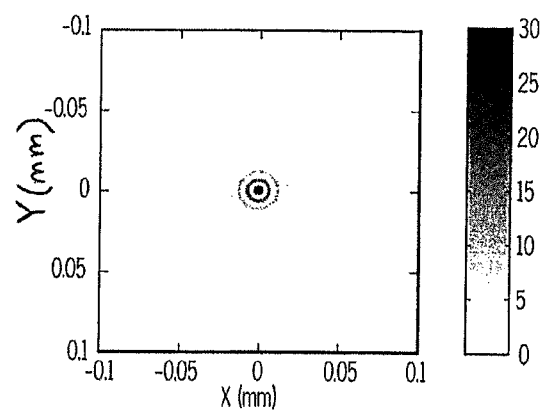
FIG. 13A depicts a cross-sectional intensity plot of an example pulsed laser beam, according to one or more embodiments described herein.
Figure 13B:
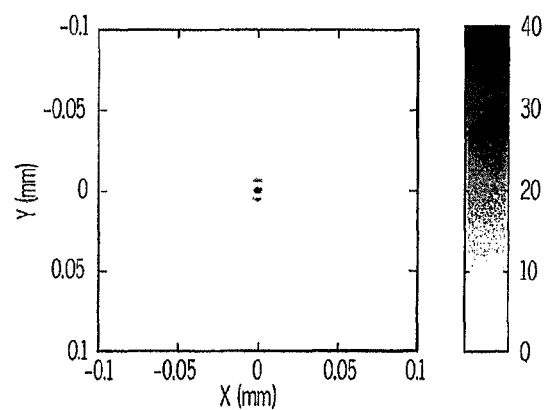
FIG. 13B depicts a cross-sectional intensity plot of an example pulsed laser beam, according to one or more embodiments described herein.
Figure 13C:
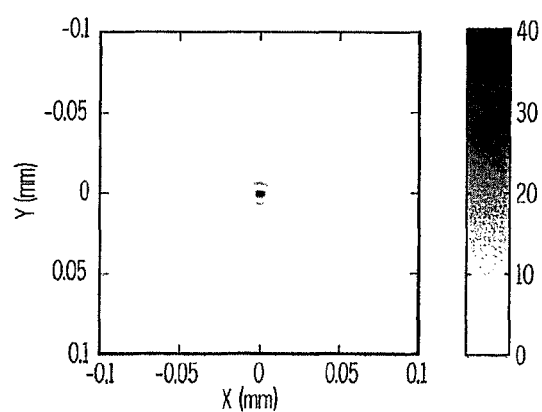
FIG. 13C depicts a cross-sectional intensity plot of an example pulsed laser beam, according to one or more embodiments described herein.
Figure 13D:
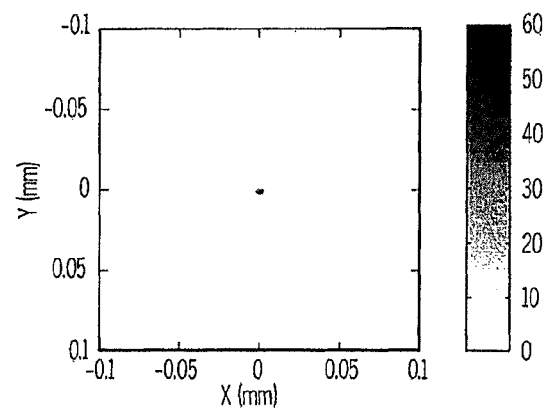
FIG. 13D depicts a cross-sectional intensity plot of an example pulsed laser beam, according to one or more embodiments described herein.
Figure 13E:
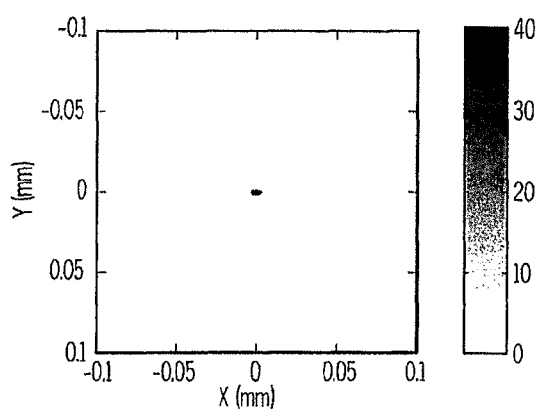
FIG. 13E depicts a cross-sectional intensity plot of an example pulsed laser beam, according to one or more embodiments described herein.
Figure 13F:
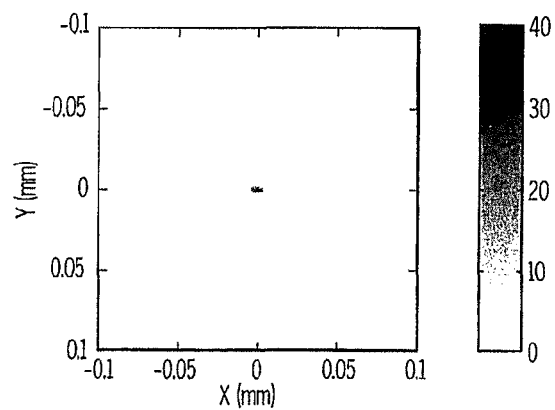
FIG. 13F depicts a cross-sectional intensity plot of an example pulsed laser beam, according to one or more embodiments described herein.
Figure 13G:
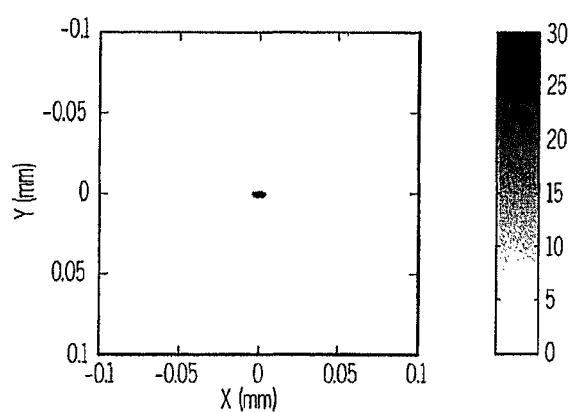
FIG. 13G depicts a cross-sectional intensity plot of an example pulsed laser beam, according to one or more embodiments described herein.
Figure 13H:
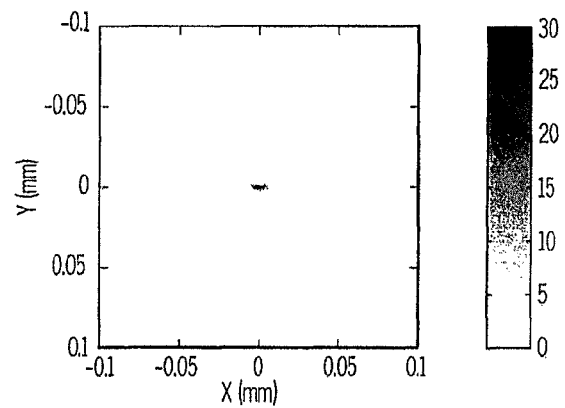
FIG. 13H depicts a cross-sectional intensity plot of an example pulsed laser beam, according to one or more embodiments described herein.
Figure 13I:
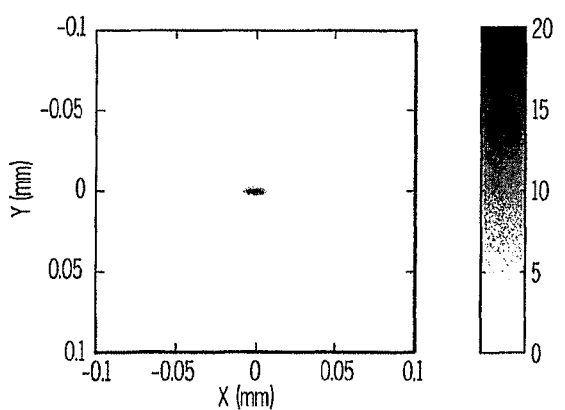
FIG. 13I depicts a cross-sectional intensity plot of an example pulsed laser beam, according to one or more embodiments described herein.
Figure 13J:
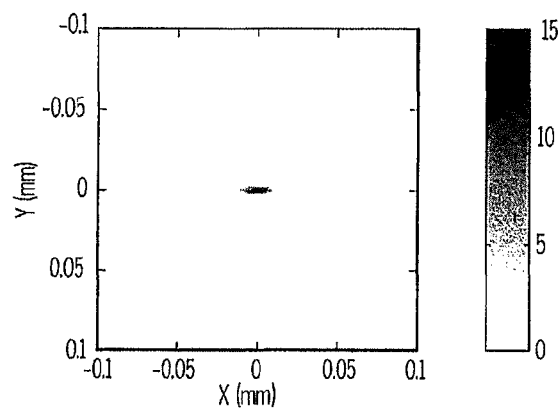
FIG. 13J depicts a cross-sectional intensity plot of an example pulsed laser beam, according to one or more embodiments described herein.
Figure 13K:
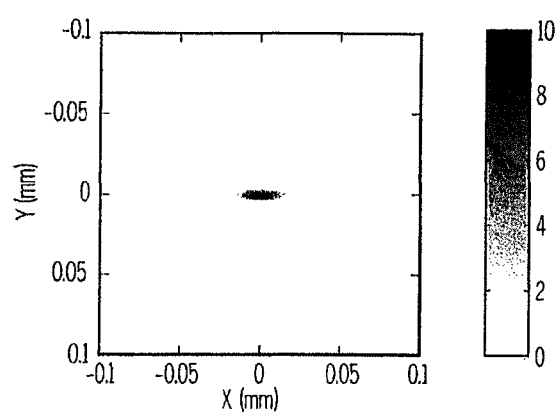
FIG. 13K depicts a cross-sectional intensity plot of an example pulsed laser beam, according to one or more embodiments described herein.

Example 6 is a modeled result of incrementally blocking cross sectional segments of a pulsed laser beam having a 600 micron 1/e² diameter. In particular, example 6 includes blocking different cross section segments of the pulsed laser beam each having an increased maximum blocked width, where the term "maximum blocked width" is defined as the width of the blocked portion of the pulsed laser beam (e.g., the blocked portion of the beam pathway) measured perpendicular from a center point of the cross sectional chord portion of the blocked cross sectional segment. FIG. 13A depicts an example intensity plot in the X-Y plane of the resultant pulsed laser beam focal line without blocking the pulsed laser beam. As shown in FIG. 13A, with no blocking, the cross-sectional pulsed laser beam focal line is axisymmetric. FIGS. 13B-13K depict example intensity plots in the X-Y plane having blocked cross sectional segments with increasing maximum blocked widths. For example, the maximum blocked width in FIG. 13B is 50 microns, the maximum blocked width in FIG. 13C is 100 microns, the maximum blocked width in FIG. 13D is 150 microns, the maximum blocked width in FIG. 13E is 200 microns, the maximum blocked width in FIG. 13F is 250 microns, the maximum blocked width in FIG. 13G is 300 microns (e.g., blocking half of the pulsed laser beam), the maximum blocked width in FIG. 13H is 350 microns, the maximum blocked width in FIG. 13I is 400 microns, the maximum blocked width in FIG. 13J is 450 microns, and the maximum blocked width in FIG. 13K is 500 microns.

Example 7

Figure 14:
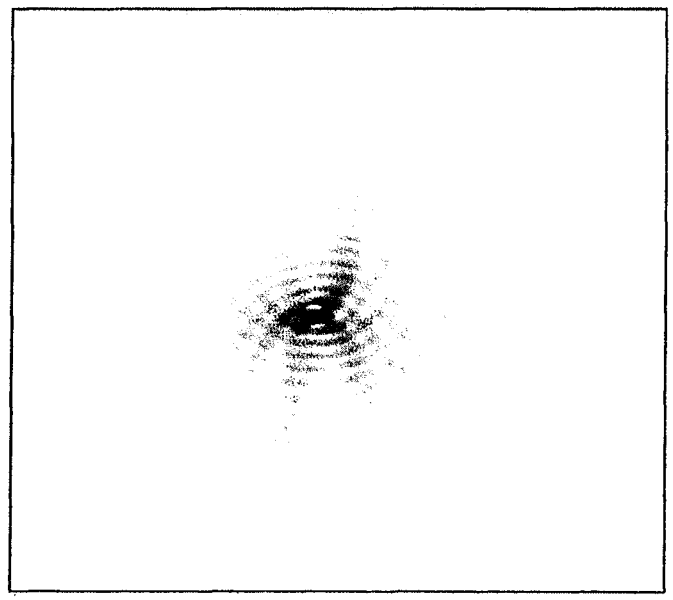
FIG. 14 depicts a near-field micrograph of an example pulsed laser beam, according to one or more embodiments described herein.

In example 7, a quasi-non-diffracting pulsed laser beam having a wavelength of 532 nm is output into an example optical assembly having an optical blocking element positioned such that the optical blocking element blocks 50% of the pulsed laser beam. FIG. 14 depicts a near field micrograph of a cross-section of a non-axisymmetric pulsed laser beam focal line formed by blocking 50% of the pulsed laser beam in example 7.

Example 8

Figure 15:
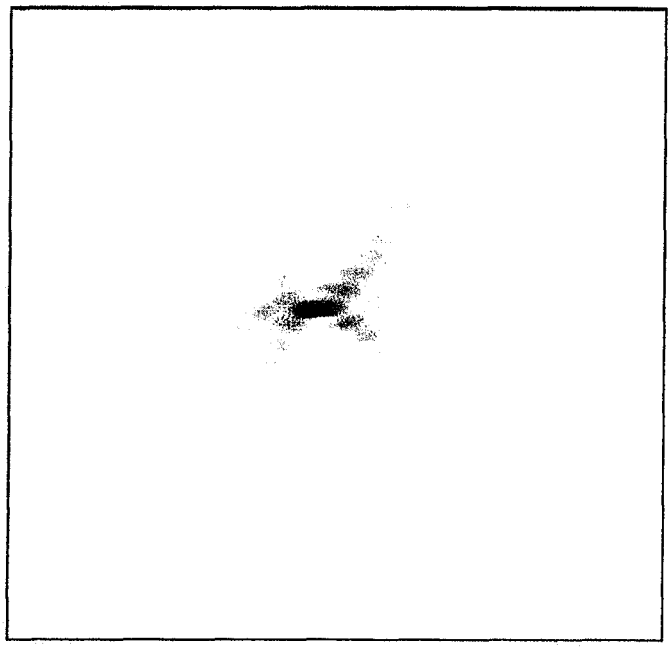
FIG. 15 depicts a near-field micrograph of an example pulsed laser beam, according to one or more embodiments described herein.

In example 8, a quasi-non-diffracting pulsed laser beam having a wavelength of 532 nm is output into an example optical assembly having an optical blocking element positioned such that the optical blocking element blocks 75% of the pulsed laser beam. FIG. 15 depicts a near field micrograph of a cross-section of a non-axisymmetric pulsed laser beam focal line formed by blocking 75% of the pulsed laser beam in example 8. Note that the non-axisymmetric pulsed laser beam focal line of example 8 comprises a larger aspect ratio than the non-axisymmetric pulsed laser beam focal line of example 7.

Example 9

Figure 16:
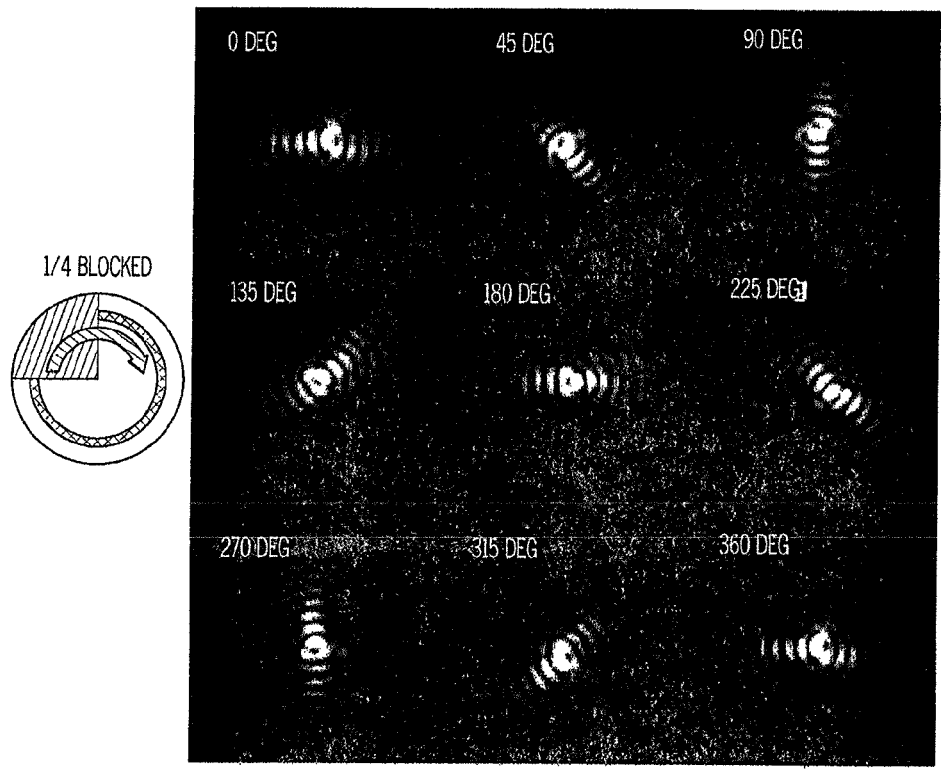
FIG. 16 depicts example resultant non-axisymmetric beam spots formed by an optical blocking element positioned in an example optical assembly, according to one or more embodiments described herein.

In example 9, an optical blocking element is positioned in an example optical assembly such that the optical blocking element blocks a quarter sector of the cross sectional pulsed laser beam (and thus blocks 25% of the intensity of the pulsed laser beam). FIG. 16 depicts example resultant cross-section of non-axisymmetric pulsed laser beam focal lines formed by the optical blocking element at incremental 45° rotations of the optical blocking element about the optical axis (e.g., about the propagation direction of the pulsed laser beam).

Example 10

Figure 17A:
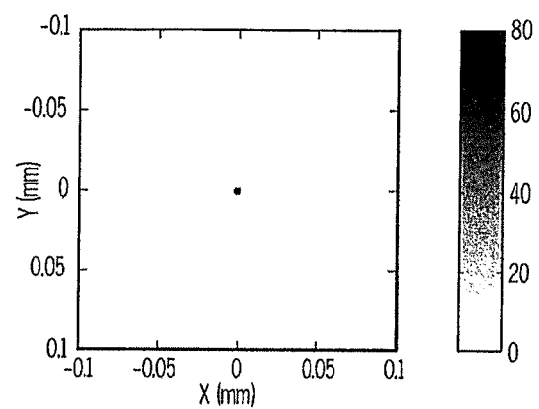
FIG. 17A depicts a cross-sectional intensity plot of an example pulsed laser beam, according to one or more embodiments described herein.
Figure 17B:
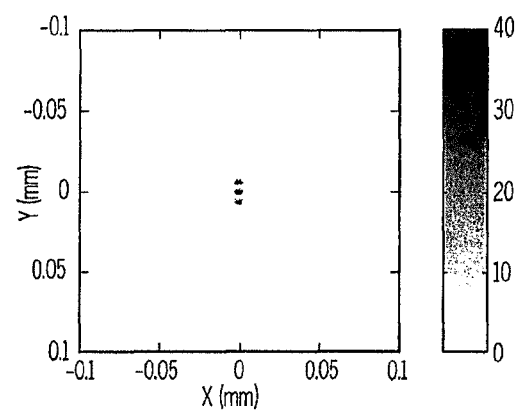
FIG. 17B depicts a cross-sectional intensity plot of an example pulsed laser beam, according to one or more embodiments described herein.
Figure 17C:
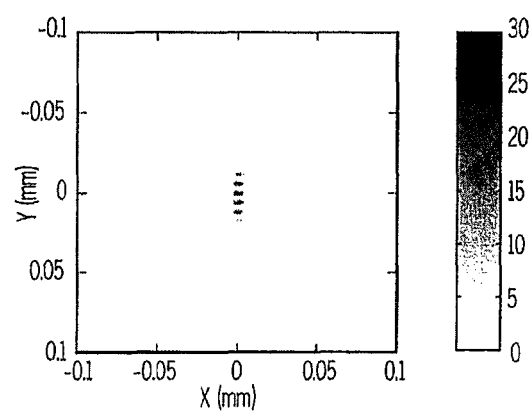
FIG. 17C depicts a cross-sectional intensity plot of an example pulsed laser beam, according to one or more embodiments described herein.
Figure 17D:
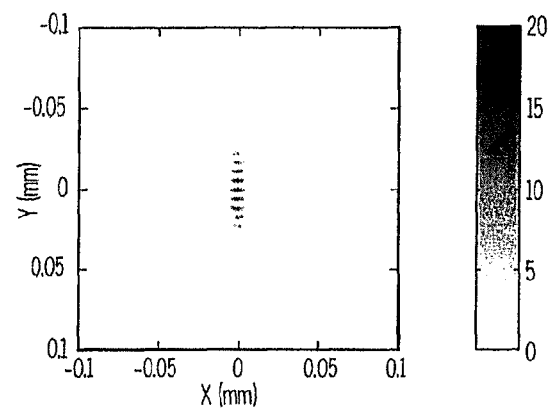
FIG. 17D depicts a cross-sectional intensity plot of an example pulsed laser beam, according to one or more embodiments described herein.
Figure 17E:
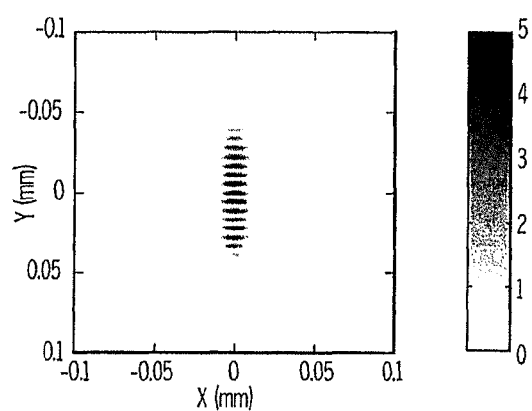
FIG. 17E depicts a cross-sectional intensity plot of an example pulsed laser beam, according to one or more embodiments described herein.
Figure 17F:
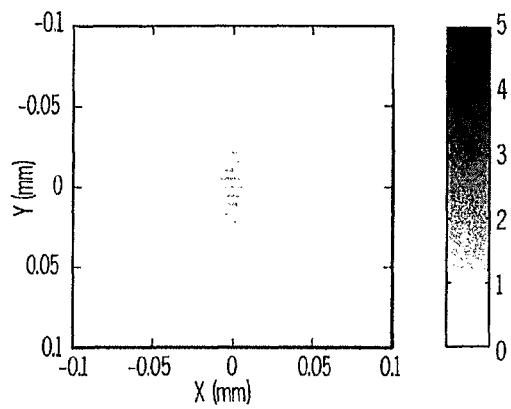
FIG. 17F depicts a cross-sectional intensity plot of an example pulsed laser beam, according to one or more embodiments described herein.

Example 10 models blocking two cross sectional segments of a pulsed laser beam having a 600 micron $1/e^2$ diameter at the common focal plane between the first lens and the second lens using two optical blocking elements oriented such that they block cross sectional chord portion of the pulsed laser beam each terminating at parallel chords and each having equal maximum blocked widths (as defined above with respect to example 6). FIG. 17A depicts an example intensity plot in the X-Y plane of the resultant pulsed laser beam focal line without blocking the pulsed laser beam. As shown in FIG. 17A, with no blocking, the cross-section of the pulsed laser beam focal line is axisymmetric. FIGS. 17B-17F depict example intensity plots in the X-Y plane having two parallel blocked cross sectional segments with increasing and equal maximum blocked widths. For example, each maximum blocked width in FIG. 17B is 50 microns, each maximum blocked width in FIG. 17C is 100 microns, each maximum blocked width in FIG. 17D is 150 microns, each maximum blocked width in FIG. 17E is 200 microns, and each maximum blocked width in FIG. 17F is 250 microns. Note that the pulsed laser beam focal line cross sections in FIGS. 17A-17F show multiple fringes and much of the laser energy is thrown outside of the central core spot of the pulsed laser beam focal line, even for FIG. 17B. This means the central spot has lower intensity and more laser power may be needed at the input of the optical system to facilitate cutting the transparent workpiece. The large amount of energy present in the non-central fringes of FIGS. 17B-17F will also create different stress profiles at the transparent workpiece that do not concentrate the stress as well as when the optical energy is mostly contained in the central ellipse.

Example 11

Figure 18:
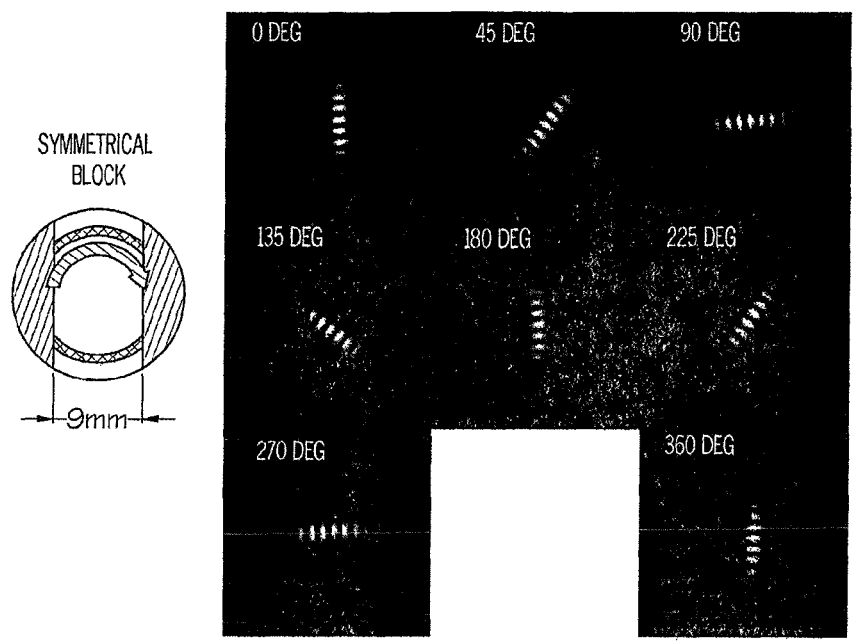
FIG. 18 depicts example resultant non-axisymmetric beam spots formed by two optical blocking elements positioned in an example optical assembly, according to one or more embodiments described herein.

Example 11 is an experimental confirmation of the modeled results of example 10 and is done with an example optical assembly that includes a 632 nm HeNe laser. In example 11, two optical blocking elements are positioned in the example optical assembly such that each optical blocking element blocks a cross sectional segment of the pulsed laser beam within the collimation space 134 between the two lenses 130 and 132, where the diameter of the collimated beam ring is about 22 mm and the cross sectional chord portions formed by each optical blocking element terminate at chords that are positioned parallel and are spaced apart by about 9 mm. FIG. 18 depicts the example resultant cross sections of non-axisymmetric pulsed laser beam focal lines (each comprising multiple beam spots) formed by each of the example optical blocking elements at incremental 45° rotations of the example optical blocking elements about the optical axis (e.g., about the propagation direction of the pulsed laser beam).

Example 12

Figure 19A:
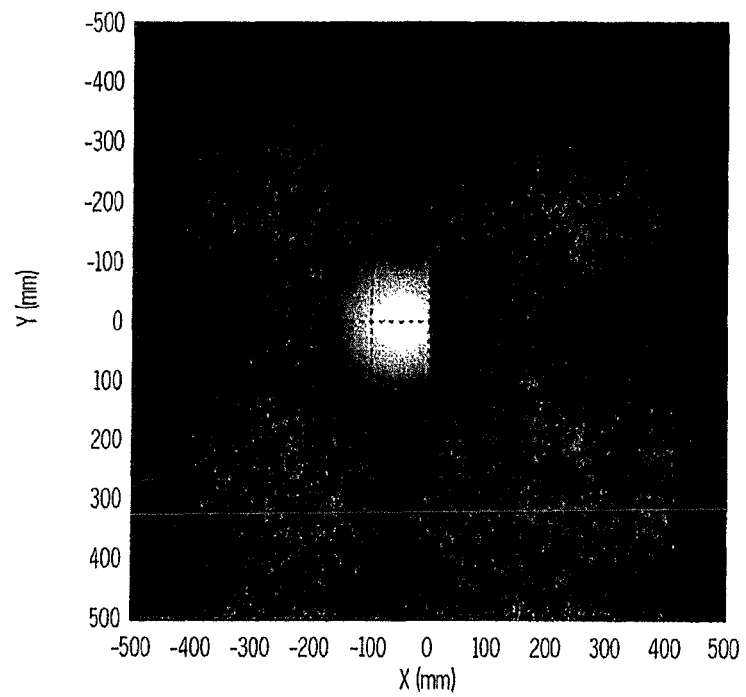
FIG. 19A depicts a cross sectional image of an example pulsed laser beam, according to one or more embodiments described herein.
Figure 19B:
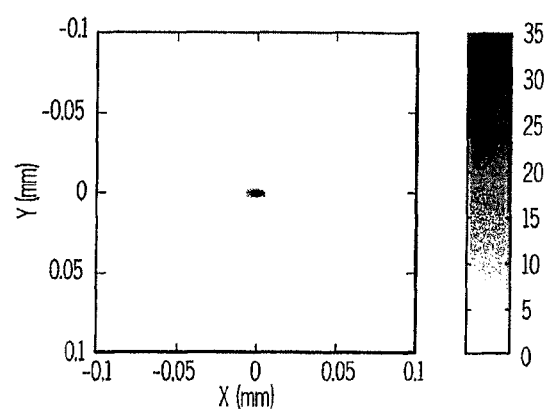
FIG. 19B depicts a cross-sectional intensity plot of an example pulsed laser beam, according to one or more embodiments described herein.

In example 12, an optical blocking element is positioned in an example optical assembly that also includes an aspheric optical element which is offset relative to the optical pathway of the pulsed laser beam. For example, FIG. 19A depicts a cross sectional image of a pulsed laser beam after the pulsed laser beam traversed an axicon offset from the beam pathway by 50 microns and a half aperture optical blocking element positioned to block 50% of a pulsed laser beam in a non-offset system. FIG. 19B depicts an example cross-sectional intensity plot of the resultant non-axisymmetric pulsed laser beam focal line formed by the block and shift arrangement depicted in FIG. 19A.

Example 13

Figure 20A:
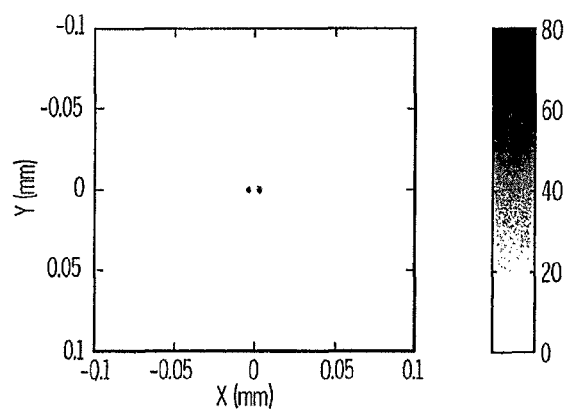
FIG. 20A depicts a cross-sectional intensity plot of an example pulsed laser beam, according to one or more embodiments described herein.
Figure 20B:
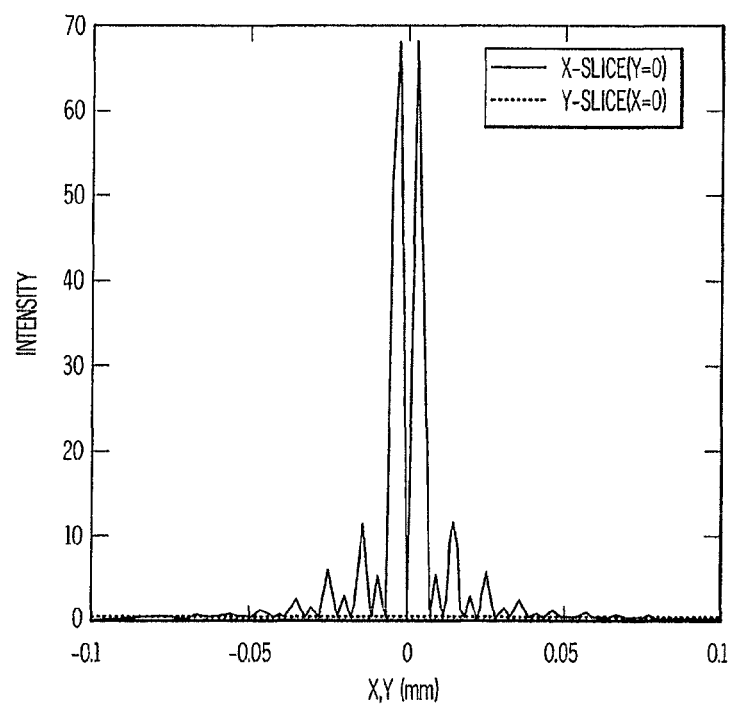
FIG. 20B graphically depicts one-dimensional X and Y cross sections of the two dimensional cross-sectional intensity plot of FIG. 20A, according to one or more embodiments described herein.

In example 13, an optical delay plate that induces an optical delay of 7C is positioned within a beam pathway such that 50% of the pulsed laser beam traverses the optical delay plate and undergoes an optical delay of π. FIG. 20A depicts a cross-sectional intensity plot of the resultant non-axisymmetric pulsed laser beam focal line formed by the optical delay of 7C of 50% of the pulsed laser beam. FIG. 20B depicts cross-sections of the cross-sectional intensity plot of FIG. 20A.

Example 14

Figure 21A:
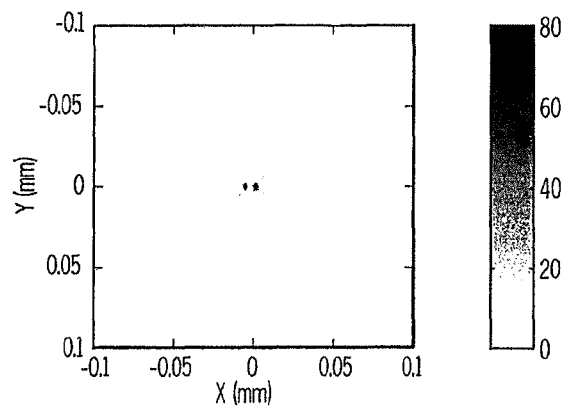
FIG. 21A depicts a cross-sectional intensity plot of an example pulsed laser beam, according to one or more embodiments described herein.
Figure 21B:
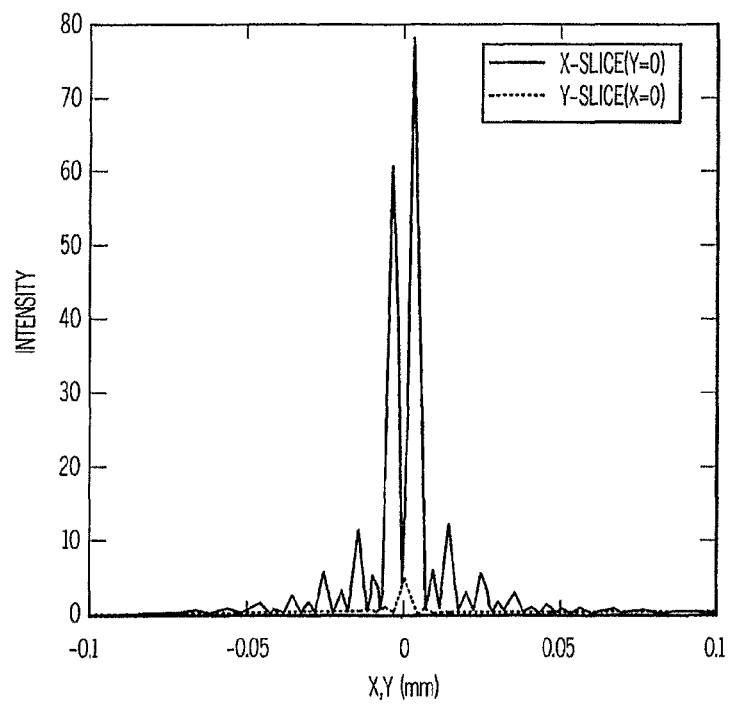
FIG. 21B graphically depicts one-dimensional X and Y cross sections of the two dimensional cross-sectional intensity plot of FIG. 21A, according to one or more embodiments described herein.

In example 14, an optical delay plate that induces an optical delay of 0.875π is positioned within a beam pathway such that 50% of the pulsed laser beam traverses the optical delay plate and undergoes an optical delay of π. FIG. 21A depicts a cross-sectional intensity plot of the resultant non-axisymmetric pulsed laser beam focal line formed by the optical delay of 0.875π of 50% of the pulsed laser beam. FIG. 21B depicts a cross-sections of the cross-sectional intensity plot of FIG. 21A.

Example 15

Figure 22A:
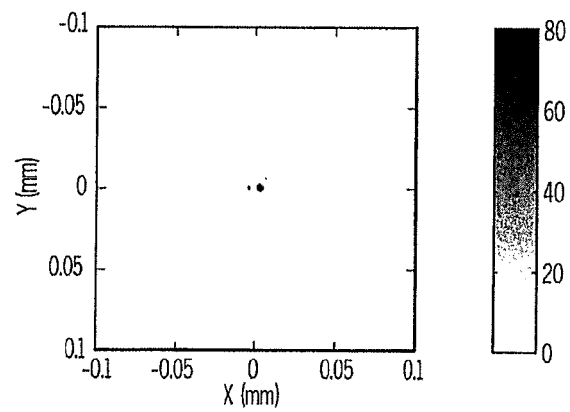
FIG. 22A depicts a cross-sectional intensity plot of an example pulsed laser beam, according to one or more embodiments described herein.
Figure 22B:
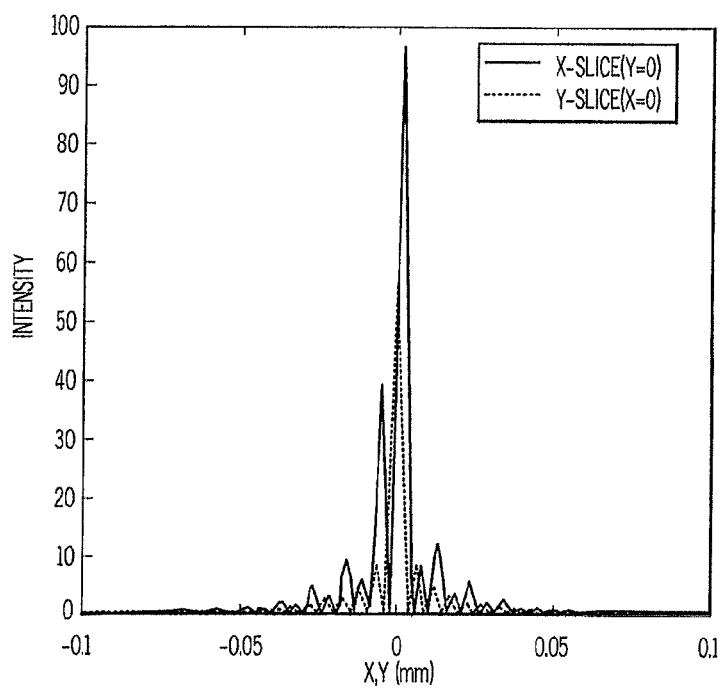
FIG. 22B graphically depicts one-dimensional X and Y cross sections of the two dimensional cross-sectional intensity plot of FIG. 22A, according to one or more embodiments described herein.

In example 15, an optical delay plate that induces an optical delay of 0.5π is positioned within a beam pathway such that 50% of the pulsed laser beam traverses the optical delay plate and undergoes an optical delay of π. FIG. 22A depicts a cross-sectional intensity plot of the resultant non-axisymmetric pulsed laser beam focal line formed by the optical delay of 0.5π of 50% of the pulsed laser beam. FIG. 22B depicts cross-sections of the cross-sectional intensity plot of FIG. 22A.

Example 16

Figure 23:
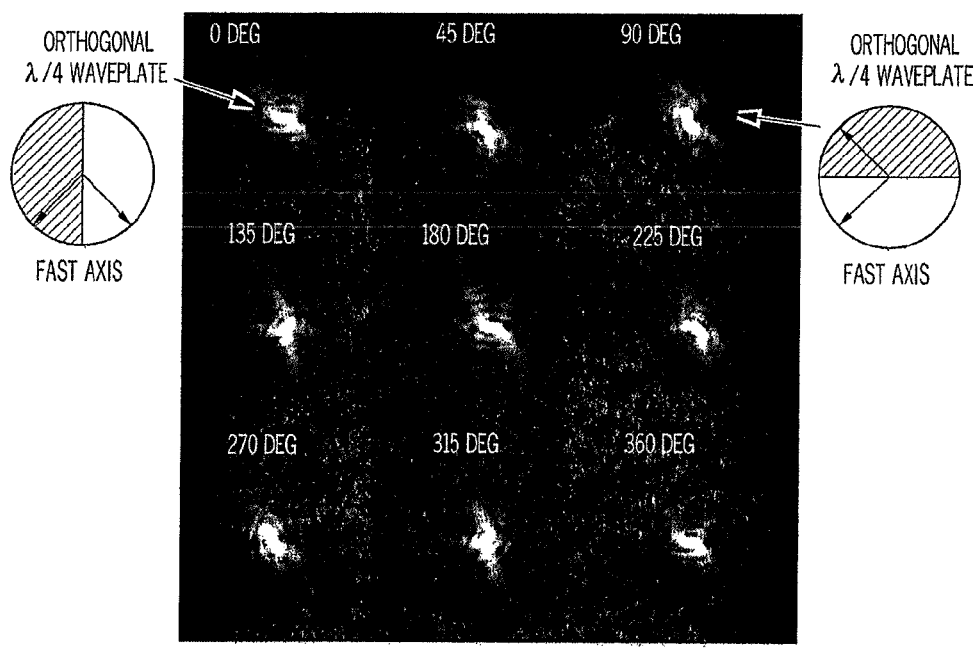
FIG. 23 depicts example resultant non-axisymmetric beam spots formed by a split quarter waveplate positioned in an example optical assembly, according to one or more embodiments described herein.

In example 16, a split quarter waveplate as described above may be positioned in a beam pathway of a laser beam output by a HeNe laser such that a first beam portion of the HeNe laser beam is polarized into a first polarization and a second beam portion of the HeNe laser beam is polarized into a second polarization that is orthogonal the first polarization. FIG. 23 depicts example resultant non-axisymmetric pulsed laser beam focal lines formed by the split quarter waveplate at incremental 45° rotations of the example split quarter waveplate about the optical axis (e.g., about the propagation direction of the pulsed laser beam).

Example 17

This example describes an optical system for creating an asymmetric quasi non-diffracting beam using a polarization method. An outline of this example follows:
Outline:
A. System Used
  Optics and distances
  Laser beam
  Split quarter wave plate (SQWP)
B. Example results of nano-perforations and crack direction control
C. Beam measurement method to establish if a beam is an asymmetric QNDB
  Scanned LFC description
  Experimental measurement of the beam profile
D. Results
  Experimental measurement of
    $w_{o,eff}$
    Rayleigh range using intensity method
    $F_D$ satisfying equation 31 in application
  Modeled Results
    Rayleigh range using beam variance method
System Used.

Figure 25:
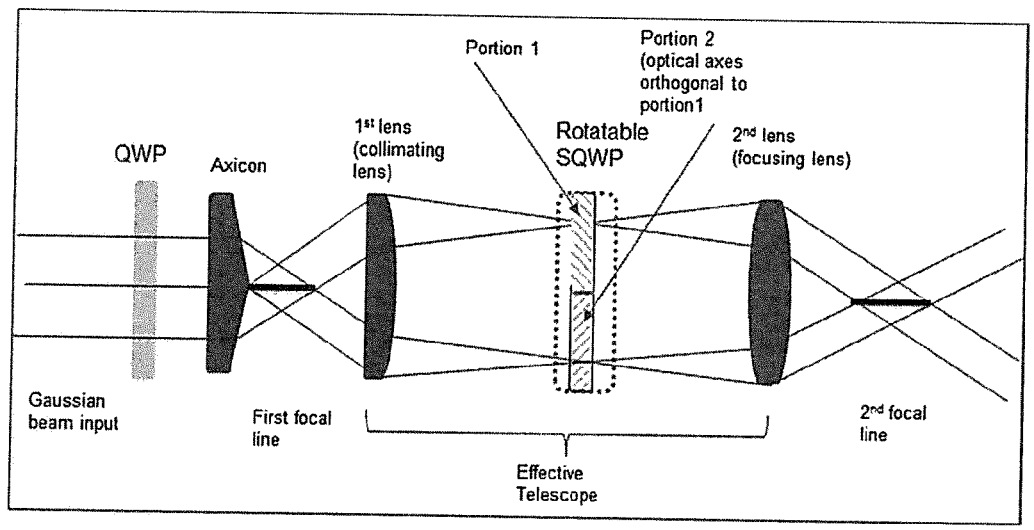
FIG. 25 depicts an optical system for producing an asymmetric quasi non-diffracting beam.

The optical system shown in FIG. 25 generally outlines a system that can be used to create an asymmetric quasi non-diffracting beam using a polarization method to break the beam asymmetry. This optical system is suitable for cutting substrates such as glasses.
  Optics/Laser Beam.

A representative laser is a 1064 nm pulsed laser with a 9 psec pulse width that provides a Gaussian-shaped output beam with linear polarization (e.g. Coherent Hyper-Rapid 50). A telescope is used to collimate the beam to a 5.5 mm $1/e^2$ diameter before it enters the axicon. The beam passes through a quarter wave plate to circularly polarize it before it is incident on the axicon. The overall optical system extending from the quarter waveplate (QWP) through the axicon, split quarter wave plate (SQWP), and lenses is designed to convert an input Gaussian beam into an asymmetric quasi non-diffracting beam (QNDB). By themselves, the axicon and lenses will form what is sometimes known as a Gauss-Bessel beam, which is a QNDB with an axisymmetric intensity distribution. The quarter waveplate in conjunction with the SQWP serve to break the rotational symmetry of the system, and they are the elements that allow create of an asymmetric QNDB.

Figure 26:
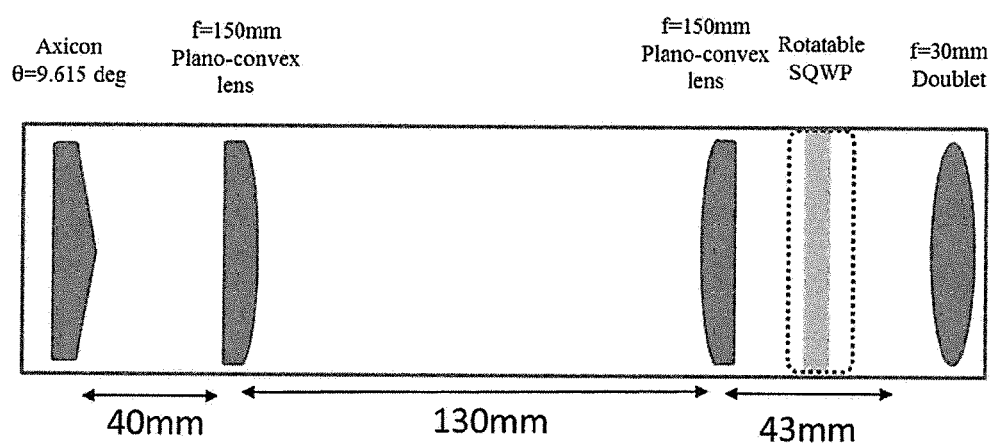
FIG. 26 depicts an optical system for producing an asymmetric quasi non-diffracting beam.

In contrast to the more general system shown in FIG. 25, in the specific system used later in this document, there are two f=150 mm lenses are used to collimate the light after the axicon. This system is shown in FIG. 26. The two f=150 mm lenses act as a pair, with the first lens acting mostly as a field lens (having little optical power because of its position being close to the axicon focus), and given the distance between them they create the net effect of a single 140 mm focal length lens placed roughly one focal length away from the axicon. This exact selection of lenses is not critical. Many different focal lengths and style of lenses are possible. The point of the collimating lens(es) is that they combine with the objective lens to act as a telescope that optically relays (diameter, length) the focal line formed just after the axicon to create a magnified (or demagnified) image of the focal line after the final focusing lens. This allows one to more flexibly scale the size of the focal line without needing to change axicons, and also projects the focal line to a location that has a relatively large physical separation or working distance from the final optic, which is much more convenient in a production environment than have a focal line that is immediately adjacent to an axicon.

The setups shown in this example are chosen to allow for a long effective focal length of the collimating lenses, while keeping the overall package size relatively short. That is why the two collimating lens approach, where the first lens acts as a "field lens", configuration was used. This specific collimating lens choice is not required in order to make a QNDB or an asymmetric QNDB. Single collimating lenses may also be used, or lenses of other focal lengths.

The beam is approximately collimated into an annulus as it enters the SQWP, which acts to break the symmetry of the beam through polarization change as described herein. The SQWP can rotate about the optical axis of the system in order to change the preferred azimuthal orientation of the asymmetric focused spot. In the case of a SQWP that consist of two halves of a circular waveplate that are attached together, the long axis of the asymmetric spot formed will be perpendicular to the divide line in the SQWP. The rotation of the SQWP can be motorized and the angle of the orientation can be synchronized to follow the desired cutting path direction in the substrate.

A f=30 mm doublet lens is used in the system shown in FIG. 26 to focus the annulus into a Bessel-like beam, which because of the effect of the SQWP (a quarter wave plate which has been split into two distinct pieces, one of which gets inverted) is made to have an elliptical cross section.

The SQWP used in this embodiment is important in creating an asymmetric QNDB. The SQWP creates a polarization based decoherence of two sections of the laser beam. The SQWP is illustrated further is in FIG. 7B, but more explicitly in FIG. 23. A SQWP consist of two section of quarter waveplate, which are assembled so that the optical axes in each section are orthogonal to the optical axes in the other section of the SQWP. When circularly polarized light is incident on the SQWP, each portion of the SQWP converts the light passing through each portion into a polarization which is always orthogonal to the polarization from the other portion. For example, the light emitted by the first portion may be linear vertical, and the light emitted by the second portion may be linear horizontal. Or the light emitted by the first portion may be right-handed circular, with the light emitted by the second portion being left-handed circular. When two orthogonally polarized beam portions combine, they cannot interfere. This decoherence is what makes the two portions of the beam behave independently and thus breaks the symmetry of the QNDB. If the beam portions combined coherently, strong interference effects would occur, and these interference effects will ruin the extended Rayleigh range of the asymmetric QNDB—there will be peak and valleys generated due to the interference. The key feature of a SQWP method is that in all possible rotation orientations of the SQWP, provided that circularly polarized light is incident on the SQWP, then the orthogonality of the light emerging from the two portions is assured.

Figure 27:
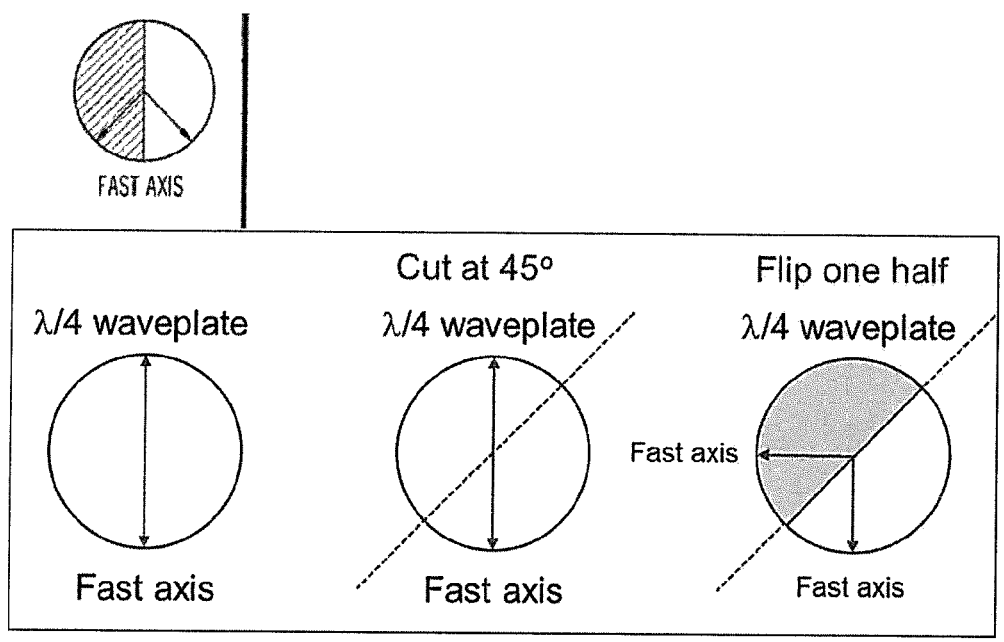
FIG. 27 depicts a split quarter wave plate (SQWP).

FIG. 27 shows a SQWP and a method for constructing a SQWP. The two sections are assembled so that the left hand (hashed) half has a fast optical axis that is perpendicular to the fast optical axis of the right half (clear section in this image). The SQWP need not be two equal halves. But the orthogonality of the optical axes of the two sections is important.

Figure 28:
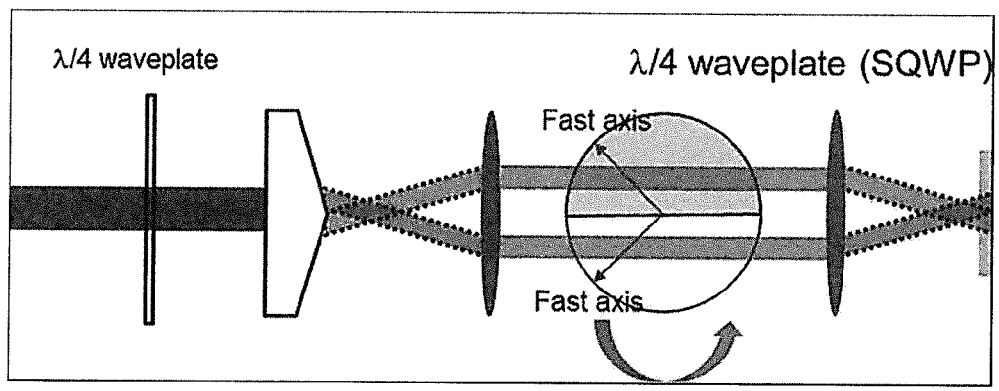
FIG. 28 shows schematically the production of an asymmetric QNDB using the polarization method to decohere the beam.

FIG. 28 shows schematically production of an asymmetric QNDB using the polarization method to decohere the beam. The basic mechanism is:
  Linearly polarized light is incident on the quarter waveplate.
  The axicon forms a focal line
  A collimating lens (or lenses) creates a ring or annular of light
  The annulus passes through SQWP
  A focusing lens refocuses the light to form a focal line or QNDB. The QNDB will be asymmetric (or elliptical) because the SQWP creates two orthogonally polarized portions of the beam, which can no longer combine coherently.

The numerical aperture (NA) of the beam in the system shown in FIG. 26 after the 30 mm doublet is approximately 0.37. This means the expected spot size across the short axis (or minimum cross sectional) of the beam is about 2 microns. The expected spot size for a focused beam is a function of the NA of the beam, and is given by the formula:

$$d = \frac{2.405 \lambda_0}{2\pi N A n_0}$$

where d is the spot diameter, $\lambda_0$ is the wavelength, no is the refractive index of the medium. That is, spot size is a function of wavelength, NA, and a constant that is related to the beam shape.

Example Results of Nano-Perforations and Crack Direction Control.

Figure 29:
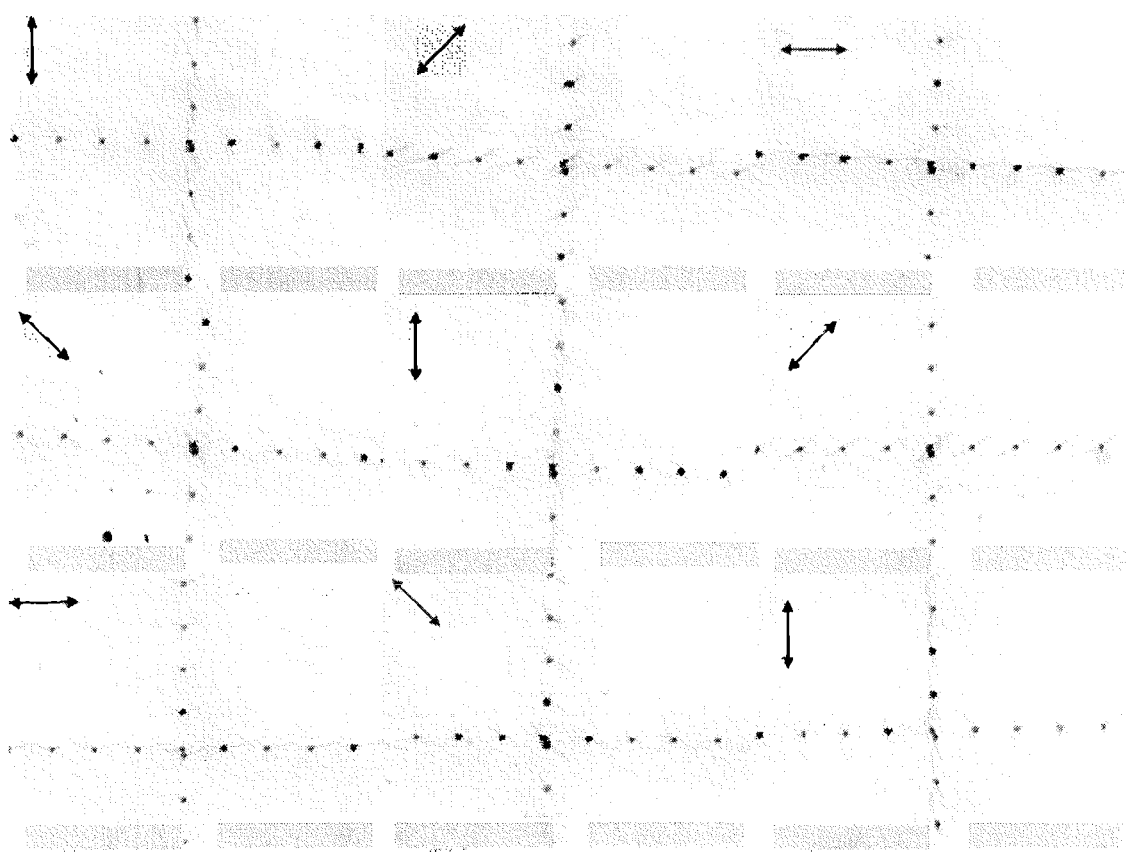
FIG. 29 shows example images of nano-perforations and crack control.

FIG. 29 shows example images of nano-perforations and crack control made with the optical system of FIG. 26. Nano-perforated holes in non-ion exchanged Corning Code 2318 glass made using the SQWP optical system are shown. A "cross" of holes is made in each image, showing stage/laser beam traversing the vertical (y) direction and in the horizontal (x) direction. In each image a biased crack direction can be seen that is independent of the x or y direction of motion of the stage—this crack direction is highlighted by the red arrows. Progressing between each image, the split of the SQWP starts oriented parallel to the horizontal (x) direction to make the nano-perforations with nearly vertical (y) cracks shown in the upper left image, and then is the SQWP is rotated in subsequent images by 45 degree steps each time. The arrows indicate the observed direction of the biased cracks in each image.

Figure 30:
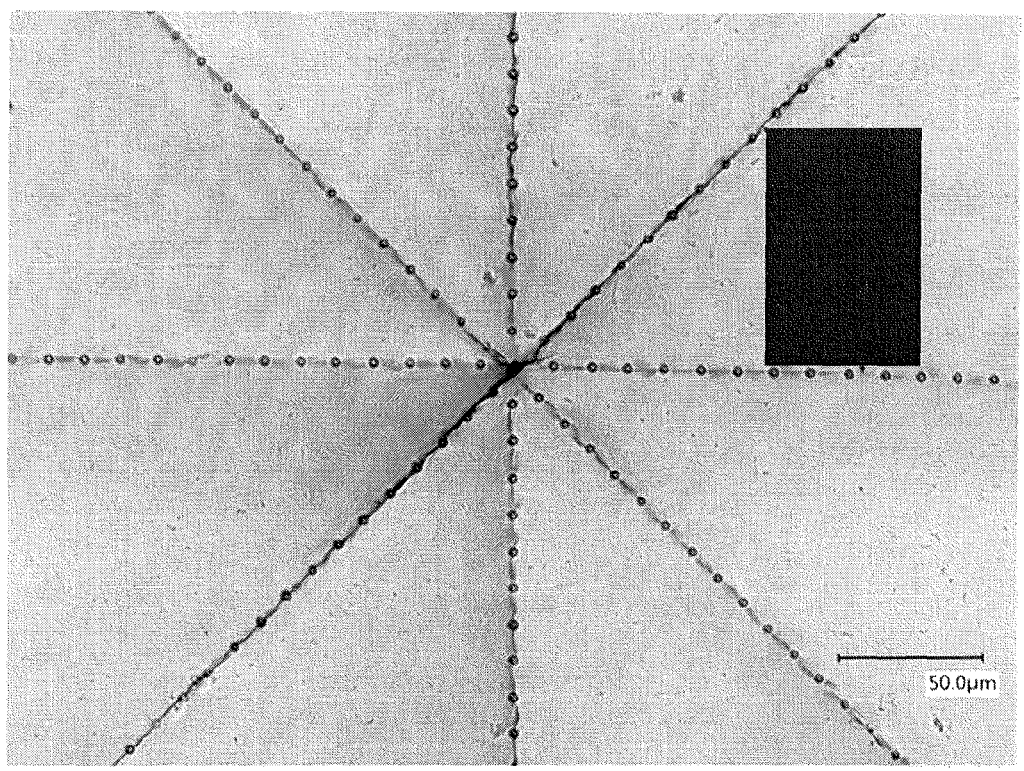
FIG. 30 shows a star pattern with nano-perforation lines at made at four different SQWP rotation angles.

FIG. 30 shows a star pattern with nano-perforation lines at made at four different SQWP rotation angles (0 deg, 45 deg, 90 deg, 135 deg). To make each line, the SQWP was set at a different rotation angle, such that the biased crack direction was controlled to be parallel to the stage motion direction. It is noticeable that crack propagation between the individual nano-perforations exactly follows the intended direction.

Beam Measurement Method.

Figure 31:
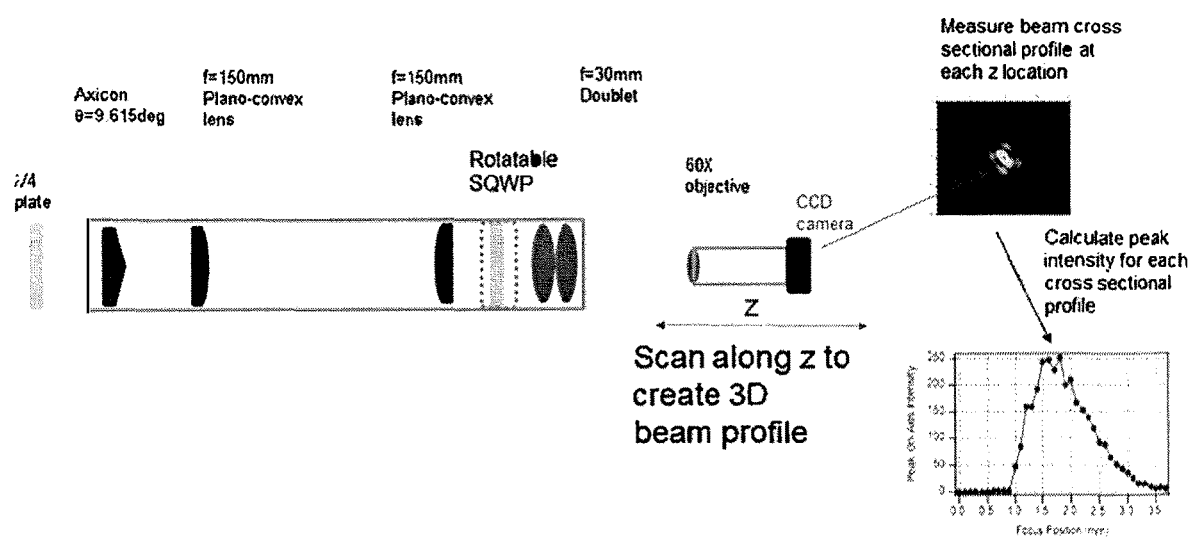
FIG. 31 shows an optical system for measuring the beam profile of a quasi-non-diffracting beam.

The measurements of the profile of the quasi-non-diffracting beam were performed with the optical system shown in FIG. 31 by using a CCD camera with a NA=0.8, 60× microscope objective in front of it.

The microscope objective served to magnify and image a cross section of the focal line onto the CCD camera.

This magnification is such that each camera pixel corresponds to a size of only ~0.027 microns at a given cross sectional plane of the focal line, allowing even a micron scale beam cross section to be sub-resolved with high fidelity.

The microscope objective and CCD camera are then scanned along the optical axis of the beam to capture cross sectional profiles of the beam as a function of z.

See the discussion below for a detailed description of what the two plots on the right are.

Figure 32:
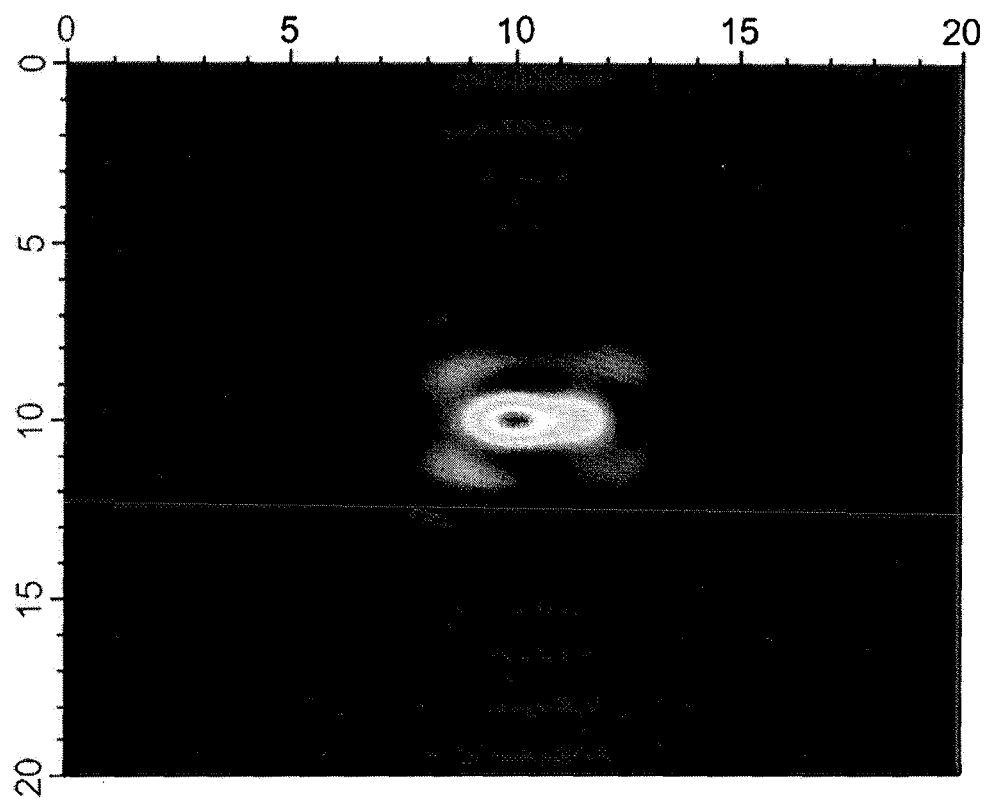
FIG. 32 is an image of a beam cross section of a quasi-non-diffracting beam.

FIG. 32 is an image obtained with the CCD camera of the beam cross section for one given z-location (location along the optical axis).

The grayscale shading indicates the intensity of the light, with darker shading being the most intense and lighter shading being the least intense. The units of the x/y scales are microns. FIG. 32 shows an asymmetric beam, with the spot elongated along the horizontal (x) direction.

Figure 33:
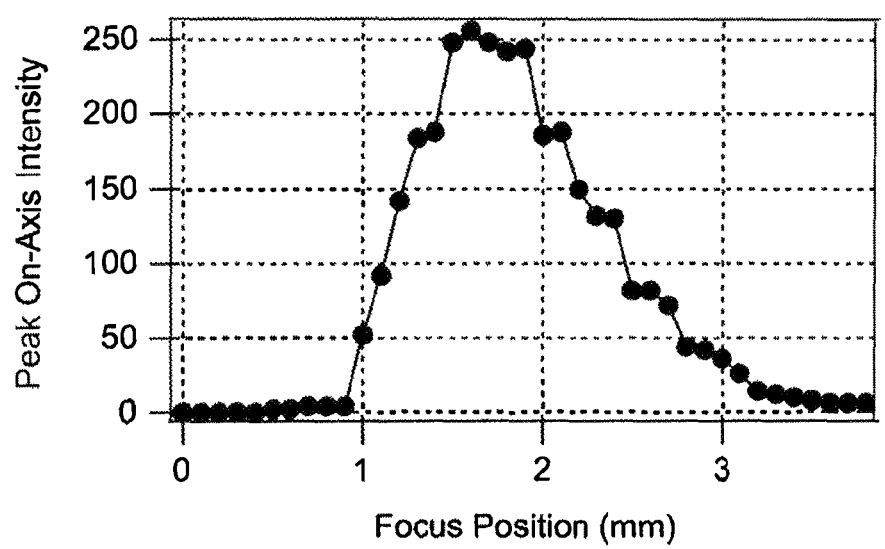
FIG. 33 shows a plot of the peak intensity obtained from a series of x-y cross-sectional images measured at different focus positions along the optical axis.

FIG. 33 is a plot of the peak intensity in cross sectional images obtained at a series of z-locations (locations along the optical axis). The intensity units are in analog-to-digital converter bits as measured on each pixel of the camera, and the images are acquired with an 8-bit CCD camera, so the maximum pixel intensity is 255. The maximum intensity occurs at z=1.6 mm. The xy cross-section image shown in FIG. 32 was obtained at the position of maximum intensity.

In the following two examples, the optic system shown in FIG. 31 was used to create an asymmetric QNDB and the above described CCD camera system was used to characterize the resulting optical beam.

In both cases, the optics are identical, except the orientation of the SQWP has been rotated by 45 deg between the two examples that follow.

The following outlines the procedure for determining $F_D$
  1) Measure the beam intensity I(x,y) profiles for a series of locations along the optical axis.
    a. This was done across a suitable range of z-locations so that the measurement encompasses a region where the beam intensity reaches a maximum as a function of z, and drops to less than ½ that maximum level on both sides of that z-location.
  2) Measure the Rayleigh range of the beam
    a. From the above images, measure the z-distance it takes for the beam to drop from maximum intensity to ½ the peak intensity.

3) Calculate $w_{0,eff}$ of the beam
   a. This was evaluated using the beam profile (image) measured at the z-location of the beam waist (maximum intensity location on z-axis)
   b. Measure $w_0$ for both the major and minor axes of the beam profile—the radial distance for the beam intensity to drop to $1/e^2$ of its peak. $w_{0,eff}$ is the smaller of these.
   c. As part of this measurement, one also can verify if the beam has an Aspect Ratio=$w_{0,max}/w_{0,min}$>1.1, confirming it is asymmetric
4) Compare the measured Rayleigh range to the Rayleigh range predicted by $w_{o,eff}$ alone
   d. Evaluate $F_D = Z_{Rx,min}/(\pi w^2_{o,eff}/\lambda)$
   e. If it is >10 you have a QNDB Results Worked Examples on Experimentally Produced Asymmetric QNDBs Calculating Asymmetry and $F_D$:

Example 1) "-33" file

This example is based on the beam profile measurements shown in FIGS. 32 and 33.

$\lambda$=1.064 microns 13-33→note long axis of ellipse is aligned on x axis

FWHM of focal line=1.23 mm (~2× the Rayleigh range):

Determination of Rayleigh Range:

The Rayleigh range is the shortest distance over which the beam decays from a peak value to ½ of its peak value in the z-direction.

In this case the shortest distance is moving from the peak at z=1.6 mm towards more negative z, reaching ½ of the peak intensity at about z=1.17 mm.

This gives a distance to the half intensity point of 0.43 mm

In the case of searching for the ½ intensity point moving in the positive z-direction, the crossing point is at about z=2.40 mm.

This gives a distance to the half intensity point of 0.80 mm.

The minimum of the above two distances is then taken to get the Rayleigh range:

$Z_{Rx,min}$=0.43 mm $Z_{Ry,min}$=0.43 mm (x and y are same when using intensity method)

Figure 34:
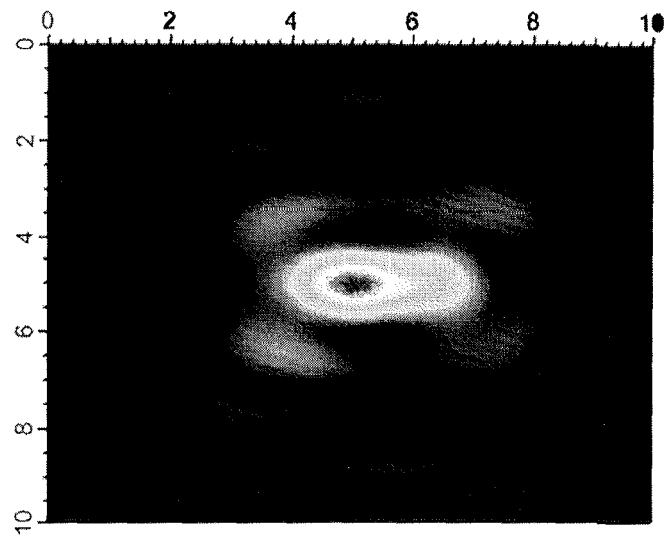
FIG. 34 shows an enlargement of the central portion of the beam cross section shown in FIG. 32.
Figure 35:
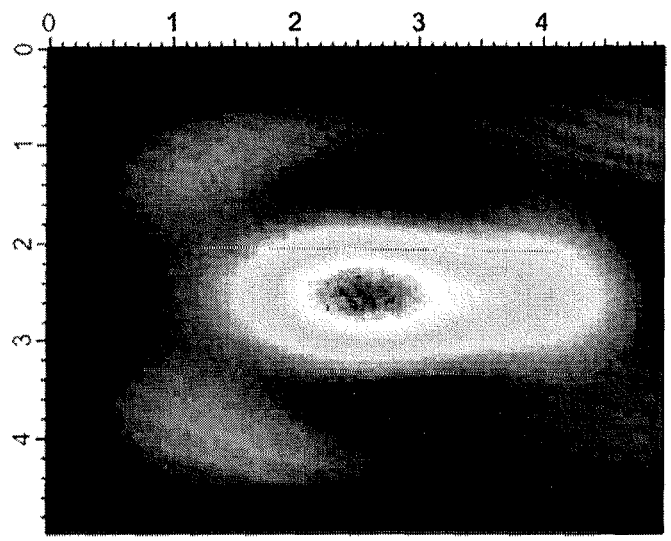
FIG. 35 shows an enlargement of the central portion of the beam cross section shown in FIG. 32.

FIGS. 34 and 35 show enlargements of the central portion of xy cross section shown in FIG. 32 over dimensions 10 microns×10 microns and 5 microns×5 microns, respectively.

Figure 36:
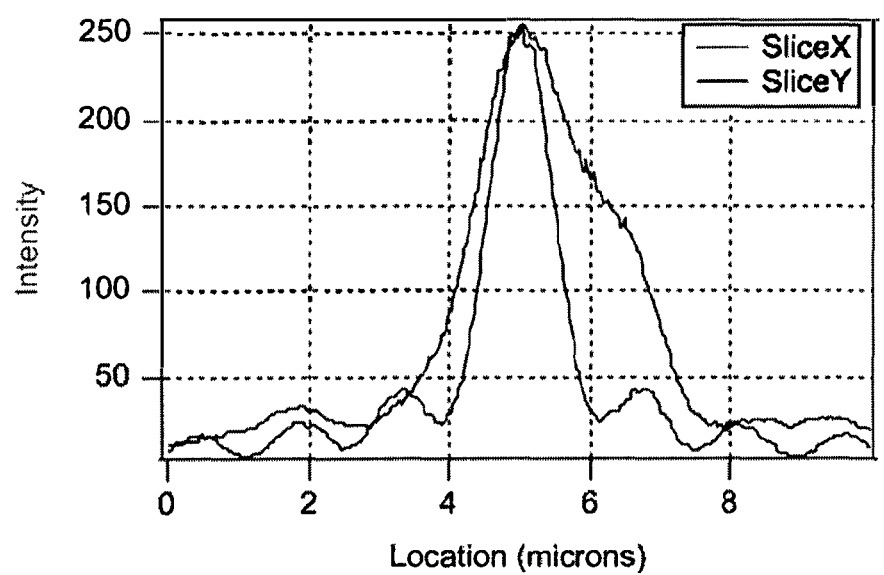
FIG. 36 shows intensity profiles in the x- and y-directions obtained from the beam cross section shown in FIG. 34.

FIG. 36 shows two traces corresponding to one-dimensional slices in the x-direction (wider trace) and y-direction (narrower trace) obtained from the xy cross section shown in FIG. 34.

The cross-sectional plots analyzed are those at z~1.6 mm, the where the intensity along the optical axis was at its peak.

The x-direction trace (Slice X) is a horizontal cross section of the pixel intensity drawn though the peak intensity pixel of the xy cross section.

The y-direction trace (Slice Y) is a vertical cross section of the pixel intensity drawn though the peak intensity pixel of the xy cross section.

Now calculate the spot radius in the x and y directions:

Examining the X-slice:

$w_{0,min}$=4.995−4.06=0.94 microns $w_{0,max}$=5.96−4.995=0.96 microns

Diameter in x direction=1.90 microns ($1/e^2$ intensity points)

$w_{0,min}$=0.94 microns

Examining the Y-slice:

$w_{0,min}$=4.995−3.33=1.66 microns $w_{0,max}$=7.39−4.995=2.40 microns

Diameter in y direction=4.06 microns ($1/e^2$ intensity points)

$w_{0,max}$=1.66 microns

Now calculate $W_{o,eff}$ $w_{0,eff}$=the shortest distance, in any direction (x or y), at which the intensity drops to $1/e^2$ of maximum $w_{0,eff}$=0.94 microns Then calculate the Aspect Ratio:

Aspect Ratio=$w_{o,max}/w_{o,min}$=1.66/0.94=1.76

Beam is asymmetric, aspect ratio is >1.1

Determination of $F_D$:

Measured minimum Rayleigh range=0.43 mm=430 microns $Z_{Rx,min}$=430 microns $w_{0,eff}$=0.94 microns (using the shortest radial distance at which the intensity decreases to $1/e^2$)

$\pi w^2_{o,eff}/\lambda$=2.61 microns $F_D = Z_{Rx,min}/(\pi w^2_{o,eff}/\lambda)$=430 microns/2.61 microns=165

$F_D$>10, this is a quasi-non diffracting beam

And

Example 2) "-39" file

In Example 2, the SQWP shown in the optical system of FIG. 31 was rotated by 45 deg relative to the position of the SQWP used in Example 1. The optical systems of Example 1 and Example 2 were otherwise identical.

Figure 37:
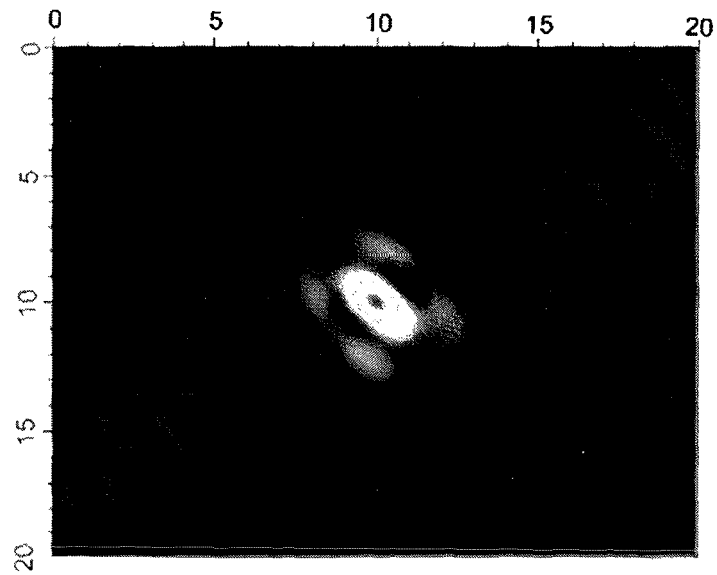
FIG. 37 is an image of a beam cross section of a quasi-non-diffracting beam.
Figure 38:
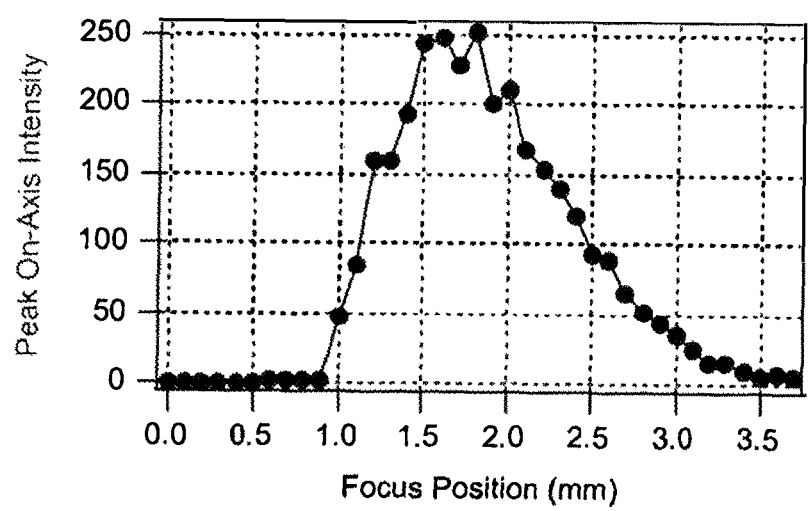
FIG. 38 shows a plot of the peak intensity obtained from a series of x-y cross-sectional images measured at different focus positions along the optical axis.
Figure 39:
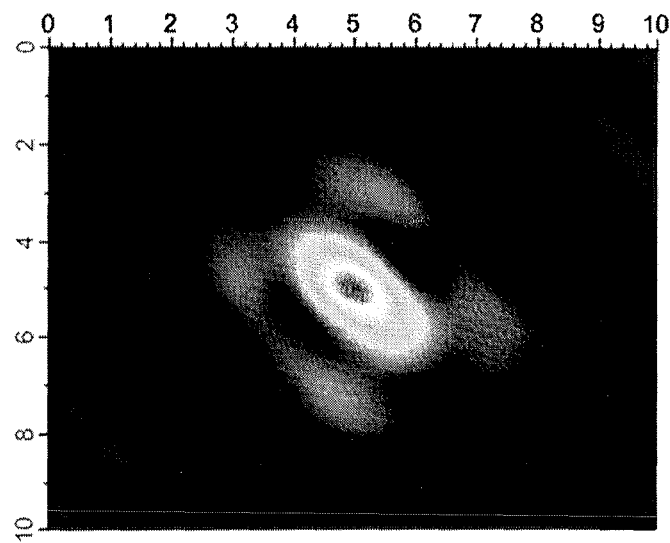
FIG. 39 shows an enlargement of the central portion of the beam cross section shown in FIG. 37.
Figure 40:
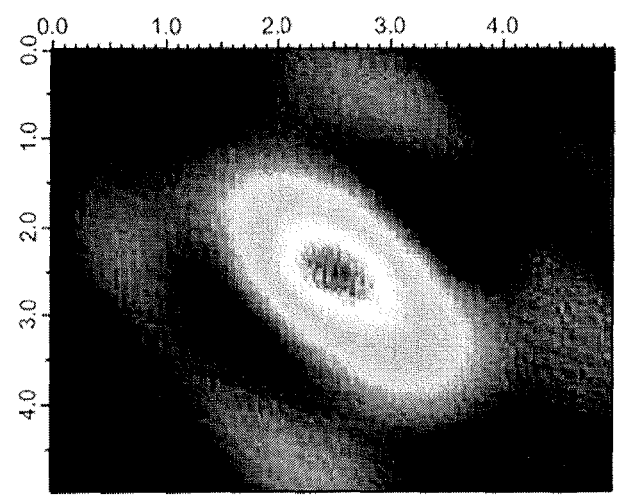
FIG. 40 shows an enlargement of the central portion of the beam cross section shown in FIG. 37.

FIG. 37 shows an xy beam cross section and FIG. 38 shows peak intensity at different focus positions along the z-direction (direction along the optical axis). The peak intensity occurred at z=1.8 mm and the xy cross section shown in FIG. 37 was obtained at the z-position of peak intensity. The data shown in FIGS. 37 and 38 was obtained in the same way as the data shown in FIGS. 32 and 33. FIGS. 39 and 40 show enlargements of the central portion of the xy cross section shown in FIG. 37 over dimensions 10 microns×10 microns and 5 microns×5 microns, respectively.

$\lambda$=1.064 microns 13-39 note long axis of ellipse is aligned at 45 deg to x-axis FWHM of focal line=1.21 mm (~2× the Rayleigh range)

Determination of Rayleigh Range:

The Rayleigh range is the shortest distance over which the beam decays from a peak value to ½ of its peak value.

In this case the shortest distance is moving from the peak at z=1.8 mm towards more negative z, reaching ½ of the peak intensity at about z=1.16 mm.

This gives a distance to the half intensity point of 0.64 mm

In the case of searching for the ½ intensity point moving in the positive z-direction, the crossing point is at about z=2.37 mm.

This gives a distance to the half intensity point of 0.57 mm

Take the minimum of the above two distances, to get the x-dimension Rayleigh range:

$Z_{Rx,min}$=0.57 mm $Z_{Ry,min}$=0.57 mm (x and y are by the same when using intensity method)

Figure 41:
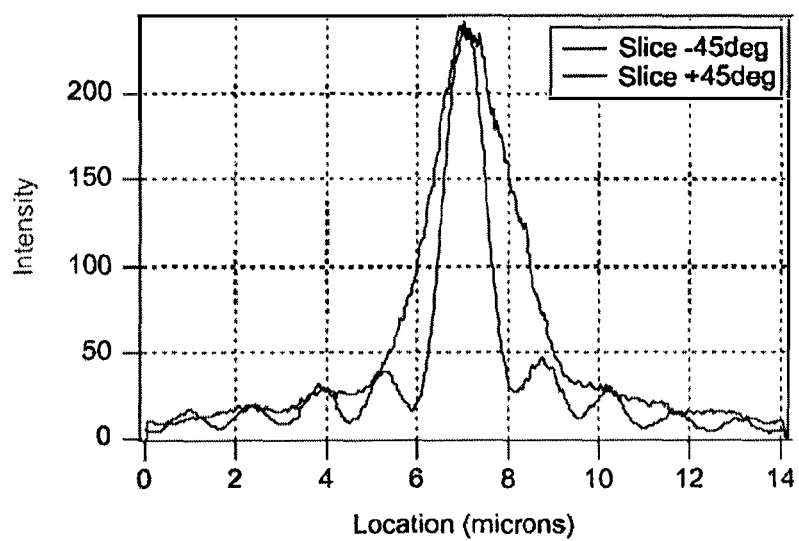
FIG. 41 shows intensity profiles in the x- and y-directions obtained from the beam cross section shown in FIG. 37.

FIG. 41 shows two traces corresponding to one-dimensional slices in the −45 deg direction (trace with wider central feature) and +45 deg direction (trace with narrower central feature) obtained from the xy cross section shown in FIG. 37.

The cross-sectional plots analyzed are those at z~1.8 mm, the where the intensity along the optical axis was at its peak. The −45 deg trace (Slice −45 deg) is a −45 deg cross section (lower left to upper right traversal in the xy cross section of FIG. 37) of the pixel intensity drawn though the peak intensity pixel of the xy cross section.

The +45 deg trace (Slice +45 deg) is a +45 deg cross section (upper left to lower right traversal in the xy cross section of FIG. 37) of the pixel intensity drawn though the peak intensity pixel of the xy cross section.

Now calculate the spot radius in the −45 deg and +45 deg directions:

Examining the −45 deg slice:

$w_{o,min}$=7.07−4.96=2.11 microns $w_{o,max}$=9.40−7.07=2.33 microns

Diameter in −45 deg direction=4.44 microns (1/e² intensity points)

$w_{o,min}$=2.11 microns

Examining the +45 deg slice:

$w_{o,max}$=7.05−6.12=0.93 microns $w_{o,min}$=7.96−7.05=0.91 microns

Diameter in +45 deg direction=1.84 microns (1/e² intensity points)

$w_{o,min}$=0.91 microns

Now calculate $W_{o,eff}$ $w_{o,eff}$=the shortest distance, in any direction (x or y), the intensity drop to 1/e² of maximum $w_{o,eff}$=0.91 microns We can then calculate the Aspect Ratio:

Aspect Ratio=$w_{o,max}/w_{o,min}$=2.11/0.91=2.32

Determination of $F_D$:

Measured minimum Rayleigh range=0.43 mm=430 microns $Z_{Rx,min}$=570 microns $w_{o,eff}$=0.91 microns (using the shortest radial distance at which the intensity decreases to 1/e²)

$\pi w^2_{o,eff}/\lambda$=2.44 microns (corrected from original)

$F_D = Z_{Rx,min}/(\pi w^2_{o,eff}/\lambda)$=570 microns/2.44 microns=234

$F_D$>10, this is a quasi-non-diffracting beam

Modelled Results

Finally, FIGS. 42-45 show how a direct calculation of the optical variance ($\sigma^2_x(z)$ or $\sigma^2_y(z)$) on a series of beam profiles at different z locations also allow one to calculate the Rayleigh range $Z_{Rx,min}$ of a QNDB.

This is an alternative way for establishing the Rayleigh range to use in Equation (31), as opposed to measuring where on the optical axis the beam intensity drops to ½ its maximum as was done experimentally in the above examples.

Figure 42:
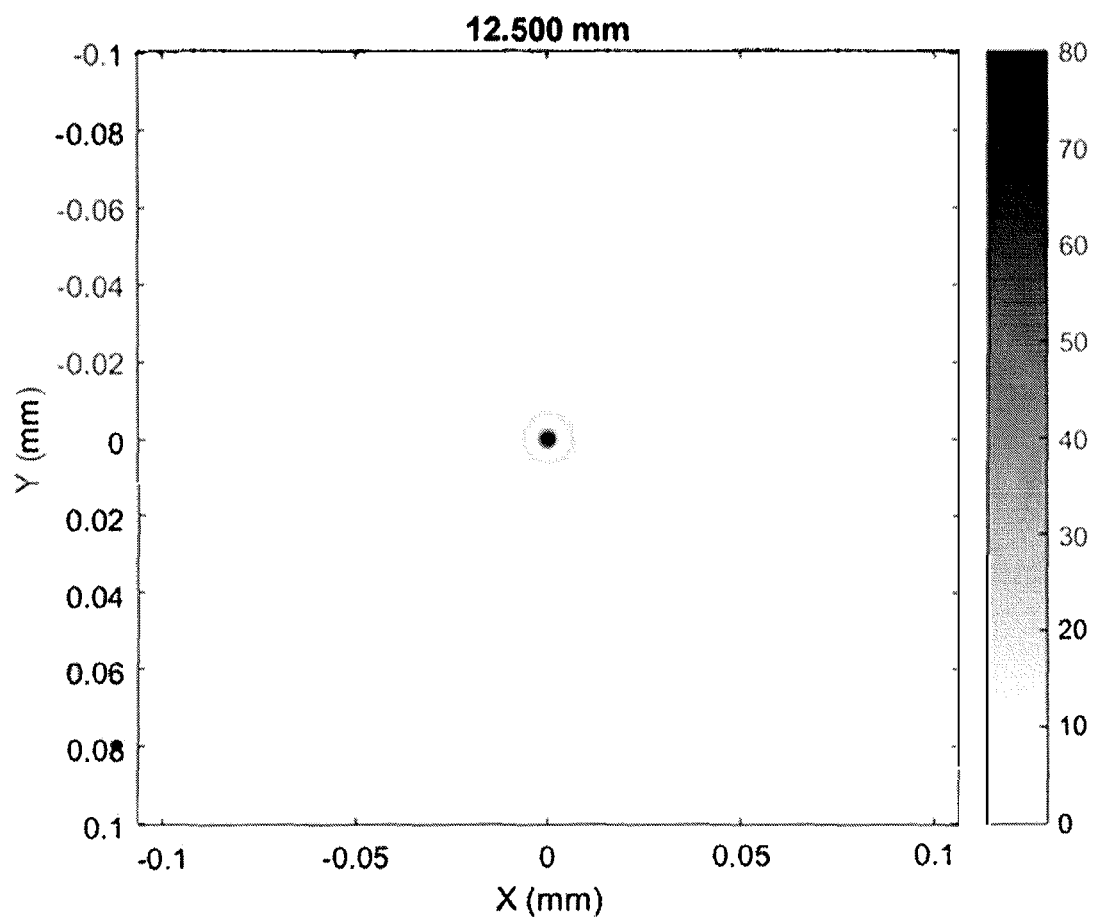
FIG. 42 shows an xy cross section of an axisymmetric beam.

FIG. 42 shows an axisymmetric QNDB profile.

Figure 43:
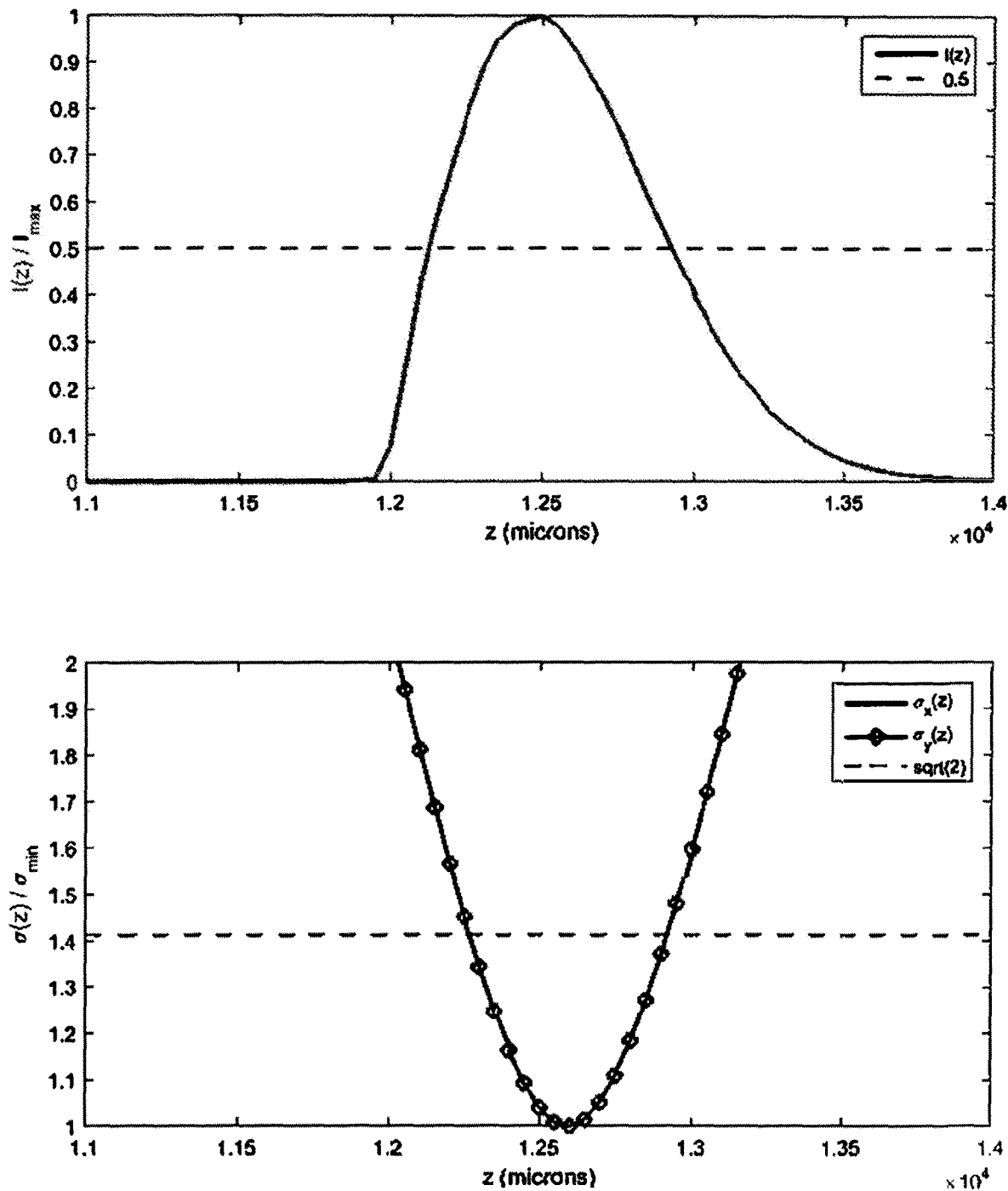
FIG. 43 shows the intensity profile and variance of an axisymmetric beam.

FIG. 43 shows the resulting intensity on the optical axis as a function of z (upper plot), as well as the (square root of) calculated beam variance as a function of z (lower plot). The variance in the x-direction and the variance in the y-direction are equal since the beam is rotationally symmetric. The x or y Rayleigh ranges are determined by the distances along the z-axis where the $\sigma_x(z)$ or $\sigma_y(z)$ increases by a factor of sqrt(2) above its minimum value. This is equivalent to measuring when $\sigma^2_x(z)$ or $\sigma^2_y(z)$ increases by a factor of 2.

Figure 44:
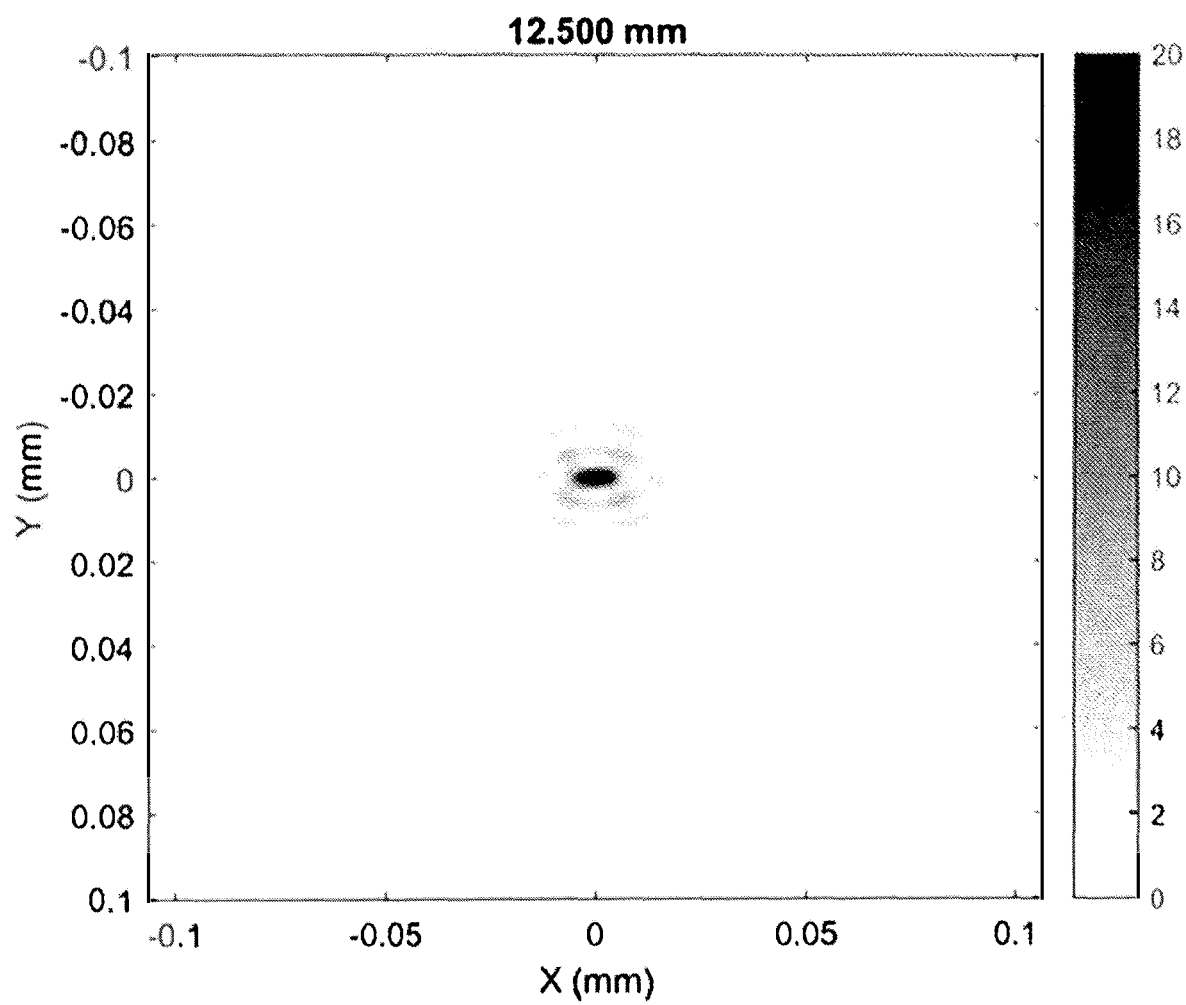
FIG. 44 shows an xy cross section of an asymmetric beam.
Figure 45:
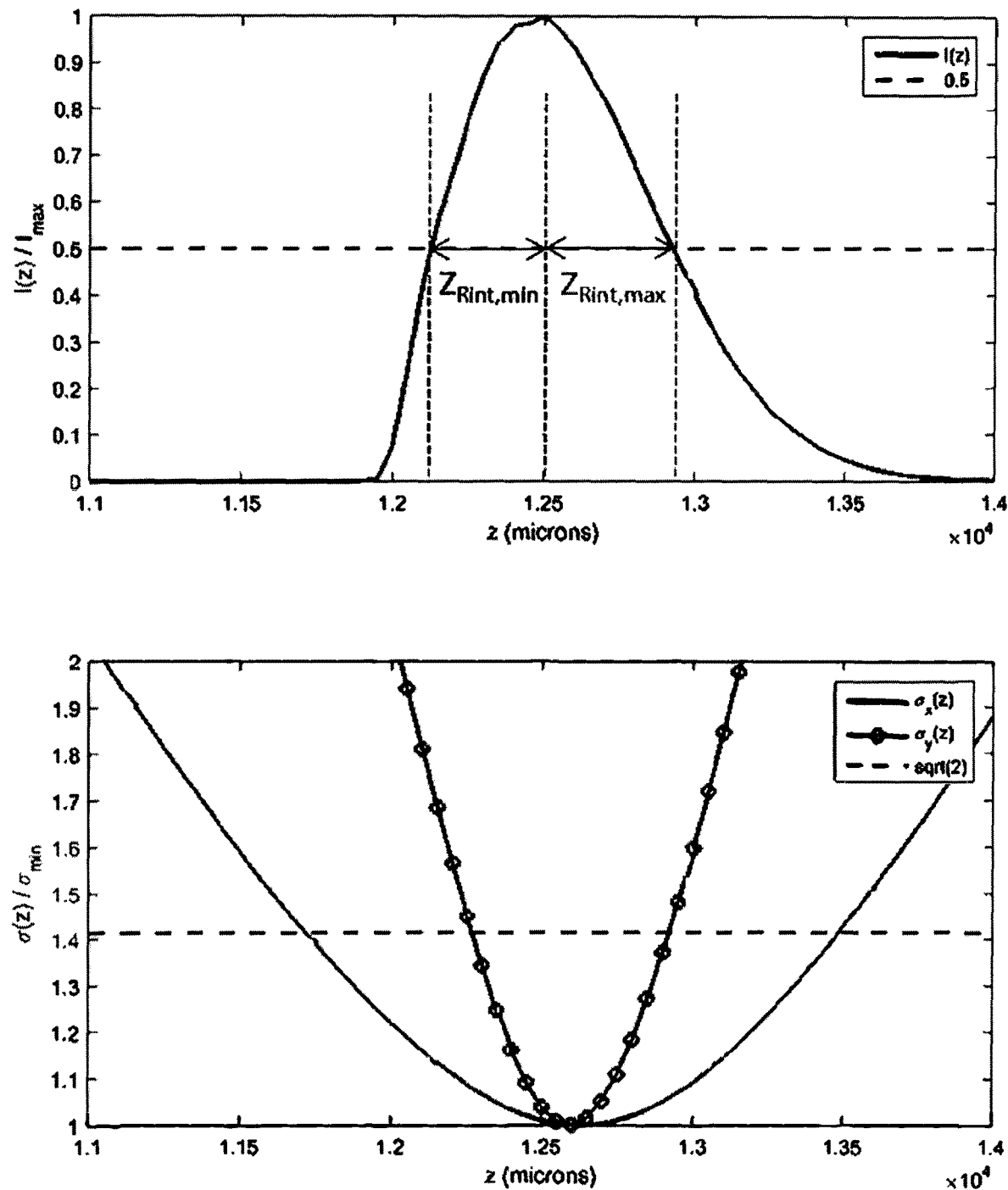
FIG. 45 shows the intensity profile and variance of an asymmetric beam.

FIGS. 44 and 45 show the same information for an asymmetric QNDB. This is the same beam shape as generated experimentally in one of the above examples. As the beam is asymmetric, the beam variance in the x direction and y-direction are no longer equal. The variance in the y-direction increases far more quickly with z than the variance in the x-direction, since the beam is narrower in the x-axis and hence diffracts more rapidly in the x-axis. What should be noted here if that the exact same z-locations where the $\sigma_y(z)$ rises to a value of 1.4 (i.e. sqrt(2)) relative to its minimum value are the points where the optical intensity I(z) drops to ½ of its peak.

This illustrates how use of EITHER measurements of the beam variance OR measurements of the drop in the peak intensity can be used to measure the Rayleigh range $Z_{Rx,min}$.

The only difference between the two methods is that if the intensity method is used, then there is no longer any distinction between the Rayleigh range measurement for the x or y directional profiles.

i.e. if the intensity method is used:

$Z_{Rx,min}=Z_{Ry,min}$ and $Z_{Rx,max}=Z_{Rx,max}$

This is because there is only one maximum intensity location (x,y) for each beam intensity profile I(x,y).

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for laser processing a transparent workpiece, the method comprising:
   forming a contour line in the transparent workpiece, the contour line comprising defects in the transparent workpiece, wherein forming the contour line comprises:
   directing a pulsed laser beam oriented along a beam pathway and output by a beam source into the transparent workpiece, the pulsed laser beam generating an induced absorption within the transparent workpiece, the induced absorption producing a defect within the transparent workpiece, the pulsed laser beam comprising:
   a wavelength $\lambda$; and
   an effective spot size $w_{o,\mathit{eff}}$; and
   a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,\mathit{eff}}^2}{\lambda},$$

where $F_D$ is a dimensionless divergence factor with a value of 10 or greater; and
   a first portion and a second portion, the first portion being incoherent with respect to the second portion.

2. The method of claim 1, wherein the non-axisymmetric beam cross section of the portion of the pulsed laser beam directed into the transparent workpiece comprises a long axis with spot size parameter $w_{o,max}$ and a short axis with spot size parameter $w_{o,min}$, wherein $w_{o,max}$ is longer than $w_{o,min}$ and an aspect ratio of $w_{o,max}$ to $w_{o,min}$ is greater than 1.3.

3. The method of claim 2, wherein the aspect ratio is greater than 2.

4. The method of claim 1, wherein the laser beam comprises a first portion and a second portion, the first portion being incoherent with respect to the second portion.

5. The method of claim 1, wherein the laser beam is directed through an aspheric optical element.

6. The method of claim 5, wherein the aspheric optical element comprises a refractive axicon, a reflective axicon, waxicon, negative axicon, a spatial light modulator, a diffractive optic, or a cubically shaped optical element.

7. The method of claim 5, wherein the aspheric optical element is positioned offset in a radial direction from the beam pathway.

8. The method of claim 7, wherein:
   the aspheric optical element is offset from the beam pathway in the radial direction by an offset distance; and
   the offset distance is a distance from about 10% to about 75% of a cross sectional diameter of the pulsed laser beam at a contact location between the pulsed laser beam and the aspheric optical element.

9. The method of claim 5, further comprising directing the laser beam beyond an optical blocking element, the aspheric optical element and the optical blocking element positioned between the beam source and the transparent workpiece.

10. The method of claim 9, wherein the optical blocking element is positioned between the aspheric optical element and the transparent workpiece.

11. The method of claim 9, wherein the optical blocking element is positioned between the beam source and the aspheric optical element.

12. The method of claim 9, wherein:
   a first lens and a second lens are each positioned between the beam source and the transparent workpiece within the beam pathway; and
   the optical blocking element is positioned between the first lens and the second lens.

13. The method of claim 9, wherein the optical blocking element is positioned within the beam pathway, such that the optical blocking element blocks from about 25% to about 80% of an intensity of the pulsed laser beam.

14. The method of claim 9, wherein the optical blocking element is positioned within the beam pathway such that the optical blocking element blocks a cross-sectional chord portion of the pulsed laser beam.

15. The method claim 1, wherein the dimensionless divergence factor $F_D$ has a value of from about 50 to about 1500.

16. The method of claim 1, wherein the defect comprises a central defect region and at least one radial arm that extends outward from the central defect region along a long axis of the non-axisymmetric beam cross section.

17. The method of claim 1, wherein the beam source comprises a pulsed beam source that produces pulse bursts with from about 1 pulse per pulse burst to about 30 pulses per pulse burst and a pulse burst energy is from about 100 µJ to about 600 µJ per pulse burst.

18. The method of claim 1, further comprising translating the transparent workpiece and the pulsed laser beam relative to each other along the contour line, thereby laser forming a plurality of defects along the contour line within the transparent workpiece.

19. The method of claim 18, further comprising directing an infrared laser beam onto the transparent workpiece along or near the contour line to separate the transparent workpiece along the contour line.

20. A method for laser processing a transparent workpiece, the method comprising:
   forming a contour line in the transparent workpiece, the contour line comprising defects in the transparent workpiece, wherein forming the contour line comprises:
   directing a pulsed laser beam oriented along a beam pathway and output by a beam source through an aspheric optical element into the transparent workpiece, the pulsed laser beam generating an induced absorption within the transparent workpiece, the induced absorption producing a defect within the transparent workpiece, the pulsed laser beam comprising:
   a wavelength $\lambda$;

an effective spot size $w_{o,eff}$; and
a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D = \frac{\pi w_{0,eff}^2}{\lambda},$$

where $F_D$ is a dimensionless divergence factor with a value of 10 or greater; and
rotating the aspheric optical element about the beam pathway.

* * * * *

UNITED STATES PATENT AND TRADEMARK OFFICE
CERTIFICATE OF CORRECTION

Page 1 of 2

PATENT NO. : 11,130,701 B2
APPLICATION NO. : 16/910266
DATED : September 28, 2021
INVENTOR(S) : Akarapu et al.

It is certified that error appears in the above-identified patent and that said Letters Patent is hereby corrected as shown below:

On the Title Page

On page 8, in Column 1, item (56), Other Publications, Line 1, delete "EuropeTec" and insert -- EuropTec --, therefor.

On page 8, in Column 2, item (56), Other Publications, Line 5, delete "Fennosecond" and insert -- Femtosecond --, therefor.

On page 8, in Column 2, item (56), Other Publications, Line 39, delete "Coming" and insert -- Corning --, therefor.

On page 8, in Column 2, item (56), Other Publications, Line 69, delete "gs." and insert -- pp. --, therefor.

On page 8, in Column 2, item (56), Other Publications, Line 71, delete "Dumin, J.;" and insert -- Durnin, J.; --, therefor.

On page 9, in Column 1, item (56), Other Publications, Line 27, delete "materiamaterials";" and insert -- materials"; --, therefor.

On page 9, in Column 1, item (56), Other Publications, Line 33, delete "Ameriec." and insert -- America. --, therefor.

On page 9, in Column 1, item (56), Other Publications, Line 37, delete "wvvw." and insert -- www. --, therefor.

On page 9, in Column 2, item (56), Other Publications, Line 22, delete "Engltsh-" and insert -- English- --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*

On page 9, in Column 2, item (56), Other Publications, Line 23, delete "TnuchScreen" and insert -- TouchScreen --, therefor.

On page 9, in Column 2, item (56), Other Publications, Line 44, delete "condenced" and insert -- condensed --, therefor.

On page 10, in Column 2, item (56), Other Publications, Line 13, delete "Joumal" and insert -- Journal --, therefor.

In the Claims

In Column 50, Line 33, Claim 15, delete "method claim" and insert -- method of claim --, therefor.